(12) United States Patent
Harrison

(10) Patent No.: US 6,595,424 B1
(45) Date of Patent: *Jul. 22, 2003

(54) KEY PALETTE

(76) Inventor: Shelton E. Harrison, 915 30th St., Sacramento, CA (US) 95816

( * ) Notice: Subject to any disclaimer, the term of this patent is extended or adjusted under 35 U.S.C. 154(b) by 0 days.

This patent is subject to a terminal disclaimer.

(21) Appl. No.: 09/724,701

(22) Filed: Nov. 28, 2000

Related U.S. Application Data

(63) Continuation of application No. 09/117,150, filed as application No. PCT/US97/01356 on Jan. 22, 1997, now Pat. No. 6,184,804.
(60) Provisional application No. 60/010,648, filed on Jan. 26, 1996.

(51) Int. Cl.[7] .................................................. G06K 7/10
(52) U.S. Cl. ............................ 235/472.02; 235/472.01; 235/462.45
(58) Field of Search ........................ 235/462.45, 462.46, 235/472.01, 472.02, 380, 385; 361/679, 683, 686; 345/169, 168, 867; 341/22, 20

(56) References Cited

U.S. PATENT DOCUMENTS

| | | | |
|---|---|---|---|
| 4,458,238 A | 7/1984 | Learn | 345/165 |
| 4,517,424 A | 5/1985 | Kroczynski | 200/52 |
| 4,864,658 A | 9/1989 | Russell et al. | 2/160 |
| 4,905,001 A | 2/1990 | Penner | 341/20 |
| 5,178,477 A | 1/1993 | Gambaro | 400/489 |
| 5,183,193 A | 2/1993 | Brandell | 224/219 |
| 5,267,181 A | 11/1993 | George | 364/709.12 |
| 5,272,324 A * | 12/1993 | Blevins | 235/462.44 |
| 5,274,613 A | 12/1993 | Seager | 368/13 |
| 5,305,181 A | 4/1994 | Schultz | 361/680 |
| 5,323,195 A | 6/1994 | Phillips | 354/82 |
| 5,379,663 A | 1/1995 | Hara | 74/471 |
| 5,426,449 A | 6/1995 | Danziger | 345/168 |
| 5,467,324 A | 11/1995 | Houlihan | 368/10 |
| 5,481,263 A | 1/1996 | Choi | 341/20 |
| 5,481,265 A | 1/1996 | Russell | 341/22 |
| 5,514,861 A * | 5/1996 | Swartz et al. | 235/472.01 |
| 5,657,201 A | 8/1997 | Kochis | 361/686 |
| 5,749,841 A | 5/1998 | Moore | 602/21 |
| 5,793,032 A * | 8/1998 | Bard et al. | 235/472.02 |
| 5,796,354 A | 8/1998 | Cartabiano et al. | 341/22 |
| 6,184,804 B1 * | 2/2001 | Harrison | |

FOREIGN PATENT DOCUMENTS

| | | | |
|---|---|---|---|
| EP | 0 373 935 | * | 6/1990 |
| JP | 10-208091 | * | 8/1998 |

* cited by examiner

*Primary Examiner*—Diane I. Lee
(74) *Attorney, Agent, or Firm*—Steve Beyer; Beyer, Weaver & Thomas

(57) ABSTRACT

An arm-mounting mechanism affording users almost unlimited mobility, alternately adaptable to personal computers, digital assistants, cellular phones, cameras, audio recorders, barcode scanners, multimedia remote controls, MIDI controllers, gaming devices and others. One embodiment, utilized with speech recognition technology, provides monitor and/or keys on an arm-mounted first element movably attached to allow rotation, swiveling and/or tilting of this element relative to the arm. A second, optional element rests on projections from the arm-mounting mechanism, allowing interface with the hand of the device-bearing arm. Data processing, transmission, reception and storage equipment typically resides within the first element. The second element may be retractable to fit under sleeve. Another embodiment is a laptop PC reconfigurable for arm use. An alternative mechanism arm-mounts pre-existing devices.

4 Claims, 42 Drawing Sheets

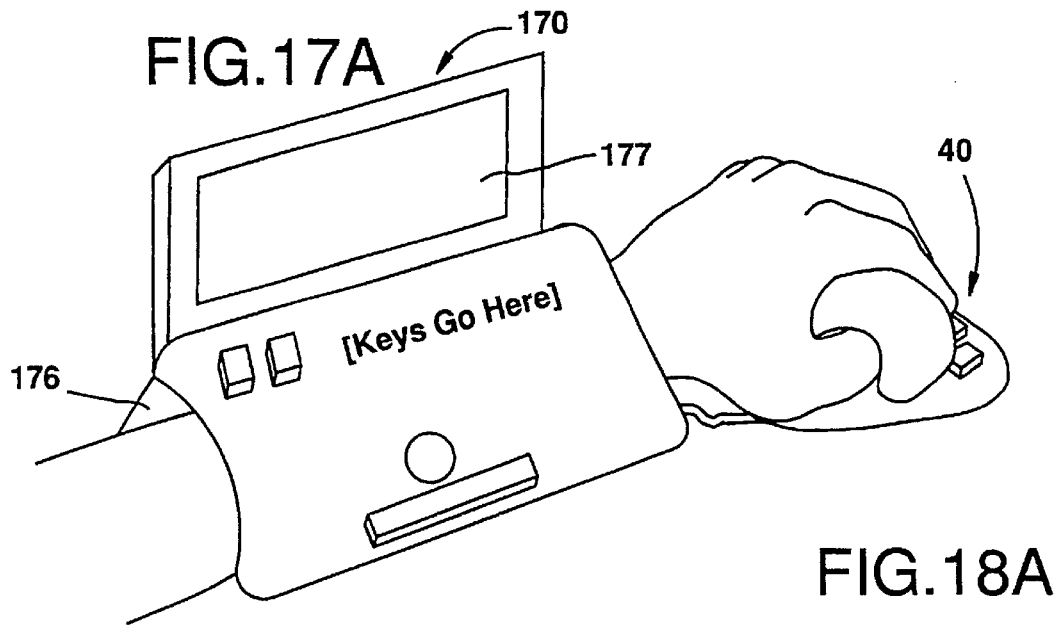
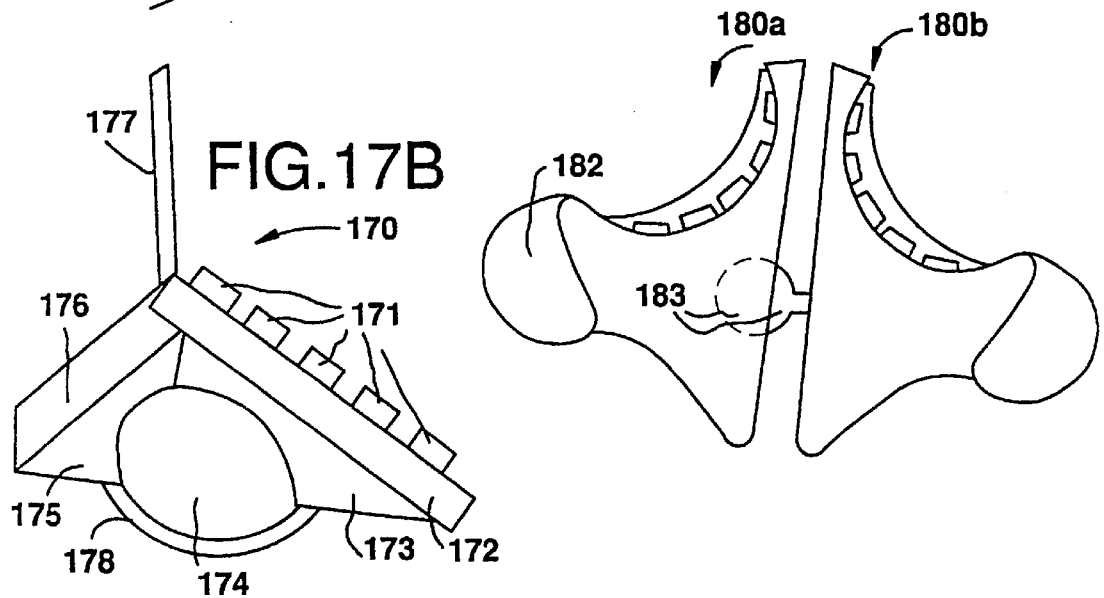
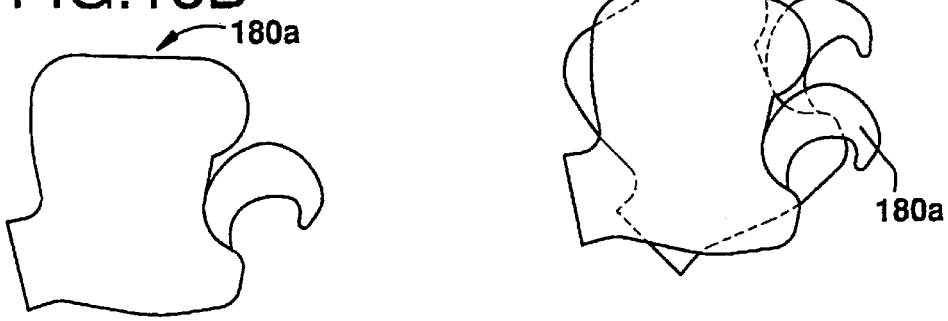

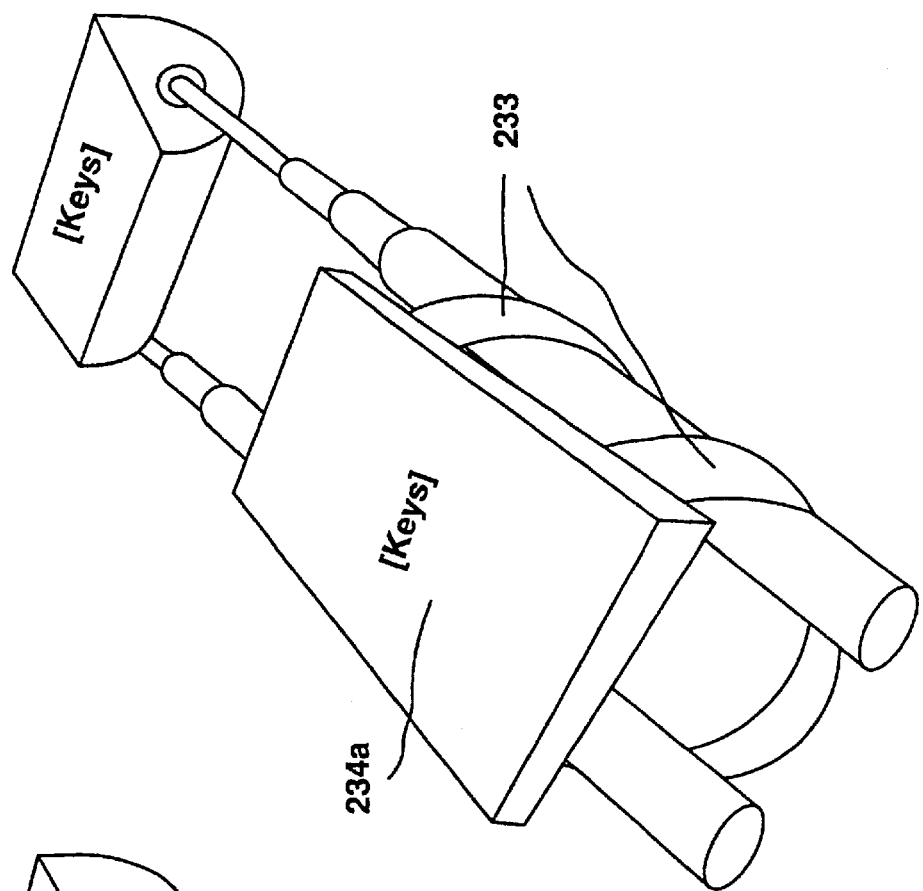
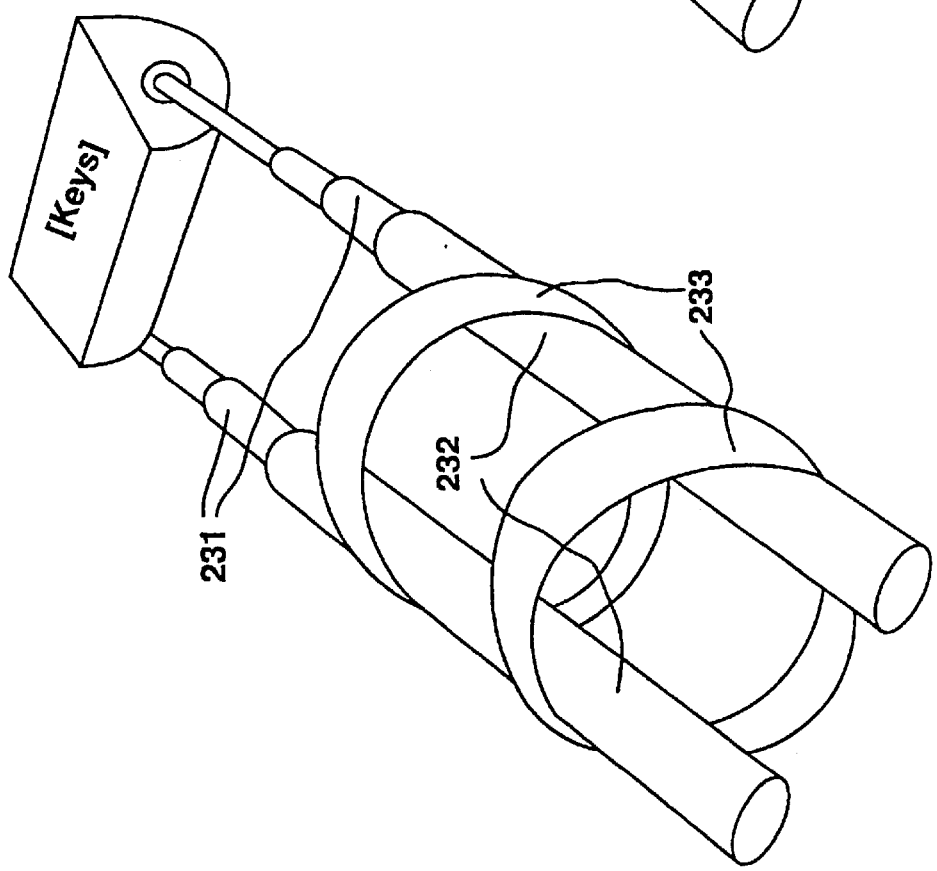

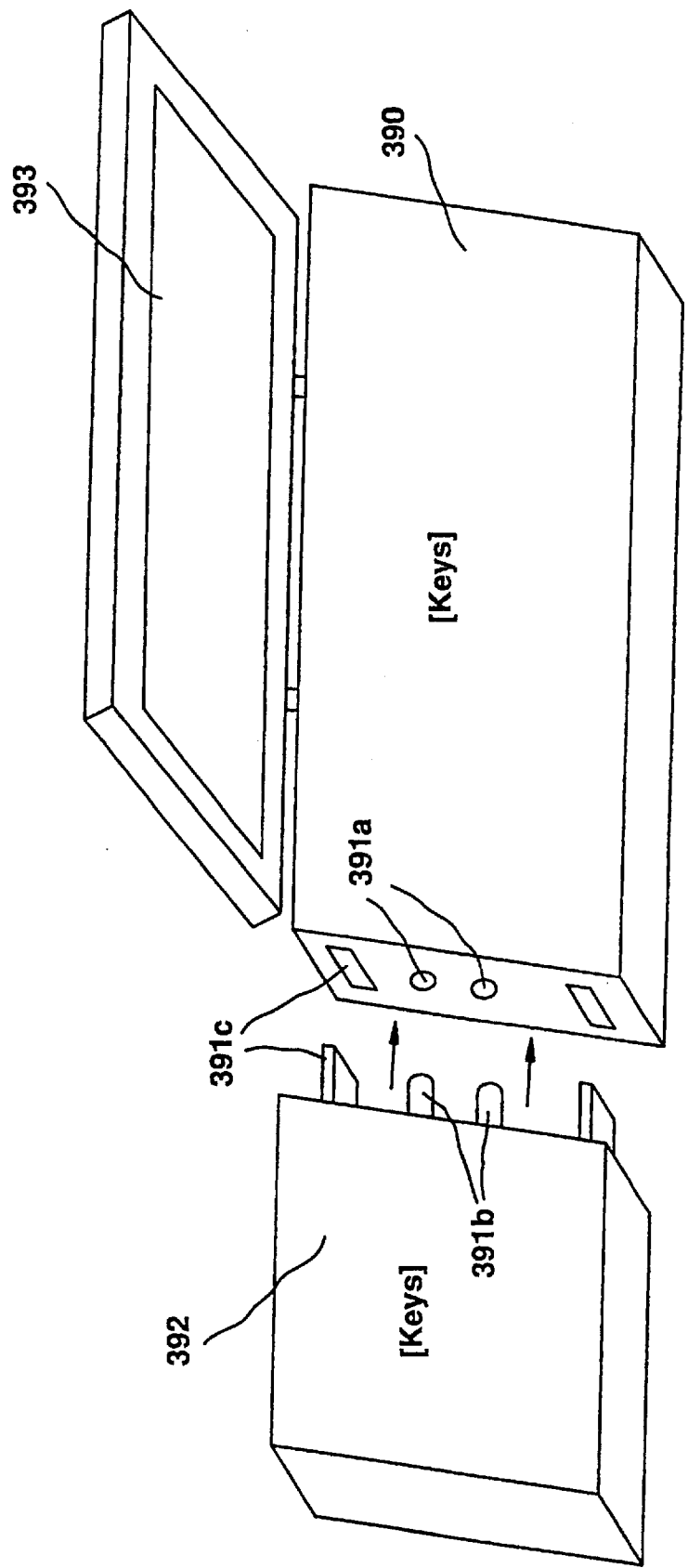

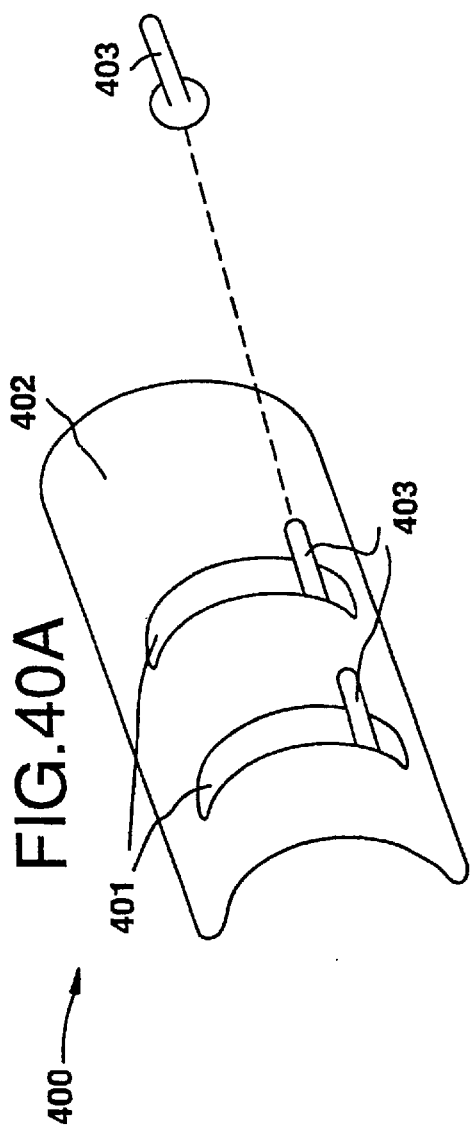
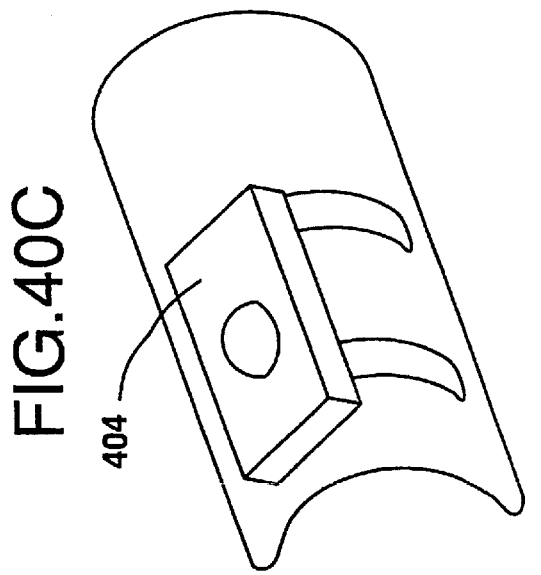

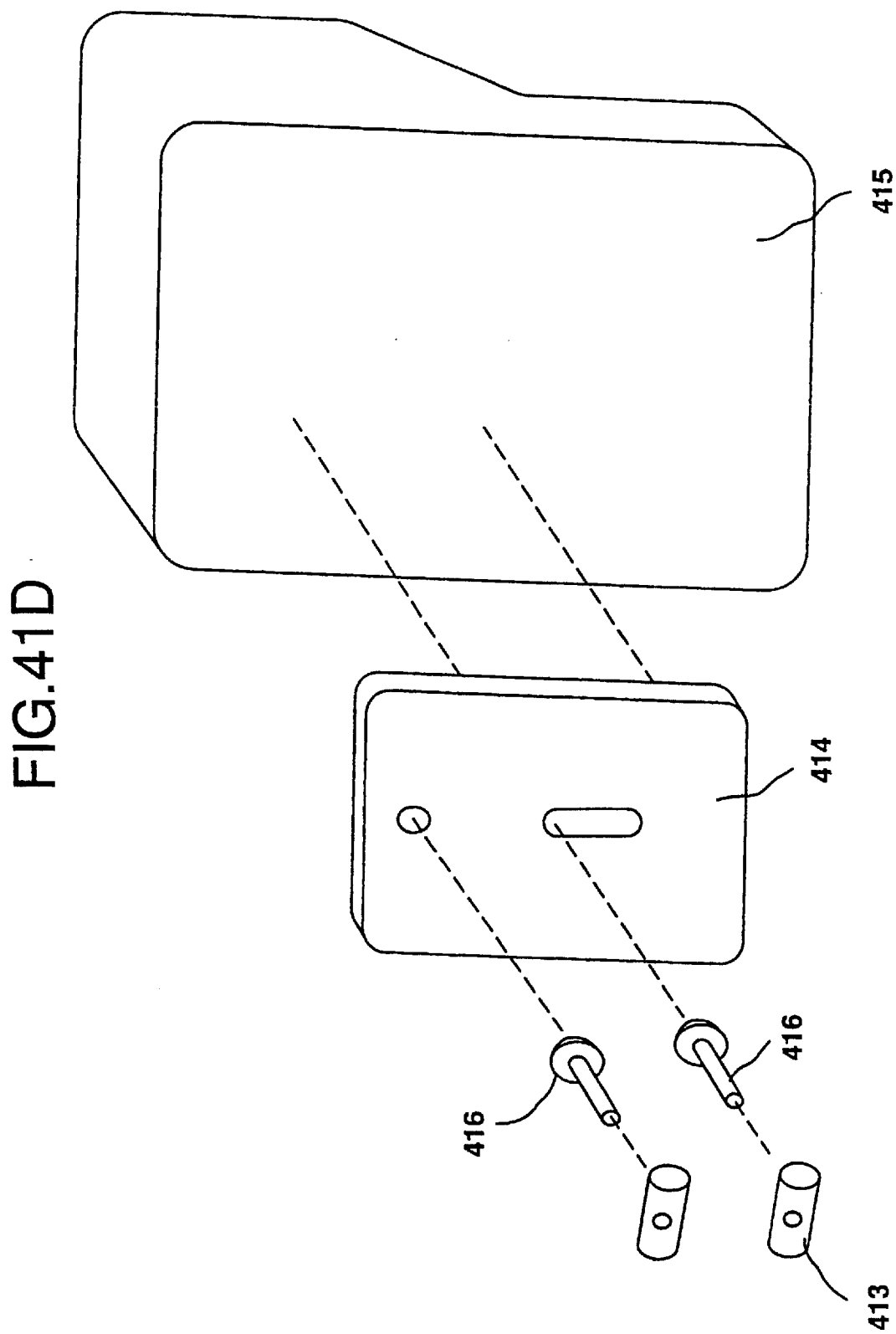

416

416

450

KEY PALETTE

This application is a continuation of Ser. No. 09/117,150 Jul. 23, 1998 U.S. Pat. No. 6,184,804 which is a 371 of PCT/US971/01356 Jan. 22, 1997 and claims benefit of Ser. No. 60/010,648 Jan. 26, 1996.

BACKGROUND OF THE INVENTION

1. Field of the Invention:

The present invention relates generally to a new form of data entry device for a data processing system. More particularly, it relates to such a data entry device especially adapted for a portable computer or computer terminal. The current invention also relates to an improved form of portable audio/visual equipment, such as cameras, microphones, monitors, remote controls and recorders. It further relates to telecommunications equipment such as telephones and emergency telephone ("911") services. The current invention also relates to MIDI controllers. Most especially, the invention relates to attachment of any such devices to a user's arm and/or hand.

2. Description of the Prior Art:

Most known keyboards used for computer data entry directly resemble the venerable "QWERTY" keyboard of a typewriter, consisting of a rectangular, planar cluster of depressible buttons usually mounted on a unitary plastic housing; such keyboards may be physically separate from the computer to which they input information, as in the case of desktop computers, or they may be one part of an integrated product, as with most laptop computers. In using such a keyboard, the fingers of the user's left and right hands access their respective keys in a manner which is essentially symmetrical.

Most attempts at making the computer data-entry keyboard more compatible with human physiology and preferences, such as U.S. Pat. No. to 5,424,728 to Goldstein and U.S. Pat. No. 5,410,333 to Conway, have simply involved new variations of this same old typewriter concept. As such, they offer, at best, a smaller amount of the same problems, namely: (1) immobility, binding the user to a desk and a chair, thereby eventually causing physical fatigue and strain of the user's back, neck, shoulders and arms, and (2) unnatural physical interface between user and device, causing stress and contortion of the hands and wrists of the user, which may result in health problems such as carpal tunnel syndrome, tendonitis, etc.

Other designs, such as U.S. Pat. No. 4,913,573 to Retter and U.S. Pat. No. 5,270,709 to Niklsbacher, have attempted to provide an input device which is more suitable to the human hand. These designs provide some sort of palm supporting structure upon which the hand can rest, thereby decreasing some of the strain to the user's hands, wrists and forearms. However, these designs do nothing to alleviate the immobility problem described above, and they introduce yet another problem: the necessity of learning a new way to type and a new feel for the keyboard. In other words, such new designs suffer from a lack of user-friendliness; they are counter-intuitive for the modern computer user.

Still other designs have maintained a certain amount of user-friendliness while alleviating some of the unnaturalness of hand and finger position which traditional keyboards necessitate. The pyramid design disclosed in U.S. Pat. No. 5,426,449 to Danziger provides at least a small hand-supporting structure and an advantageous key placement while remaining relatively intuitive in terms of operability. It also provides, apparently as an afterthought, a way to dangle the entire keyboard from a user's arm, presumably for portability. This attachment, however, through which a desktop keyboard simply hangs out from under the user's arm instead, is too awkward and cumbersome ever to be realistically used or usable for genuinely portable purposes. Thus, this design still forces the user to sit at a desk, again causing the back, neck and shoulder strain and discomfort implicit therein.

A similar afterthought approach to resolving the problems which arise when users are bound to a desk appears in U.S. Pat. No. 5,122,786 to Rader. That design simply shifts the data input device from desktop to armrest, perhaps an improvement but not a solution.

The only prior full-size computer or keyboard design which makes a realistic attempt at genuine mobility is that of U.S. Pat. No. 5,416,730 to Lookofsky. Conceptually, that design is simply an overgrown wristwatch calculator; indeed, the only prior art to which the Lookofsky patent document refers are the wristwatch disclosed in U.S. Pat. No. 4,255,801 to Ode et al, and the wristwatch calculator disclosed in U.S. Pat. No. 4,141,074 to Popper. The Lookofsky design makes no attempt to change the means of input itself or otherwise to accommodate the purpose of portability, adding nothing to the prior art but a bigger wristwatch calculator which holds more processing hardware and a bigger monitor. Thus, in the Lookofsky design, a standard computer keyboard is strapped to the user's arm. The readily apparent drawback of such an approach is that it forces the user—unless he is a contortionist—to access all keys of the keyboard with but one hand, just as one uses a smaller wristwatch calculator or any of the "handheld PC's" which have recently flooded the marketplace.

Ultimately, the problem which plagues all prior post-QWERTY keyboards is this: while they may create small gains in comfort and/or efficiency of movement, these gains are insufficient to justify the effort and expense on the part of the consumers expected to buy and learn to use such new devices. Thus, these products never attain acceptance or common usage. Only a device whose advantages represent a quantum leap in computer or keyboard design will successfully overcome consumer inertia and bring the health and mobility benefits of a post-QWERTY input device to the mass public.

The Key Palette, disclosed herein, is such a quantum leap. It is more portable and mobile than any computer or keyboard design which allows the user to use both hands, and it is easier to use than the wristwatch calculator designs or the handheld PC's, which can only be accessed with one hand (and are often accessed with one finger). Thus, in maximizing the twin goals of portability and accessibility, the Key Palette represents the twenty-first century alternative to the nineteenth-century keyboard and its various modifications.

Known portable monitors include those which are worn over one eye like a monocle or half-pair of sunglasses. Such "visor monitors" are used by ViA Inc., Northfield, Minn., in conjunction with that company's new belt-mounted computer system. Such monitors are not ideal in that they make the user look like a space alien and they obstruct the user's vision. The long-term health effects of this one-eyed approach are also uncertain.

Other known portable monitors include those appearing on wristwatches, wristwatch calculators and the Lookofsky arm-mounted computer. These monitors are not ideal in that they require the user to hold his arm at a particular angle in order for the monitor to be viewed optimally. One other portable monitor is that which comes attached to some home video cameras made by Sharp. The current invention provides a monitor which is more fully mobile, adjustable and easier to carry than prior portably monitors and is thus ideally suited for use with voice-recognition or pen tablet data input systems.

Myriad handheld tape recorders, microphones, TV remote controls, wireless and cellular telephones, and video cameras are known. MIDI controllers/keyboards are known. The present invention is novel with respect to these devices in that it performs the functions of such devices with greater ease and mobility and allows "hands free" carriage. In the case of portable cameras, the current invention also provides greater stability than is possible with known handheld cameras and camcorders.

Known means of attaching a mechanical or electrical device to a user's arm are very straightforward: just strap the device on like a watch, as in Lookofsky, or dangle it from one's wrist like a handcuff, as in Danziger. In such limited designs, a user who wants to revolve his watch or other device around his arm must twist the entire apparatus, thereby rubbing the device and band against his skin. The current invention provides a variety of means which allow a user to revolve arm-mounted devices fully or partially around his arm without anything rubbing against his skin. This invention also allows devices to be mounted in such a way as to enable them to swivel and tilt as well as revolve independently of the user's arm position. Such total mobility and adjustability have been heretofore unavailable.

Garmin makes a personal navigation system which, through the signals of the Global Positioning System satellites, can determine the location of the unit within about fifteen meters. The current invention incorporates such capabilities with those of the Key Palette to create a unique system for emergency calls to "911."

SUMMARY OF THE INVENTION

It is an object of the present invention to provide an improved means of data entry which enables greater mobility, ease, comfort and efficiency of use than any prior keyboard-like device allows.

It is another object of the present invention to provide a self-contained computer which is more portable than any prior fully functional, fully accessible computer.

It is another object of the present invention to increase the productivity and convenience of computer users and other data enterers while also reducing the risk of health complications associated with usage of prior data entry devices.

It is a further object of the present invention to provide a superior computer monitor, one which is more portable, adjustable and suitable for use with voice recognition and pen-based data input systems than any prior monitor system.

It is a further object of the present invention to enhance the performance and mobility of musicians who use MIDI while performing.

Another object of this invention is to provide a microphone, audio recorder, and/or camera which is more stable, mobile and easier to use than known audio/visual devices.

Another object of this invention is to provide various means of attaching electrical or mechanical devices to a person's arm which are superior to any known means in terms of functionality, stability and range of motion.

Another object of this invention is to provide a wireless telephone which is more easily portable than any known telephone or radio communication device.

Another object of this invention is to provide a multimedia remote control and/or arm-mounted gaming device which is more portable and convenient than known embodiments of such devices.

Another object of this invention is to provide a system by which a user can call "911" for emergency help from almost anywhere more quickly and easily than ever before.

The attainment of these and related objects may be achieved through use of the novel key palette herein disclosed. A key palette in accordance with this invention is a data entry device for a data processing system, which comprises:

(a) an armpiece configured for attachment to a user's first arm;

(b) a first keyboard portion extending from the armpiece and configured for positioning to be engaged by the user's first hand of the first arm when the armpiece is attached to the user's first arm; and (c) a second keyboard portion mounted on the armpiece and positioned to be engaged by the user's second hand of a second arm when the armpiece is attached to the user's first arm.

In another aspect of the invention an apparatus for mounting a device to be controlled by a user on the user's arm, comprises, in combination, (a) an armpiece configured for attachment to a user's arm;

(b) a movable coupling coupled between the device and the armpiece, the movable coupling having a configuration which allows the device to be swiveled, tilted or revolved by movement of the movable coupling while the armpiece is attached to the user's arm; and (c) a device mount connected between the device and the movable coupling.

The present invention is disclosed by reference to several drawings and through the detailed descriptions below. It represents a quantum leap in computer and computer input device design, making possible for the first time the full, comfortable, manual use with both hands of a computer while walking, reclining or sitting in any position without having to be near a desk or similar surface. As such, this Armpiece/Handpiece breakthrough not only provides unprecedented mobility and thus increased opportunity for productivity, but it also heralds an end to back, neck and shoulder strain which can arise from prolonged use of a desktop, laptop, or palmtop computer. Similarly, it relieves users of the one-handed—or one-fingered—"hunt and peck" approach required by handheld PC's.

However, this invention gives rise to more variations on a theme than can be pictured herein. Thus, these drawings and descriptions are used only for purposes of illustrating the novelty of the present invention, certain embodiments and features of its many different forms, and some of the variations to which the invention is susceptible. Given such purposes, these drawings and descriptions are not an exhaustive collection of all manifestations of the invention and are not intended to limit the invention but rather to illustrate its many innovations. Invention is claimed of, without limitation, all the various alternative embodiments, variations, modifications, adjustments, versions, applications, recombinations and readily apparent extensions to which this invention and its novel features lend themselves, whether or not a given manifestation has been pictured or explicitly described herein, including but not limited to substitutions of one material for another, one type of joint for another, one type of fastener for another, one type of angle or curve for another, one key-to-symbol pattern or format (QWERTY, Dvorak, military, etc.) for another, and a fixed part for a moving part or vice versa:

Disclosed herein is a means of data entry, called a Key Palette, which may or may not contain stand-alone data processing hardware and which typically consists of two main parts, upon each of which are mounted a plurality of keys. The first of the two main parts, that called the Handpiece, sits in, fastens around or is held stably in close proximity to one hand of the user. The other of the two main parts, known as the Armpiece, fastens around or otherwise attaches to the user's forearm. These two pieces are typically connected by an electrical cable and one or more small rod(s) called Connecting Rods.

Several keys for data entry are located on the Handpiece, positioned in such a way as to be accessible to the fingers and thumb on the hand of the arm which bears the Key Palette. The remaining keys are located on the Armpiece Key Housing, a component of the Armpiece; these keys are to be utilized by the fingers and thumb of the opposite hand. Separating the columns of keys are optional and/or removable partitions (hereinafter Guiding Walls), which eliminate the possibility of horizontal keystroke errors. A track ball, joystick, pen tablet, touch pad, and other such additions and extensions may also be mounted on the Armpiece Key Housing and/or Handpiece according to user needs and preferences. In self-contained computer models or network terminals, a monitor protrudes from the Armpiece; it may be hinged in such a way that it can be folded over the Key Housing when not in use. Various means of attaching the Armpiece Key Housing to the user's arm are also disclosed: for instance, one type of Armpiece includes a tube which encircles the user's arm; another design employs Radio-Ulnar Bars, Wristlock and Ring Tracks, described below in the following sections; still other designs use simpler means, such as straps.

In one principal embodiment, the Handpiece is contoured to fit the user's hand and makes use of a unique arrangement of keys: the keys are set in columns aligned to the shape of a Compound Arc, which is described in detail below. This shape allows for exceptional naturalness, accuracy and efficiency of finger and hand motion. The shape of the remainder of this contoured Handpiece also facilitates its ease of use, including features such as the Palm Surface, against which the user's palm rests so that his or her fingers fall naturally and effortlessly toward the proper keys, and the Thumbpiece, which surrounds a space to be occupied by the user's thumb and upon which may be mounted keys or other user-accessible parts. Two surfaces typically contain no keys and do not contact the user's hand. These two surfaces, known as the Half-Turn Rest Surface and the Full-Turn Rest Surface, are flat planes, so that the Handpiece can rest stably upon these surfaces on a table or desk.

An equally preferable design utilizes a Handpiece which is not contoured in the way as that just described but rather is modeled after the neck of a guitar. This design contains keys which are placed in the plane which corresponds to the guitar fretboard and are accessed similarly to the manner in which a guitarist accesses the strings of a guitar. This Handpiece design has the advantage of initially seeming more familiar to users than the contoured Handpiece.

A third type of Handpiece, the one which will be easiest to use for those who do not wish to venture far from the keyboard skills they already have, is also disclosed: in this design, the Handpiece is mounted on a Support Bar, typically projecting from the under side of the Armpiece, and comprises a planar keyboard which is suspended in such a way that it can be accessed by the hand bearing the Key Palette just as that hand would access a desktop keyboard; in short, this design is a piano-like Handpiece as opposed to the guitar-like or the contoured Handpieces.

Several embodiments of the Armpiece are disclosed, but three distinctive traits are common to most designs: (1) the Armpiece effectively replaces a desk with the user's own forearm as support for the computer or input device; (2) the Armpiece provides a mechanism by which the housing of the keys themselves can revolve—and in some models, swivel and/or tilt—around the user's arm so that the keys can remain accessible to the user's opposite hand regardless of which direction the forearm which bears the Key Palette is turned; and (3) the Armpiece provides a stable foundation from which project the supports which suspend the Handpiece so that the Handpiece keys may be accessed by the hand which bears the Armpiece. This means of suspending keys in front of the hand is a crucial innovation of the Key Palette.

In some models, a battery or other power supply as well as a wireless transmitter and antenna may be mounted in or on the Armpiece or attached to another part of the user's body. In other models, the various ingredients of an entirely portable, self-contained computer (microprocessor, monitor, ports, etc.) are mounted upon or within the Armpiece Key Housing or, alternatively, mounted elsewhere on the user's body and connected to the rest of the device via cable or other means of transmission.

Dedicated Monitor Armpiece. Another alternative embodiment, ideal for use with voice-recognition input hardware and software as well as with pen-based systems such as the Apple Newton, is a design which includes few manual input devices and which may not include a Handpiece at all: the Key Palette with a Dedicated Monitor Armpiece.

This Dedicated Monitor Armpiece design replaces the swiveling, tilting and/or revolving Key Housings described above with a Swiveling Monitor. Thus, the user of such a Key Palette can adjust this Monitor to be viewed easily—or written on, in the case of pen-based input systems—no matter how his forearm is oriented. Attached to this Monitor may be a handful of typical monitor buttons and dials for brightness, contrast, etc., and/or other input devices, such as a microphone for voice input. Data processing and/or radio transmission/reception hardware can be mounted inside the Swiveling Monitor housing or elsewhere on the Armpiece or user's body; a headset microphone or other voice input system may also be used with such an Armpiece.

A Handpiece need not be attached to this Dedicated Monitor Armpiece at all if the user needs no more means of manual input (for instance, if his voice recognition hardware and software can handle all of his needs). However, if supplementary manual input means, such as trackball, fingerpad, or special character or function keys, are still required by the user, these can be mounted on a Handpiece attached to the Dedicated Monitor Armpiece. Such a Handpiece, similar to aforementioned Handpieces, may be attached as in designs described above. This addition enables the user to hold and use all hardware with one arm and hand, leaving the other arm and hand free.

Simplified Handpiece. For Dedicated Monitor Armpiece users who only need a few keys, however, a Simplified Handpiece is used. While the above described Handpieces provide keys which are accessed by the fingers, the various Simplified Handpieces provide a manual interface wherein most keys are typically accessed by the thumb. Rather than being suspended between two Connecting Rods as most other Handpieces, the Simplified Handpieces are typically mounted upon a single Support Bar, so that the angle at which said Handpiece rests can be adjusted for maximum user comfort. Specific applications of the Simplified Handpiece approach include:

Dedicated Computer Gaming Joystick or Point-and-Click Device. This embodiment uses a joystick-like Simplified Handpiece.

Dedicated Dictation Device. A "Springy" or Retractable Simplified Handpiece is used in conjunction with an Armpiece that houses a digital or analog audio recorder, microphone and speaker to serve simply as an arm-mounted, hand-activated dictation recorder. A significant version of this embodiment includes a Palm-Mounted Simplified Handpiece.

Dedicated Multi-Media Remote Control. A Simplified Handpiece is also used in conjunction with an Armpiece which bears miniature keys like those of a standard television remote control. This design functions for all forms of media remote control purposes (television, stereo, audio recorder, etc.). The Simplified Handpiece of such a model bears the most commonly used buttons or keys, such as the volume control and the channel-up/channel-down control. A full set of miniature alpha-numeric keys is also included on the Armpiece, making this unit ideal for use with PCTV's and Internet TV's.

Dedicated Wireless Telephone. The Simplified Handpiece in this model bears the traditional telephone buttons (0–9, # and *). It can be retracted into a slot on the Armpiece and is set on a spring so that it can pop out of this slot easily upon demand. The Armpiece is thin enough to fit under a person's shirt sleeve and bears nothing but a speaker and microphone for usage as a speakerphone. A significant alternative includes a Handpiece which, unlike a Simplified Handpiece, is jointed in its midsection rather than its end and which includes an earpiece at one end and a mouthpiece at the other.

Key Palette Camera Device or Camera Support Unit. A Video Camera Handpiece is set on one or two rails grounded in the Armpiece so that it can be extended to the user's hand and retracted when not in use. Pre-existing cameras can be so mounted by screwing them into the top of the unit as though it were a standard tripod, in place of the Camera Handpiece.

Mobile Audio/Visual Unit. Another embodiment of the Armpiece is that upon which are mounted specialized, directional microphones (such as shotgun mics) and/or a digital or analog camera and monitor. Each A/V component is mounted on a separate ball-and-socket joint or similar joint on a separate A/V Component Mount so that each component can tilt and swivel as the Swiveling Key Housings or Swiveling Monitors do. Furthermore, each A/V Component Mount is mounted on an independently revolving section of the Double Layer Tube or other arm-mounting means. A Simplified Handpiece may be used to control these components, or a separate controller to be held in the user's other hand can be used instead.

Musical Key Palette. In the Musical Key Palette model, the keys of the above described Armpiece Key Housings are replaced with piano keyboard keys, turning the Armpiece into a swiveling, tilting and/or revolving arm-mounted MIDI keyboard.

Such a Musical Key Palette Armpiece may include a Musical Key Palette Handpiece. This Handpiece is typically shaped like the guitar-neck-shaped Handpiece depicted in FIG. 22A, but instead of including columns of character keys, it includes typically four to six rows of "guitar keys," each row typically including four or five keys each. These rows correspond to the strings of a guitar, with each key corresponding to a particular fret on the given string. Thus, a user plays this Handpiece in the same way he "hammers on" the frets of a guitar or bass guitar. Key/note information is again transmitted by MIDI. (Note: rows of keys which correspond to individual guitar strings can be separated by perfect fourth intervals, as in a regularly tuned bass guitar, or by major or minor thirds; minor third separation is especially well-suited for this device because it enables the user to assign one "fret" or column of keys to each finger, with each such column of keys separated by Guiding Walls.) The Musical Key Palette Handpiece can also be used separately. It can also be bowed slightly to accommodate lateral wrist motion. The "fretboard" can also be concave, similar to the shape of the Contoured Handpiece described above, so as to maximize accessibility of all keys.

Alternative Handpieces for the Musical Key Palette include: (1) a Joystick Simplified Handpiece, wherein pitch bend and vibrato MIDI information is input via moving the Handpiece along its x and y axes and wherein supplemental keystroke information, such as sustain or key transposition, can be input on-the-fly via the keys or buttons included upon the Handpiece; (2) a segment of a piano keyboard.

The Expandable Key Palette and the Key Palette Extension Piece. The total mobility of the Key Palette is not always needed by users Oftentimes, people simply want to set their computer up like a conventional laptop or desktop machine rather than have their computer attached to their arm. The Expandable Key Palette design allows users to have the best of both worlds. In this design, as in other designs, the Armpiece Key Housing is constructed so as to be detachable from the rest of the Armpiece and Handpiece. This design also provides, however, that the "elbow end" of the Key Housing contain wired sockets into which a separate planar Key Palette Extension Piece plugs in. This piece, replacing the keys on the detached Handpiece, expands the Armpiece Key Housing into a full-scale standard laptop or desktop QWERTY keyboard.

This Expandable Key Palette renders standard laptop computers or wireless keyboards virtually obsolete, since such a Key Palette can alternately be used for unique Key Palette purposes—standing, walking—by attachment of the Handpiece and detachment of the Extension Piece and then used as a standard laptop computer or wireless QWERTY keyboard by detachment of the Handpiece and attachment of the Extension Piece.

Alternative Expandable Key Palette designs include: (1) one in which the Extension Piece is essentially a tray which rests underneath the Armpiece Key Housing when the Key Palette is in arm-mounted use; (2) one in which the Extension Piece is hinged rather than detachable, so that it flips up to a position which is perpendicular to the face of the rest of the Key Housing when not in use.

Retractable Belts Arm-Mounting Means. In this design, separate belts used to wrap around the user's arm are extended from and retracted into the Armpiece Mount by use of Extension/Retraction Levers. The Armpiece Mount is flexible so that it can rest flat on a desk when so used and wrap around a user's arm when used for portability. The active components of the Armpiece (Key Housing, monitor, etc.) fit into grooves on the Armpiece Mount so they partial revolution around the user's arm is possible. A similar Armpiece Mount is used to support both the Pommel. Horse and Horizontal Rails means of mounting active components, as well as those other such means mentioned above.

Dedicated Key Palette Bar Code Reader; Dedicated Magnetic Strip Reader and Printer. These specific applications of the invention are particularly helpful for the mobile user.

Key Palette Personal Alarm System and Personal Alarm System Device. This system takes advantage of the capabilities of the Global Positioning System and the new affordable, compact means of receiving and processing information received therefrom to provide a new level of safety to Key Palette users. Upon activation, the Device automatically calls 911 and delivers a pre-recorded message as well as the location of the unit so that this information can be relayed to emergency personnel, such as ambulance, police or firemen.

Each of these features is discussed in more detail in the following description, with references to the accompanying drawings. The Key Palette invention contemplates both left-handed and right-handed versions, as well as models with removable, plug-in Handpieces which allow the same Key Palette to be used interchangeably between left and right hand users. But most of the drawings depict a Key Palette on the user's left arm.

The attainment of the foregoing and related objects, advantages and features of the invention should be more readily apparent to those skilled in the art, after review of the following more detailed description of the invention, taken together with the drawings, in which:

BRIEF DESCRIPTION OF THE DRAWINGS

FIG. 17A depicts another embodiment of an Armpiece upon which is mounted a computer monitor screen and within which is housed self-contained, fully portable computing and/or word processing hardware and software as *as a power supply such as a rechargeable battery;

FIG. 17B depicts a side view of this self-contained portable computer;

FIGS. 18A, 18B and 18C depict an embodiment which consists of two Handpieces, which are joined together in opposition to one another and which may also be separated and used independently;

FIGS. 23 through 30 depict another embodiment of the Key Palette, specifically:

FIG. 23 shows the core parts of this embodiment, including the Radio-Ulnar Bars with two Ring Tracks;

FIG. 24A depict the same model upon the Ring Tracks of which is mounted a Key Housing.

FIG. 26 depicts another such Key Palette upon the Ring Tracks of which has been mounted a Key Housing Mount with a ball-and-socket joint;

FIG. 27 depicts a Swiveling Key Housing which has been mounted upon the Key Housing Mount shown in FIG. 26;

FIG. 28 depicts the Swiveling Key Housing shown in FIG. 27 as it is turned with respect to the Key Housing Mount and the remainder of the Key Palette;

FIG. 29 depicts an example of one manner in which the Radio-Ulnar Bars may be mounted to the user's arm;

FIG. 30 depicts a model in which the Connecting Rods are spaced further apart than the Radio-Ulnar Bars;

FIGS. 33A and 33C depict a Tilting Monitor.

FIG. 39A through 39I depict different Expandable Key Palette embodiments.

FIGS. 40A through 40E depict the Retractable Belts Arm-Mounting Means.

FIGS. 41A through 41K depict the Horizontal Rails Active Component Mounting Means.

DETAILED DESCRIPTION OF THE INVENTION

Prefatory note: in order to avoid the clutter of depicting dozens of individual keys per drawing, the phrase "[Keys Go Here]" or "Keys" has been placed into several drawings when it is obvious where the keys should be mounted in that example. This practice also serves to emphasize the many different key configurations contemplated but not all of which can be pictured herein.

By way of introduction, it is helpful to explain that each Key Palette "Armpiece" actually consists typically of at least three functionally severable elements which may be categorized generically as: (1) the means of arm-mounting or attachment to the arm, (2) the means of mounting an "active component" upon the means of arm-mounting, and (3) the "active component" itself, which is the part of the Armpiece which the user engages, i.e., the monitor, keypad, point-and-click device, camera or other such item which makes the Key Palette useful. Sometimes these three elements may be combined in the same piece of hardware.

Similarly, "Handpieces" have two common generic features: (1) the Handpiece proper, which is essentially a specific type of active component, such as a keypad, a joystick or even a camera, and (2) the means by which this active component is connected to the Armpiece or the user's hand or arm. Most Handpieces can be used with most Armpieces and vice versa; they can also be used separately.

While not expressly mentioned with each form of alternative embodiment discussed below, it is understood that each Key Palette, just as conventional palmtops, laptops, PDA's, and wireless keyboards, can include a monitor, a point-and-click device (trackball, touchpad, etc.), wireless radio transmission/reception equipment, a microphone, an audio/video recorder, a camera, a scanner, a magnetic stripe reader, a bar code reader, a printer, a telephone, and/or all manner of internal computer and data processing equipment, such as a microprocessor, modem, disk drive, serial ports and so on. Furthermore, all moving parts depicted can be equipped with braking mechanisms which allow the user to choose the desired Handpiece or Armpiece component position and then lock the equipment into that position. This braking is accomplished by any known means of braking: tightening a screw so as to push against the moving part or depression of a lever so that an actual brakepad makes contact with the moving part, for example.

Figure 1:
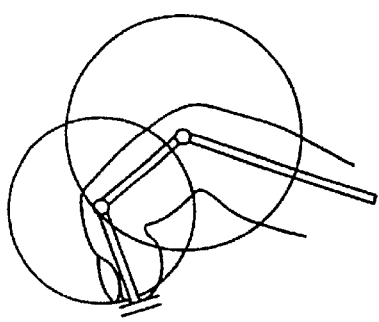
FIG. 1 depicts a finger pressing a button.
Figure 2:
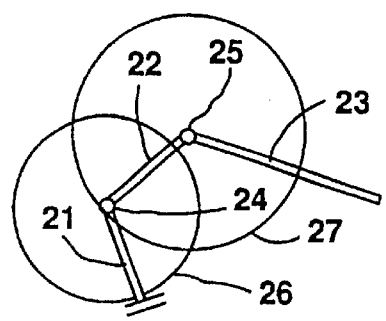
FIG. 2 reduces the bones of the finger in FIG. 1 to lines and introduces circles to illustrate the range of potential finger motion.

FIG. 1 shows a finger pressing a button. FIG. 2 is the same figure without the outline of the finger. In FIG. 2, the heavy lines (21,22 and 23) denote each of the three phalanges in a finger; the two joints connecting these three bones are represented by small black points (24 and 25). Two large circles (26 and 27) also appear in this figure. The larger circle (27) has a radius the length of the middle phalanx (22) and a center (25) which is the joint between the largest phalanx and the second largest. The smaller circle (26) has a radius the length of the most extreme phalanx (21) and a center (24) which is the joint between this phalanx and the middle phalanx.

Figure 3A:
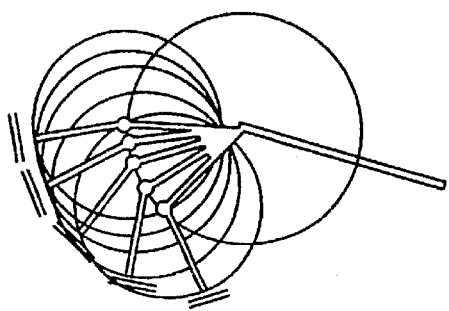
FIG. 3A shows five positions which the finger depicted in FIGS. 1 and 2 could take in pressing a button.

FIG. 3A shows five different positions which the phalanges depicted in FIG. 2 could take in pushing a button. The largest phalanx remains stationary, and the range of motion covered by the middle phalanx is approximately forty-five degrees. The center of the circle for the outermost phalanx moves along the arc covered by the middle phalanx, and the motion of the outermost phalanx relative to its own circle covers an arc of approximately ninety degrees.

Figure 3B:
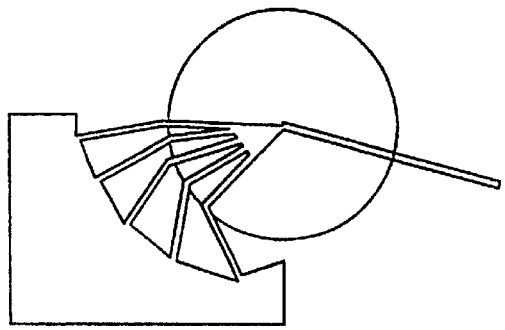
FIG. 3B depicts the curved shape described by the natural range of motion of the finger when traveling through the five finger positions depicted in FIG. 3A.

FIG. 3B depicts a shape which is the set of all points touched by the outermost point of the line segment representing the outermost phalanx in its natural motion from full extension to full contraction. The current document calls this shape, which reflects the actual physiological workings of the human finger, a Compound Arc. (Note: a true Compound Arc would be rounded, as it is the sum of two arcs, but, again for ease of illustration, the depicted Compound Arc is graded into line segments which connect the endpoints of the five finger positions depicted.)

FIGS. 4 through 14 illustrate different views of a Handpiece (40) consisting of a rigid body which houses the electrical circuitry necessary for proper detection and conveying of keystroke input. Upon this Handpiece are mounted several columns of keys which are aligned to the Compound Arc shape demonstrated in abstract form in FIG. 3B. This design enables the moving fingers to remain in a more natural position than that afforded by traditional keyboards and minimizes the distance which fingers must cover to access the keys, thereby decreasing hand fatigue and strain and increasing speed and accuracy. In accessing the approximately three to six keys assigned to a given finger, the outermost phalanx typically must move a maximum of approximately ninety degrees, the middle phalanx must move a maximum of approximately forty-five degrees, and the third phalanx remains relatively stationary except when the finger actually depresses its target key.

Figure 4:
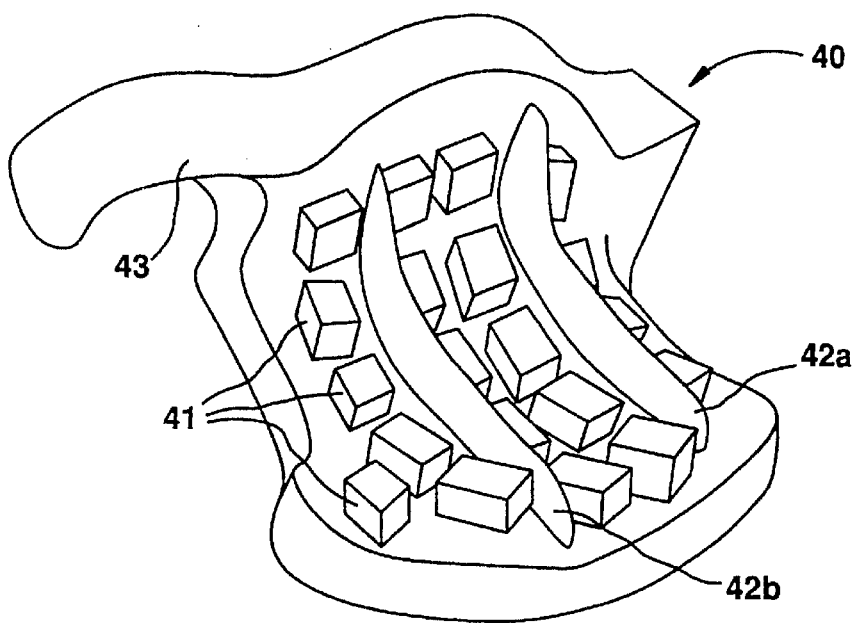
FIGS. 4 through 14 depict a Handpiece which incorporates the curved shape depicted in FIG. 3B by way of mounting keys in columns aligned to this curved shape and separating said columns with Guiding Walls.

FIG. 4 is a perspective view of the Handpiece (40), depicting several keys (41), the two optional and/or removable Guiding Walls (42a and 42b), and a Thumbpiece (43). Typically the Key Area of a Handpiece such as that pictured here contains four to six columns of keys: one or two columns to be accessed by the fourth finger; one column designated for each of the third and second fingers; and one or two columns for access by the first finger. One Guiding Wall (42a), constructed of lightweight, semi-rigid material such as clear plastic, separates the column(s) of keys which are to be accessed by the fourth finger from the column of keys which are to be accessed by the third finger. Another Guiding Wall (42b) separates the column(s) of keys which are to be accessed by the first finger from the column of keys designated for access by the second finger. For most users, a Guiding Wall is probably not necessary between the column of keys designated for the second finger and that designated for the third finger, since neither of these fingers is used for any lateral movement and both are already in contact with one Guiding Wall to facilitate keystroke accuracy.

Protruding from the main housing of the Handpiece at roughly the point where Palm Surface meets Key Area is the Thumbpiece (43), which, in providing a fixed object between the opposing forces of the thumb and the rest of the hand, allows the user to grip the Handpiece and adjust its position in relationship to his or her hand for maximum comfort and efficiency. Various keys or buttons, such as the space key or "mouse click" button, as well as a trackball, etc., may be mounted in or around the Thumbpiece for access by the thumb.

Figure 5:
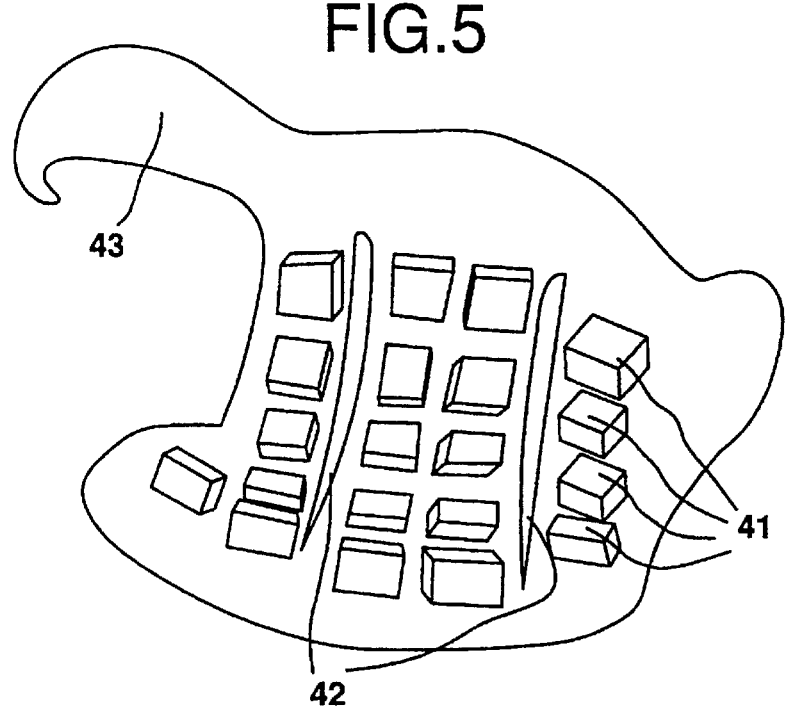

FIG. 5 is a front view of the Handpiece (40), again showing keys (41), Guiding Walls (42), and Thumbpiece (43).

Figure 6:
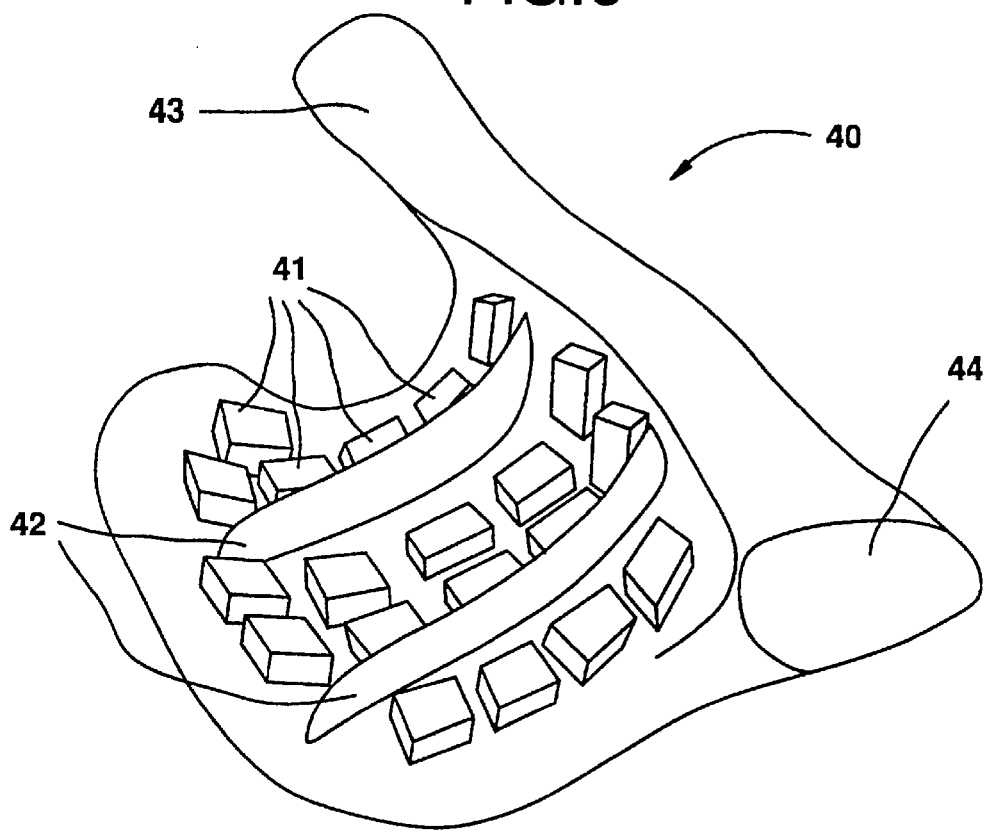

FIG. 6 presents a side perspective view; at this angle, the Half-Turn Rest Surface (44) is visible.

Figure 7:
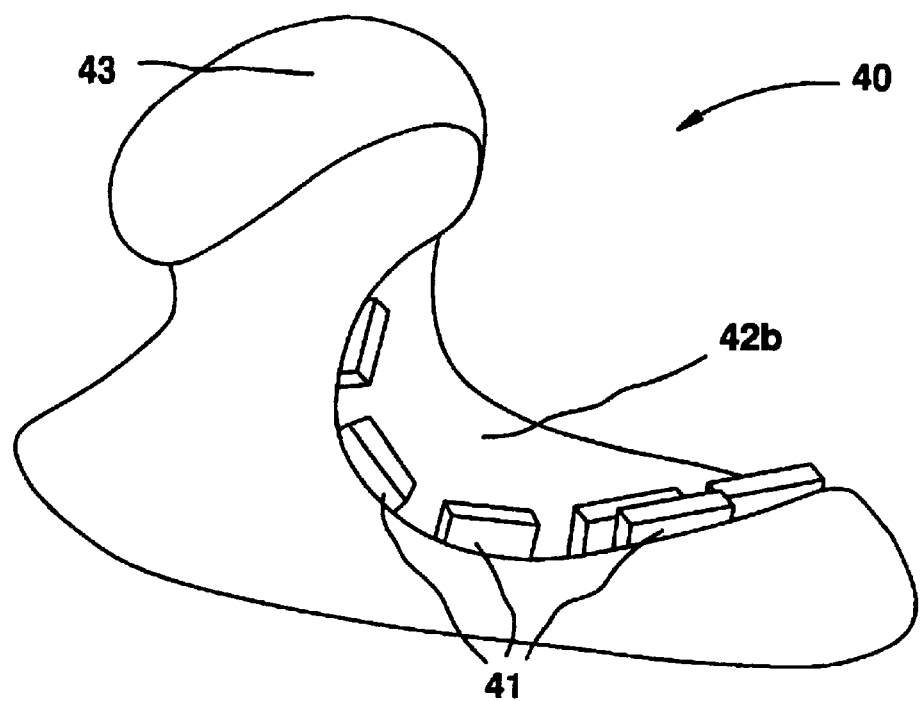

FIG. 7 depicts a side view of the Handpiece (40) as if the Handpiece were lying on a table on its Full-Turn Rest Surface. The Thumbpiece (43) is in the foreground, as are the keys (41) accessible to the user's first finger; also visible is the Guiding Wall (42b) which separates the keys accessible to the first finger from those accessible to the second finger.

Figure 8:
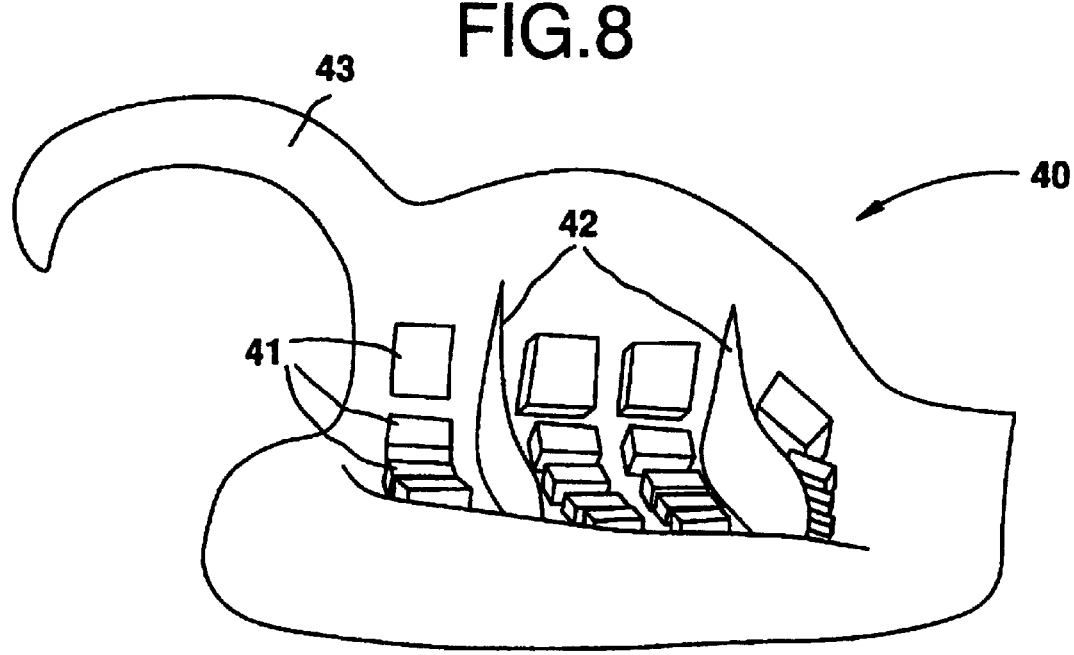

FIG. 8 is another front view of the Handpiece (40).

Figure 9:
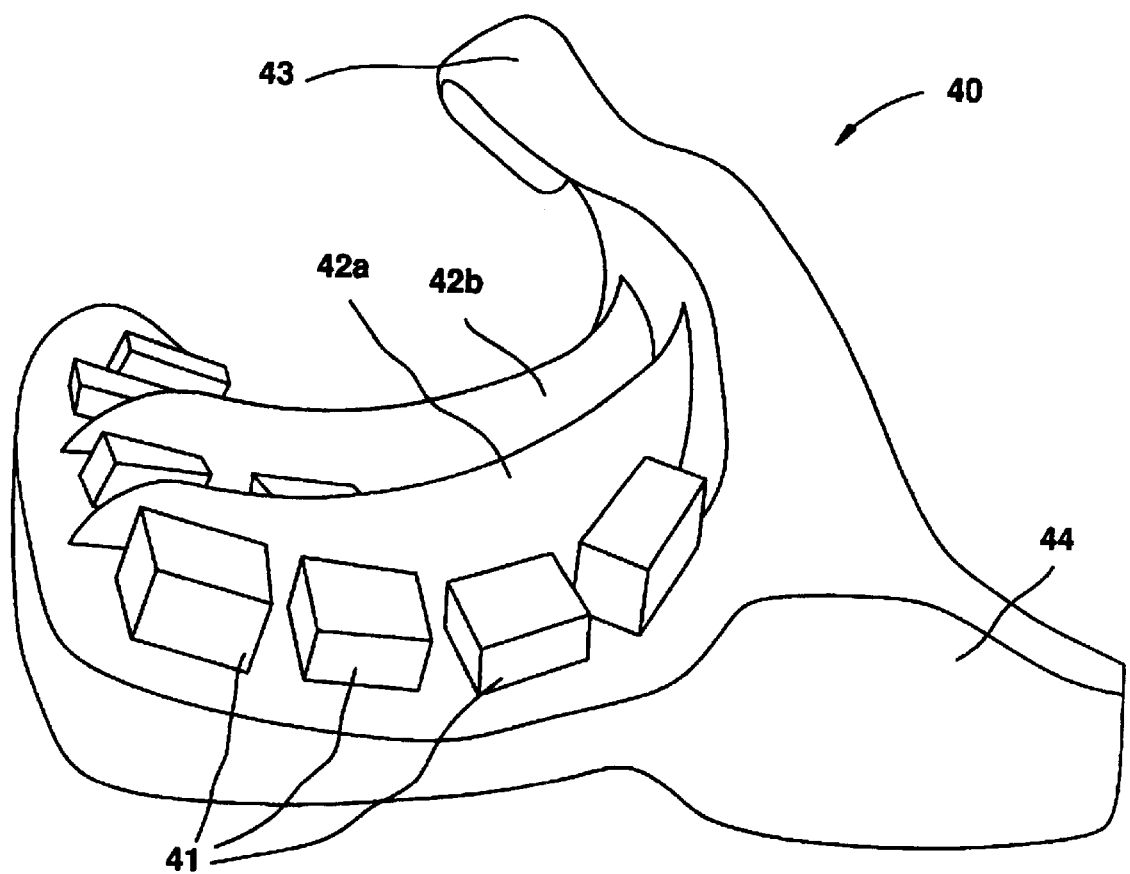

FIG. 9 presents the view opposite the view depicted in FIG. 7. From this angle, the keys (41) accessible to the user's fourth finger are in the foreground, as is the Half-Turn Rest Surface (44). The Guiding Wall (42a) separating the keys accessible to the fourth finger from those accessible to the third finger is visible, and the Guiding Wall (42b) separating the keys accessed by the first and second fingers appears in the background. The Thumbpiece (43) is also visible in the background.

Figure 10:
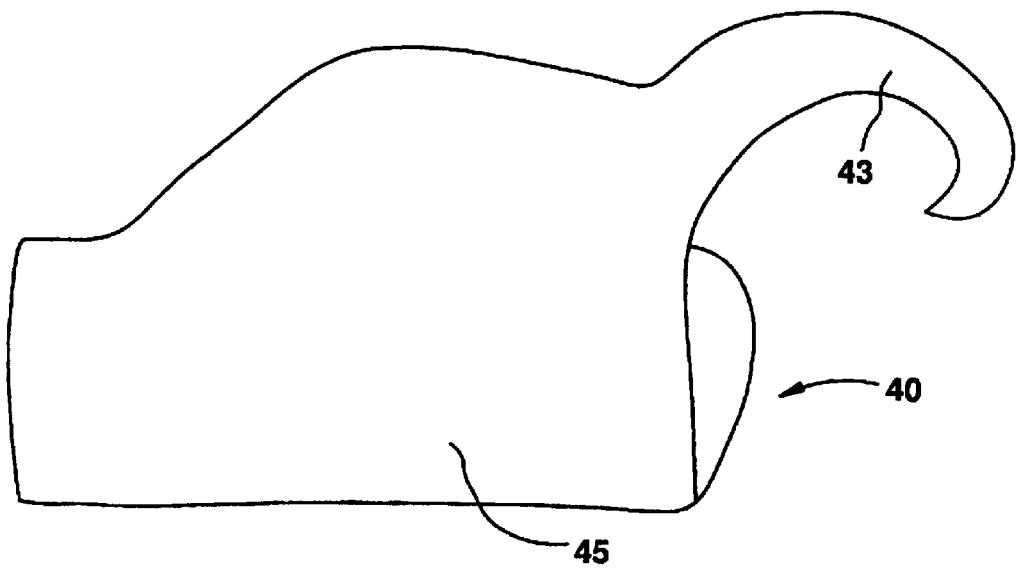

FIG. 10 depicts the Palm Surface (45) of the Handpiece as it would appear if the Handpiece were resting on its Full-Turn Rest Surface. The Key Area is not visible from this angle, but the Thumbpiece (43) can be seen. The edge where the Palm Surface meets the Half-Turn Rest Surface can be seen. The Palm Surface (45) rests against the palm of the hand and is shaped to conform thereto. It has a depression which accommodates the muscles at the base of the thumb and outside of hand. This depression gradually flows into a raised area which fits into the concave surface of the middle of the palm. This raised area gradually flows into another depression in which rest the "balls of the hand" or the bulges at the end of the metacarpals. A ridge on the outside of the Palm Surface holds the outside of the hand in place. The Palm Surface may be lined with a semi-porous material to prevent the buildup of palm moisture. It may also consist of two separate layers separated by a shock-absorbing pad.

Figure 11:
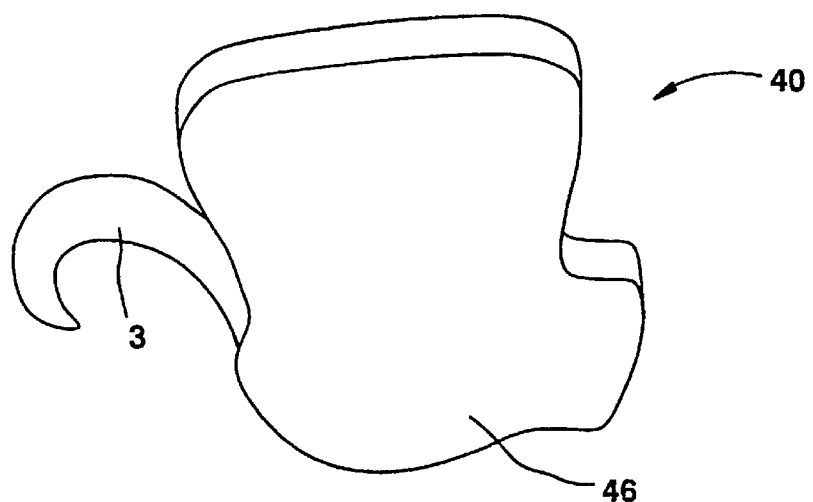

FIG. 11 depicts the heretofore unseen Full-Turn Rest Surface (46). The Thumbpiece (43) is visible in the background. The Full-Turn Rest Surface can be constructed so that it extends down the user's forearm to form essentially a wrist brace for the user, thereby increasing the stability of the Handpiece when in use. Such a model is not pictured.

Figure 12:
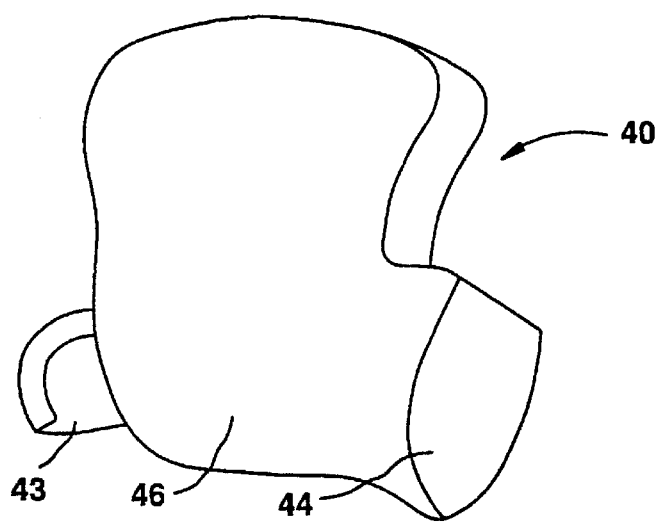

FIG. 12 depicts the Full-Turn Rest Surface (46) at an angle so that the Half-Turn Rest Surface (44) can also be seen. A part of the inside of the Thumbpiece (43) can be seen.

Figure 13:
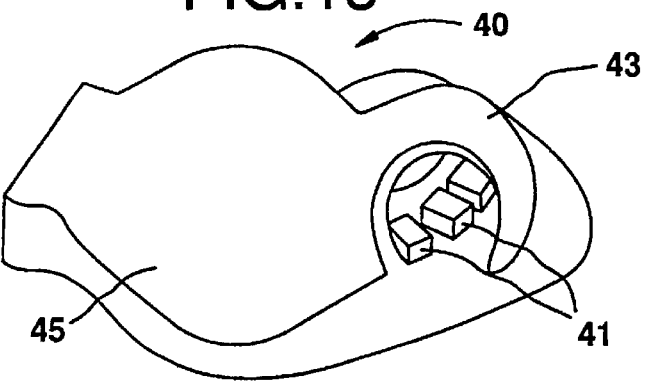

FIG. 13 depicts the Palm Surface (45) at an angle which allows the keys (41) accessible to the user's first finger to be seen through the space which would be occupied by the user's thumb when the Handpiece is in use.

Figure 14:
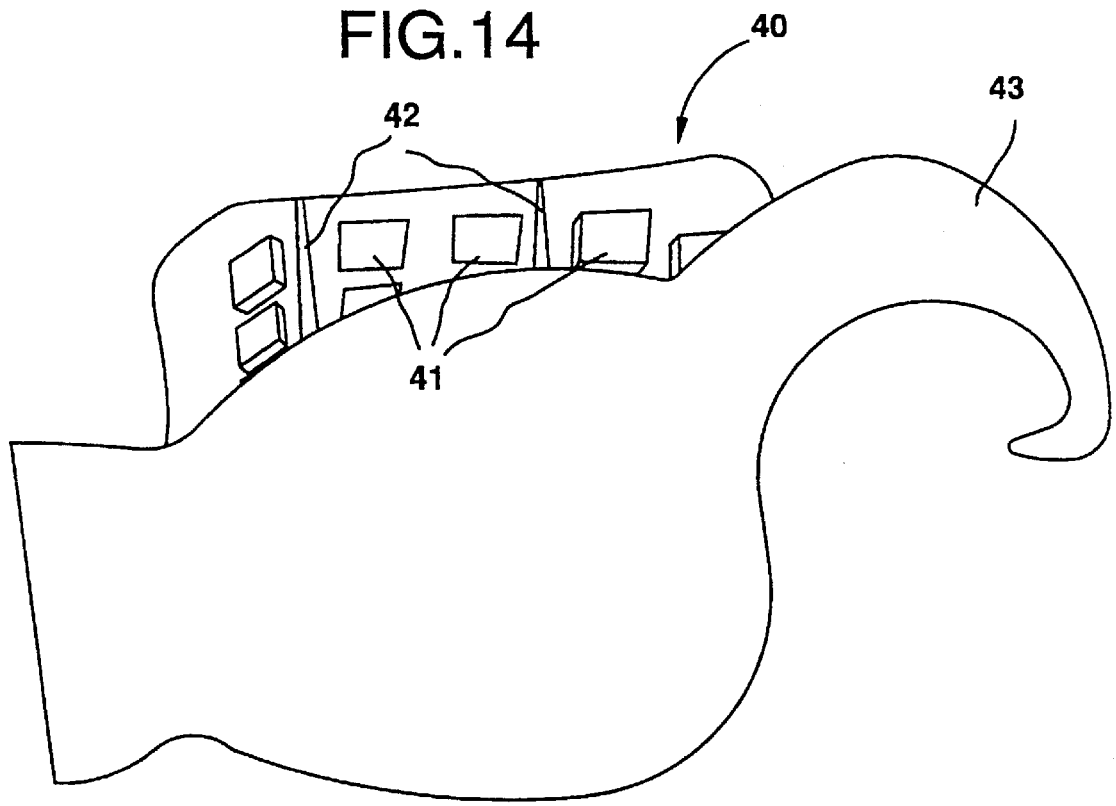

FIG. 14 presents a top view of the Handpiece (40), with some keys (41) and portions of the Guiding Walls (42) visible.

Figure 15:
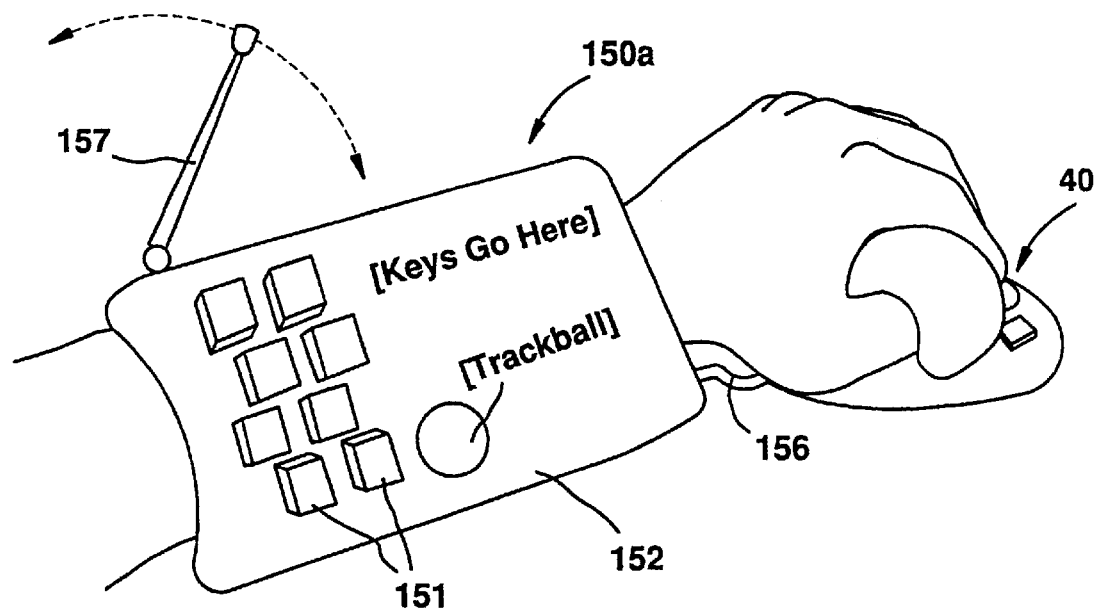
FIG. 15 depicts both an Armpiece, upon which there is mounted an antenna for wireless transmission of keystroke input data, and a Handpiece in use.
Figure 16A:
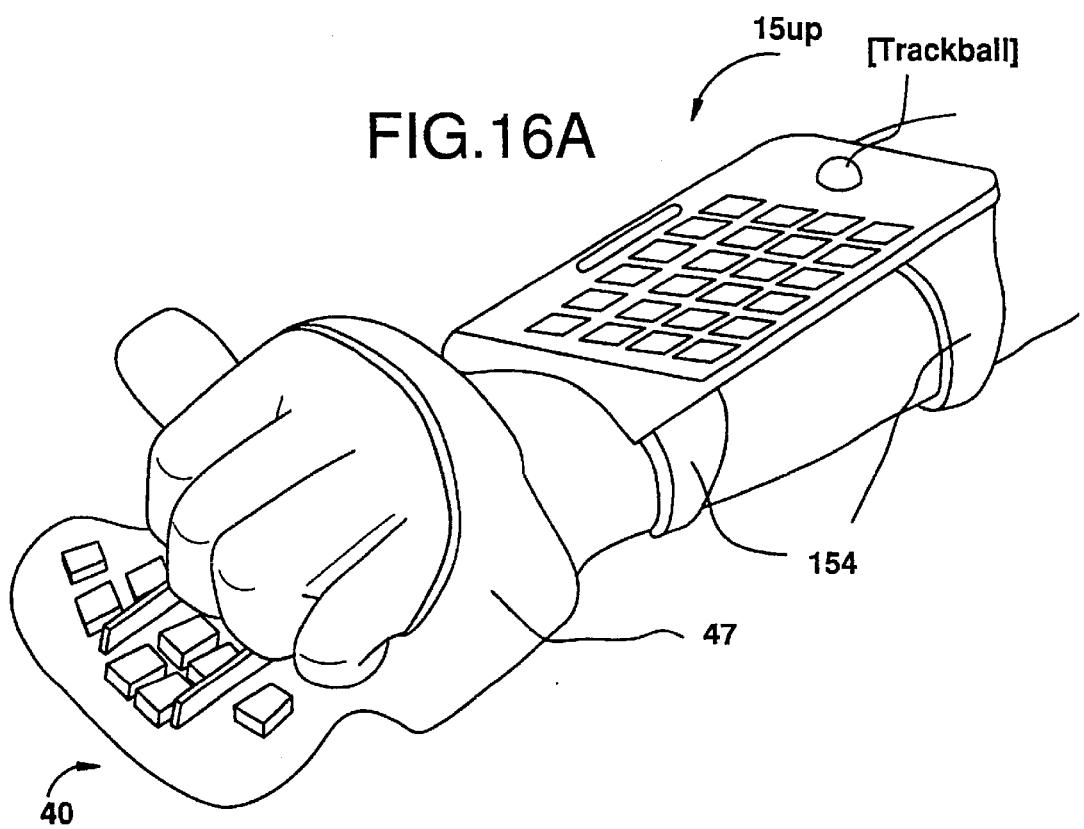
FIG. 16A depicts an Armpiece at an angle which allows an example of the straps which attach the Armpiece to the user's arm to be seen; it also shows a Handpiece which has mounted thereon a strap which holds the user's hand to the Handpiece.

FIGS. 15 and 16A depict the most basic Armpiece and the simplest Contoured Handpiece in use. In this Armpiece, the arm-mounting means, the component mounting means, and the component itself are combined essentially into a single part: a rigid Key Housing with a curved backpad and a fastening device, which together allow the Armpiece to fit around the arm. Typically bearing a plurality of alpha-numeric keys as well as a track-ball, touchpad or other point-and click device, joystick, function keys and/or a number pad, the Key Housing has various equally preferable key configurations. Thus, the Key Housing (150a) depicted in FIG. 15 bears a trackball in the center of the key surface while the Key Housing (150b) in FIG. 16A has a trackball off to one side. As Key Palettes in general can be wired, wireless, or self-contained, an antenna also appears in the former figure but not the latter. Monitors appear on self-contained computer versions or terminal or network computer versions.

Figure 16B:
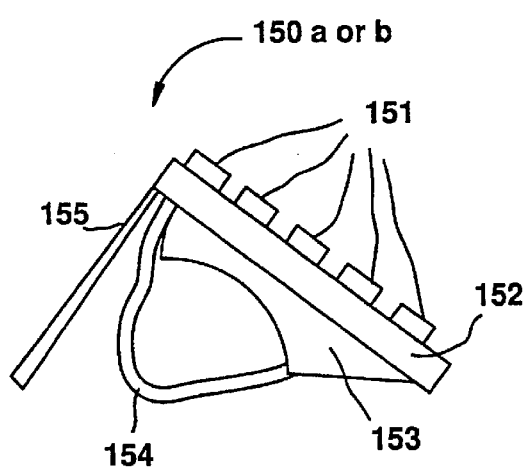
FIG. 16B presents a side view of an Armpiece upon which the keys are set in a plane.

Users who do not want to venture too far away from the traditional keyboard may prefer Armpieces such as those shown in FIGS. 15 (150a) and 16A (150b). These models feature keys (151) which are aligned in a plane and straps (154) which hold the Armpiece to the user's arm. FIG. 16B depicts a side view of such a planar Armpiece. The keys (151) are set on the face of the Key Housing (152). Attached to this Key Housing are a pad (153) and a strap or straps (154) which go around the arm. The pad (153) is covered with a lightweight fabric and may also include inflatable cushions so that the user may precisely adjust its size and shape to fit his or her arm. The strap(s) (154) can be fastened by buckle, snap, button, hook and loop or other known fastener. Also shown is a fold-out "kickstand"-like support piece (155) with rubber grip-stops on its base; this support, in tandem with the housing (152), forms the second leg of a triangle to support the weight of the Armpiece when rested on a table (the table being the third line of the triangle). This design keeps the Armpiece stable and relieves the user's arm of the weight of the Armpiece. An additional semi-rigid sheet, not pictured here, can also be added to connect the end of the kickstand (155) and the bottom end of the plastic housing (152), thereby running under the user's arm so that the entire apparatus forms a self-supporting triangle centered around the user's arm. Such a design allows the Armpiece to be rested comfortably on a variety of irregular surfaces.

Figure 16C:
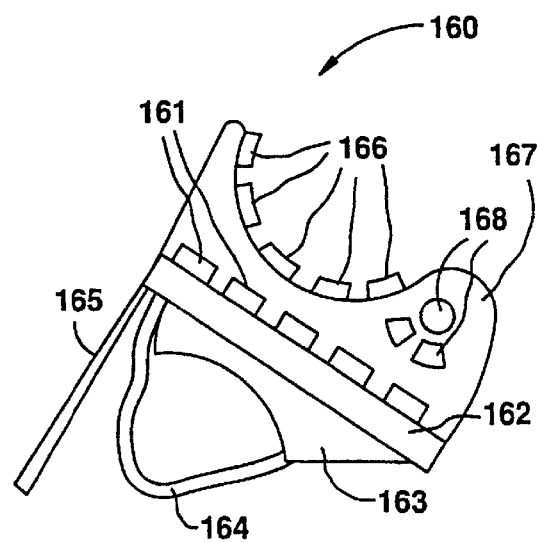
FIG. 16C presents a side view of an Armpiece which provides an area of keys mounted in a Compound Arc shape, a palm-supporting surface at the base of this area, and a planar section of supplemental keys, touchpad, etc., beside the Compound Arc area.

An Armpiece Key Housing which features a contoured Palm Surface and keys aligned to the Compound Arc shape—mimicking the contoured Handpiece with respect to these two features—is an alternative. In this latter design, a cross-section of which appears in FIG. 16C, the planar Armpiece depicted in FIGS. 16A and 16B is replaced with an Armpiece (160) which has a contoured section of keys beside keys set in planar form. Thus, in FIG. 16C, some keys (161) mounted on a planar section (162) of the Key Housing are visible. Depicted behind the visible planar area (162) is the contoured section of keys, which has a Palm Surface (167) and keys (166) set in a Compound Arc. Also, this design features several keys (168) and/or a trackball which are mounted on the thumb side of the Palm Surface (167) for access by the user's thumb. Note that a Thumbpiece is not necessary on the Armpiece. However, as a plug-in extension of the main body of such an Armpiece, a number pad may be set in its own independent Compound Arc and accompanied by a dedicated Palm Surface; it may also be set in standard planar form or omitted altogether. Such an Extension Piece is discussed more fully below. In FIG. 16C, the arm pad (163), strap(s) (164), and kickstand (165) are like those of the planar Armpiece. The pads, straps and hardware housings in all Key Palette embodiments are separable from one another for easy cleaning and repair. They can be attached to one another using snaps, hook and loop fastener, inter-locking grooves, or other such appropriate connecting device.

A strap which holds the user's hand to the Contoured Handpiece is pictured in FIG. 16A; it buckles, snaps or otherwise fastens around the user's hand and may include an elastic section to take up excess slack. In this model which, unlike those described below, does not have rigid Connecting Rods to hold the Handpiece in place, it is this strap which allows the Key Palette to be used while the user is standing or walking. The Handpiece may also be used without using the strap when the Handpiece is resting on its Full-Turn Surface. So that the beginning user does not have trouble learning which Handpiece keys represent which characters, a chart of the characters assigned to each Handpiece key appears on both the back of the Handpiece strap and the Full-Turn Rest Surface of the Handpiece; thus, the user does not have to move his hand away from the keys in order to see which key inputs a given character.

The two pieces of this basic Key Palette are connected to one another through an electrical cable (156) depicted in FIG. 15; if Connecting Rods or a Support Bar is used to connect these two pieces, as in various models below, the cable may be housed therein. Non-self-contained Key Palettes convey keystroke input to the computer either via cable or via wireless transmission to a receiver. In wireless models, a battery or other power supply as well as a wireless transmitter and antenna may be mounted in or on the Armpiece or attached to another part of the user's body, such as the upper arm, shoulder or belt, as in the case of belt attachments used to transmit wireless musical instrument signals; a receiver is placed next to and connected by cable to the computer or other device to which signal is transmitted. An example of antenna (157) placement for wireless transmission is shown in FIG. 15. Given the limitless mobility of the Key Palette, wireless transmission is inevitable and desirable.

A note on key designation: for users who do not wish to venture too far from the QWERTY keyboard skills which they have already developed, character-to-key assignments which maintain the same basic finger-to-letter relationship (i.e., the left hand first finger gets the "F" key) are used on some Key Palette models. For people who are just starting out on a keyboard or people who would prefer to learn a more efficient keyboarding system, modern key formats (Dvorak, Einbinder, etc.) may be used on some models. The present invention is equally appropriate for use in any specialized key setting, such as those specialized key designations and patterns used by the military, court stenographers, etc. Finally, models which include a switch which selects key pattern are also contemplated: when this switch is in "QWERTY" position, for instance, the character-to-key assignment of the keys is that which most corresponds to the QWERTY keyboard; when this switch is in "MODERN" position, the key designations are those which maximize efficiency.

FIG. 17A depicts an Armpiece (170) upon which is mounted a computer monitor (177) and which contains its own computing and/or word processing hardware and software and/or power supply. For ease of access, the computing hardware and power supply may be mounted on the other side (176) of the user's arm from the side which bears the Key Housing. The monitor (177) and its housing may be set on hinges (not visible) so that the screen can fold down and lock into place over the key surface, thereby protecting both monitor and keys when the Key Palette is not in use.

FIG. 17B depicts a side view of the fully portable computer with monitor depicted in 17A. Keys (171), rigid Key Housing (172) and strap(s) (178) are like those of the dedicated keyboard model, but this model also incorporates additional space for computing equipment (176), such as a processor, hard and/or floppy drive, modem, various ports, etc., a monitor (177), and two optionally-inflatable pads (173 and 175). The user's arm fits in the center space (174).

FIGS. 18A, 18B and 18C depict an alternative embodiment in which two Contoured Handpieces (180a and 180b) are joined together in opposition to one another; they may also be separated and used independently. FIG. 18A provides an example of how these two Handpieces, each with its own keys (181), Thumbpiece (182), etc., may be connected. In this example a ball-and-socket joint (183) is used, but other known joints may be preferable for given uses. FIG. 18B shows a top view of one such Handpiece perfectly obstructing the view of the other. FIG. 18C shows a top view of the two joined Handpieces once they have been turned in opposite directions laterally for the user's comfort.

Figure 19A:
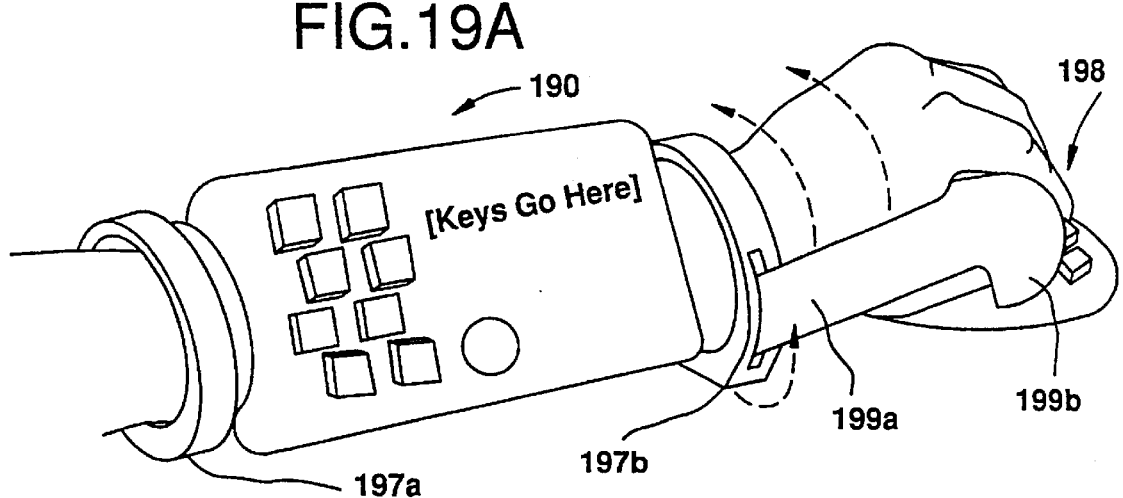
FIGS. 19A and 19B depict a Key Palette the Armpiece of which includes a double-layer tube which goes around the user's forearm and which terminates at each end in a rounded collar; also depicted therein is a Handpiece which locks onto the wrist-end collar of the tubular Armpiece. In this way, the Handpiece and interior layer of the tube turn with the user's arm, while the outer layer and the Key Housing mounted thereon turn or remain stationary independently of the motion or position of the interior layer.

The Armpieces depicted thus far have included Key Housings which are directly attached to or part of the arm-mounting means and which are therefore basically fixed in one position on the user's arm. While simple, such a model is not ideal. Thus, FIG. 19A depicts an Armpiece (190) (monitor omitted for simplicity) which consists of an arm-mounting means called a Double-Layer Tube and upon which is mounted a Key Housing similar to that of other Key Palette models. This Tube consists of an interior layer which is made of lightweight, semi-flexible material and lined with pads that can be adjusted or inflated to fit the user's forearm. The outer layer of the Tube consists of a semi-rigid material and fits around the interior layer; this outer layer locks into the collars (197a and 197b) which protrude from each end of the interior layer so that the two co-axial layers can remain together while still being able to revolve independently of each other. The Armpiece Key Housing is mounted on the outer layer of the Tube so that it can remain in one place while the interior layer turns as the user turns his forearm (radius and ulna). The Tube layers need not be made of solid sheets of material; they may be porous or screen-like to improve ventilation and weight of the device; they need only be rigid enough to support the Armpiece Key Housing and the Handpiece while also allowing independent motion of these components.

Figure 19B:
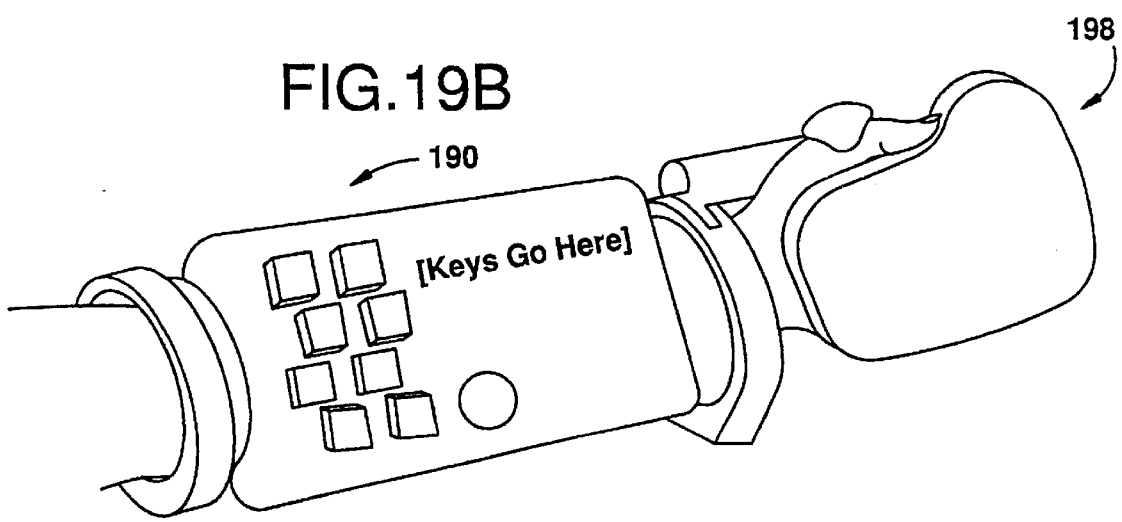

Also depicted in FIG. 19A is a Handpiece (198) which locks onto the wrist-end collar (197b) so that this Handpiece may, along with the interior layer of the Armpiece tube, track the motion of the user's forearm, rotating independently of the Armpiece Key Housing. FIG. 19B depicts the Key Palette pictured in FIG. 19A after the user's hand has been turned. While the depicted model has but a single Connecting Rod (199a) which connects the Thumbpiece (199b) of the Handpiece (198) to the wrist-end collar (197b) of the Armpiece, a second such Rod can also be incorporated to connect the body of the Handpiece to the wrist-end collar. Such a Connecting Rod may, for example, protrude from the Full-Turn Rest Surface of the Handpiece.

Figure 19C:
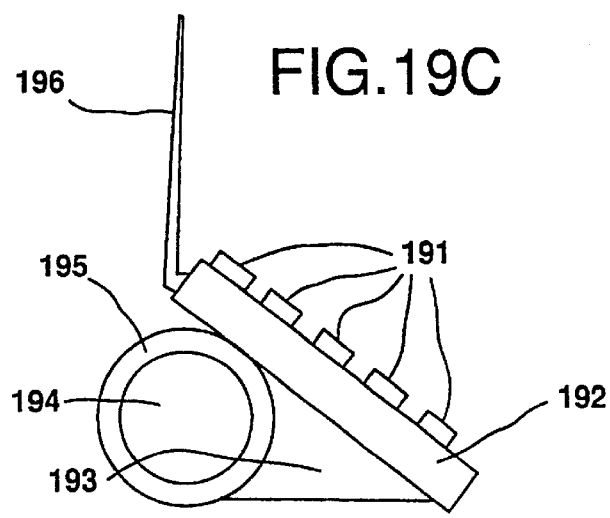
FIG. 19C presents a side view of a tubular Armpiece such as that depicted in FIGS. 19A and 19B.

FIG. 19C depicts a side view of this tubular Armpiece (190), wherein the keys (191) are mounted on the face of a rigid Key Housing (192). The model depicted includes a space for a foam and/or inflatable pad (193); this space (193) may also be used to house computing equipment (processor, hard drive, etc.) for fully portable, self-contained computer models. In FIG. 19C, the user's arm occupies the space (194) inside the tube (195); as described above, the interior layer of this tube may be made of a flexible material and lined with, typically, a pad and/or inflatable cushions which can be adjusted to fit the arm, while the outer layer is made of a more rigid material. The tube itself can alternatively be constructed in such a way as to be essentially a very wide belt, so that it can be let out or taken in and then be fastened so as to fit the user; the Key Housing of such an alternate design is mounted in vertical or horizontal slots, on horizontal or vertical rails or on Ring Tracks, all of which are discussed below.

The Connecting Rods joining the Handpiece and Armpiece of this Key Palette model can be made in a collapsible "telescope" fashion such as that described in the discussion of FIG. 22B below. Some Handpiece models also feature wired sockets on each collar of the Double-Layer Tube into which Connecting Rods may be inserted so that Handpieces can be easily removed and replaced, allowing left-handed and right-handed Handpieces to be used interchangeably in conjunction with the same Armpiece.

Figure 20:
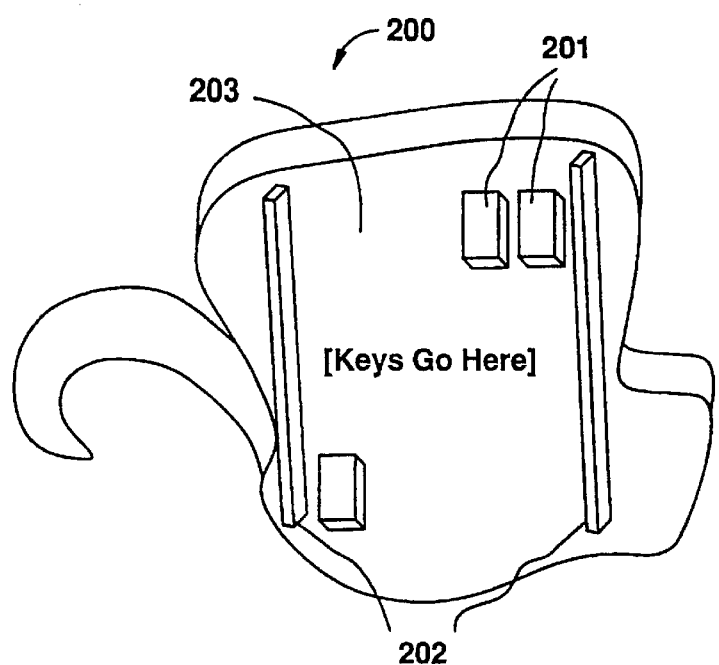
FIG. 20 depicts a bottom view of a Handpiece with keys mounted on its Full-Turn Rest Surface as well as rails which protrude beyond the tops of these keys and thereby keep these keys from coming into contact with a flat surface when the Handpiece is rested thereupon.

FIG. 20 depicts a Contoured Handpiece (200) with keys (201) mounted on its Full-Turn Rest Surface (203) as well as rails (202) to keep these keys from coming into contact with a flat surface when the Handpiece is rested thereupon. The keys on the underside of this Handpiece can be those of a calculator-style number pad or, alternatively, letter or function keys.

Figure 21:
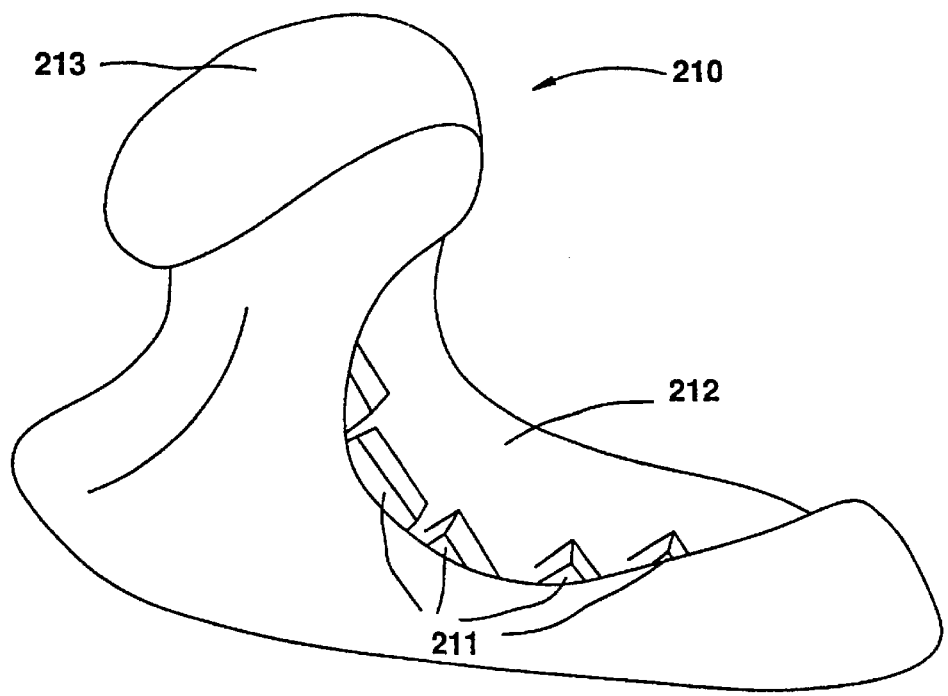
FIG. 21 depicts a Handpiece the keys of which are oriented so that their faces are parallel to one another rather than tangential to the Compound Arc which they are set.

FIG. 21 depicts a Handpiece (210) like that (40) pictured in FIG. 7, except that the keys (211) of this alternative Handpiece are oriented so that their faces are parallel to one another rather than tangential to the Compound Arc in which they are set. Guiding Wall(s) (212) and Thumbpiece (213) are like those in other models.

Figure 22A:
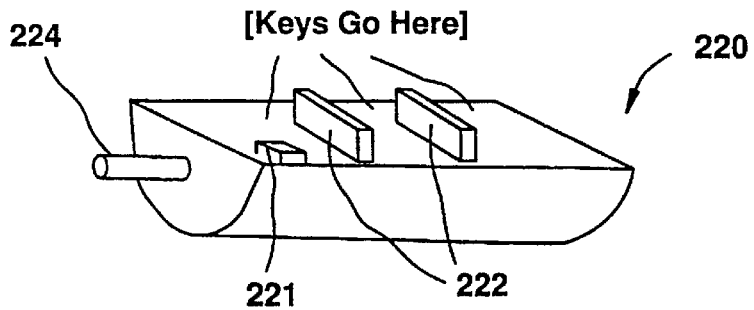
FIG. 22A depicts a Guitar-Neck-Shaped Handpiece which directly resembles a segment of a guitar neck in its half-cylinder-like shape; the keys are mounted on the surface which corresponds to a guitar neck's fretboard.

FIG. 22A presents a view of the Guitar-Neck-Shaped Handpiece. In this example, the Handpiece (220) is sized and shaped almost like a segment of the neck of a guitar. Keys (221) are placed on the surface which would correspond to the guitar neck fretboard, and optional or removable Guiding Walls (222) may be installed to separate the columns of keys as in above Handpieces.

Figure 22B:
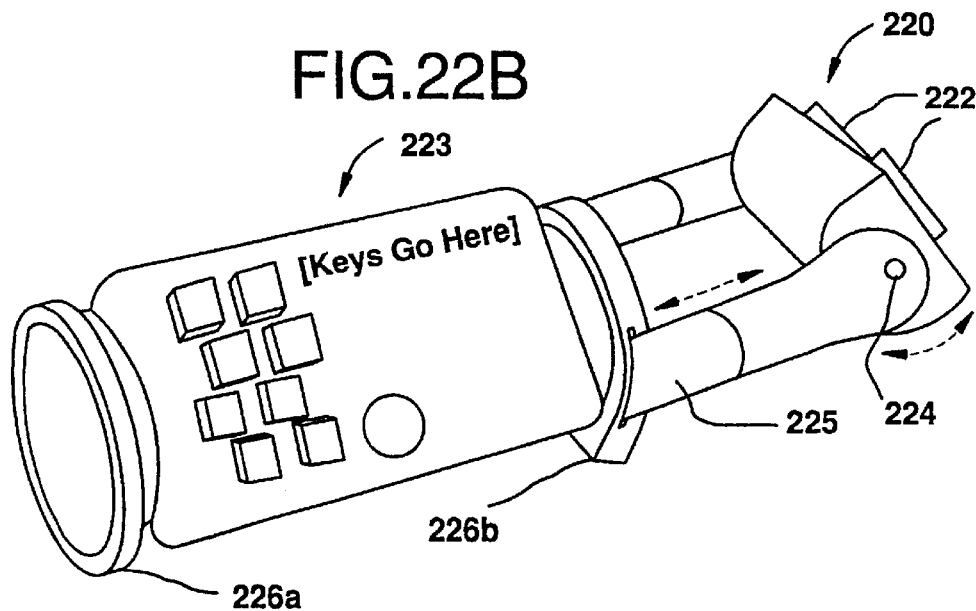
FIGS. 22B and 22C depict a Handpiece such as that shown in FIG. 22A mounted upon a tubular Armpiece such as that pictured in FIG. 19A and shown in side view in FIG. 19C.

FIG. 22B shows the Handpiece (220) depicted in FIG. 22A after it has been mounted onto a Double-Layer Tube (223) such as that depicted in FIGS. 19A, 19B and 19C. The Connecting Rods (225) are telescope-like, meaning that, by consisting of a series of successively narrower tubes which fit inside one another, the Connecting Rods can expand and retract to fit the length of any given user's arm. The Handpiece is mounted on a pin (224) which protrudes from each side into or from the Connecting Rods (225) so that the Handpiece may spin around these pins to any angle which fits the user's hand while the Rods remain stationary; electrical signal is typically carried through one or both of these pins (224), which are in contact with electrical connection sockets within the Connecting Rods (225); through this connection, signal is conducted back and forth between the Armpiece (223) and Handpiece (220). Meanwhile the Connecting Rods (225) are mounted onto the wrist-end collar (226b), so that the entire Handpiece apparatus, consisting of Connecting Rods (225) and Handpiece (220), turns with the interior layer of the Armpiece tube as the user twists his or her forearm.

Figure 22C:
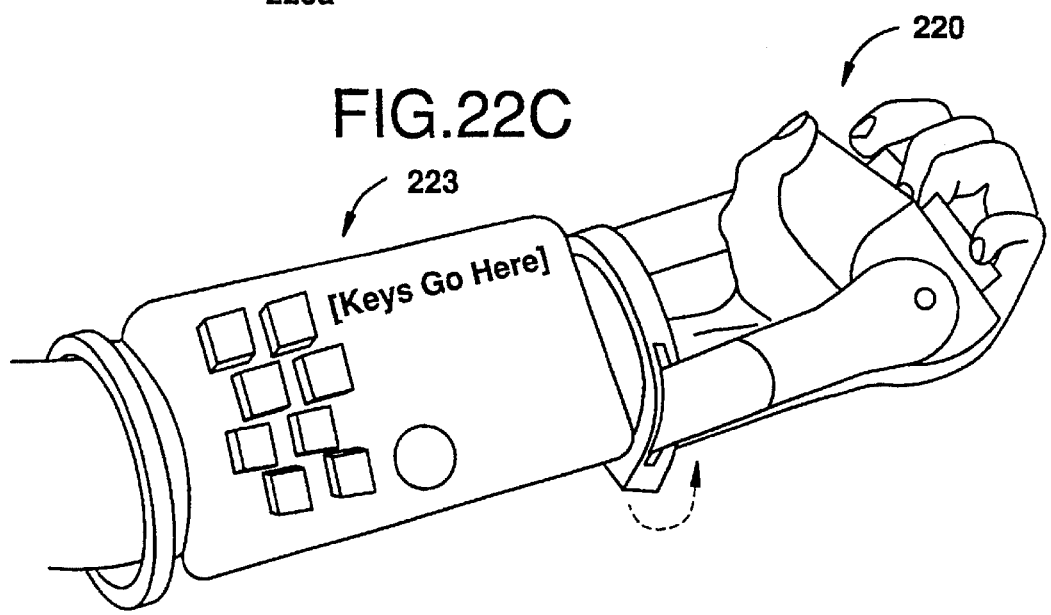

FIG. 22C shows the Key Palette depicted in FIG. 22B in use.

The Handpiece pictured in FIG. 22A can also feature a curved key surface rather than a flat one, so that keys are set in a Compound Arc or other advantageous curve.

Another means of arm-mounting, called Radio-Ulnar Bars, and another means of active component mounting, called Ring Tracks, are depicted in FIGS. 23 through 30. First, FIG. 23 depicts the core parts of this alternative embodiment including a Handpiece (230), such as that used in other models, and expandable/contractible Connecting Rods (231) such as those depicted earlier. Also pictured are the Radio-Ulnar Bars (232). These bars are designed to correspond to the two bones, the radius and ulna, of the user's forearm which bears the Key Palette. When the user turns his forearm by turning his radius bone around his ulna, the two Radio-Ulnar Bars (232) turn with these bones. In this way, the Handpiece (230), which is connected to the Radio-Ulnar Bars (232) by way of the Connecting Rods (231), remains in the same position with respect to the user's hand regardless of which way the user turns his wrist.

Mounted upon these Radio-Ulnar Bars (232) are two Ring Tracks (233). These Ring Tracks are two circular, rigid rings upon which is to be mounted an Armpiece Key Housing (not pictured in FIG. 23), which locks onto the Ring Tracks (233) like a rollercoaster car so that it can revolve around the user's arm while the Radio-Ulnar Bars (232), the Connecting Rods (231) and the Handpiece (230) remain in the same spatial position relative to the user's forearm, wrist and hand. Partial or full circle Ring Tracks can be mounted on any arm-mounting means.

Figure 24B:
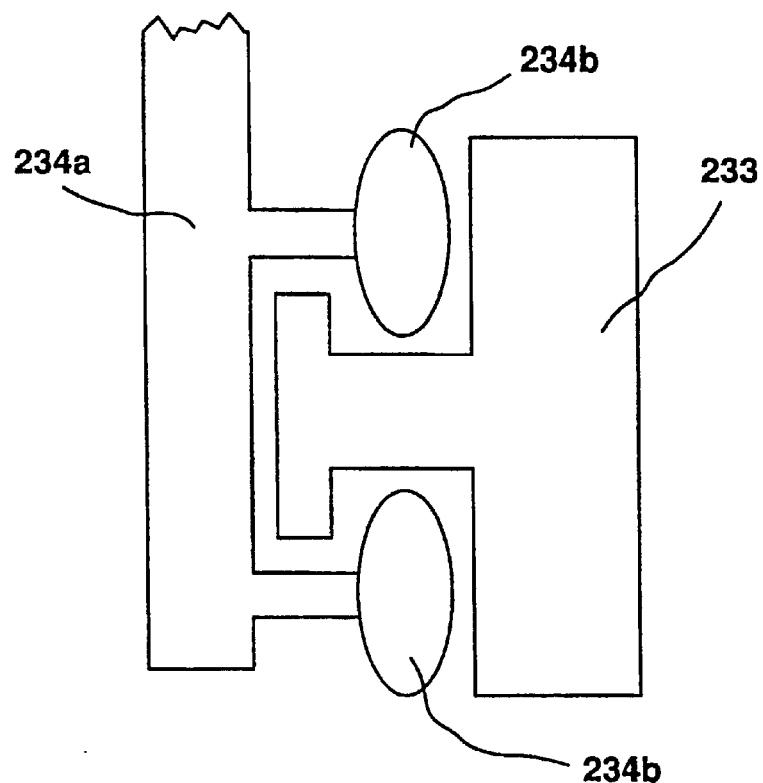
FIGS. 24B and 24C depict close-up cross-sections of the Ring Tracks and the manner in which the "legs" of the Key Housing attach thereto.
Figure 24C:
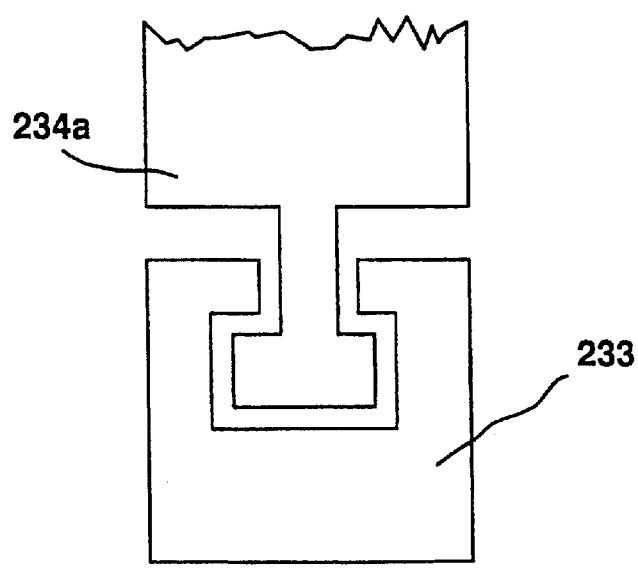
Figure 25A:
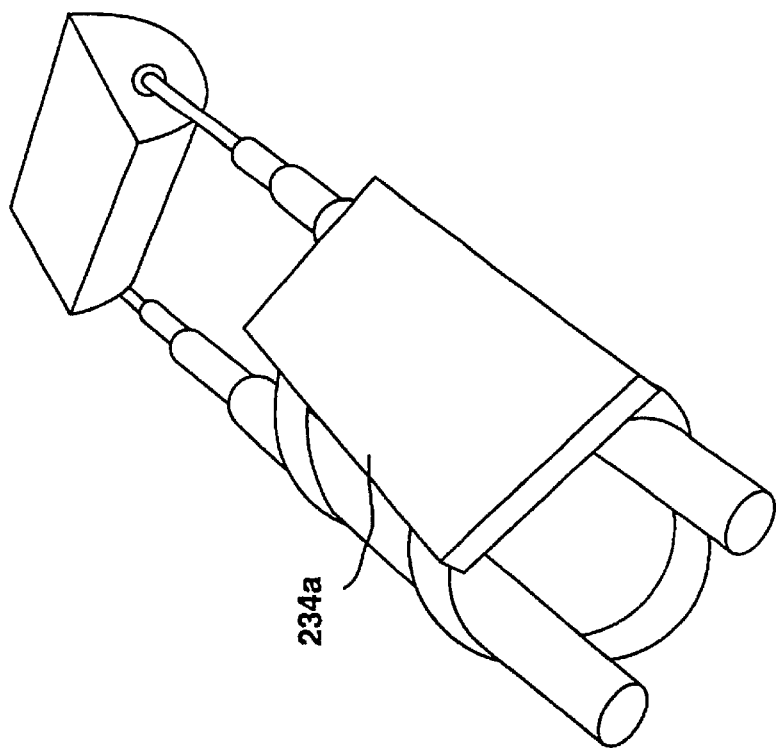
FIGS. 25A and 25B depict the Key Housing added in FIG. 24 as it revolves around the user's arm to different positions along the Ring Tracks.
Figure 25B:
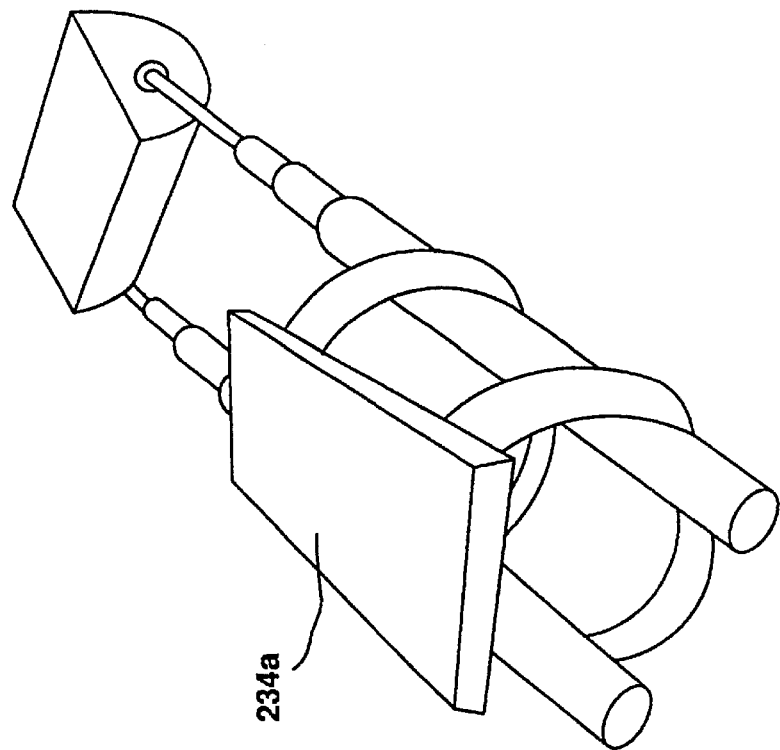

FIG. 24A presents a view of the same Key Palette upon which has been mounted an Armpiece Key Housing (234a). Such mounting is typically achieved by locking the base "legs" of the Key Housing into slots or tracks on the Ring Tracks or by mounting two sets of wheels or rollers on the base "legs" of the Key Housing so that they can grip the Ring Tracks from above and below. FIG. 24B shows a close-up cross section of a Ring Track (233) upon which the base of the Key Housing (234a) (most of which has been omitted from view; only the "leg" is showing) is mounted in such a way that its wheels (234b) grab the Ring Track. FIG. 24C demonstrates another way in which the Key Housing (234a) locks into a Ring Track (233). This Key Housing can thus turn around the user's arm on the Ring Tracks (233), as shown in FIGS. 25A and 25B.

Figure 26:
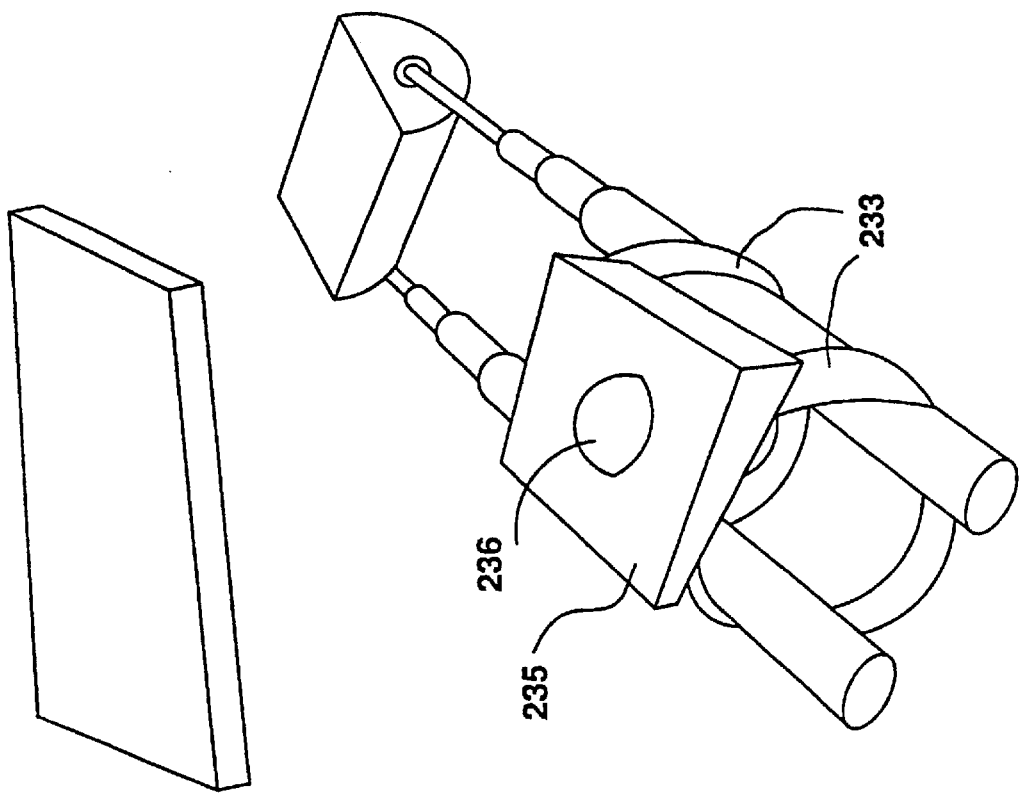

FIG. 26 shows a Key Housing Mount (235) which is mounted upon the Ring Tracks (233) in the same way that the Key Housing in FIGS. 23 through 25B is mounted on the Ring Tracks. It thus has the same revolving motion potential as the above depicted Key Housing. Protruding from the middle of this Key Housing Mount (235) is a ball (236) which is part of a ball-and-socket joint.

Figure 27:
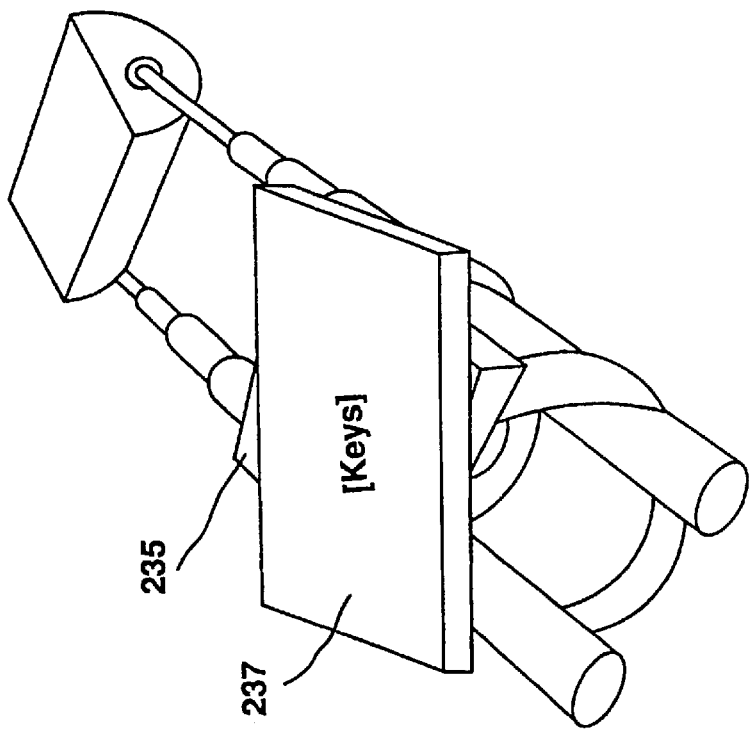

FIG. 27 depicts a Swiveling Key Housing (237) which has been mounted upon the Key Housing Mount (235), specifically, upon the ball (236) of the ball-and-socket joint depicted in FIG. 26. By virtue of its being mounted upon on a ball-and-socket joint, the Swiveling Key Housing can tilt to an infinite number of different angles with respect to the rest of the Key Palette and the user's arm. Similarly, this Swiveling Key Housing can be turned with respect to the entire Key Palette. One useful alternative to ball-and-socket mounting in this case is the use of a simple revolving disk or short, hollow rod, upon which the Swiveling Key Housing can be mounted so that it can spin on the axis disk or rod; of course, such mounting enables full spinning or swiveling but does not allow tilting of the Key Housing.

Figure 28:
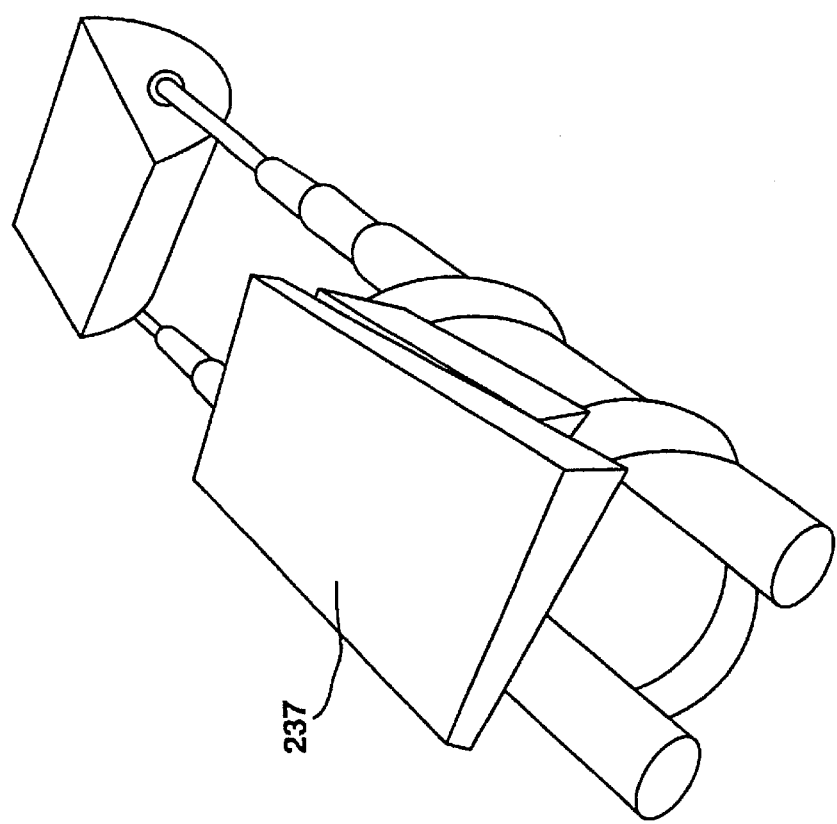

FIG. 28 depicts the same Swiveling Key Housing (237) after it has been turned with respect to the rest of the Key Palette.

Figure 29:
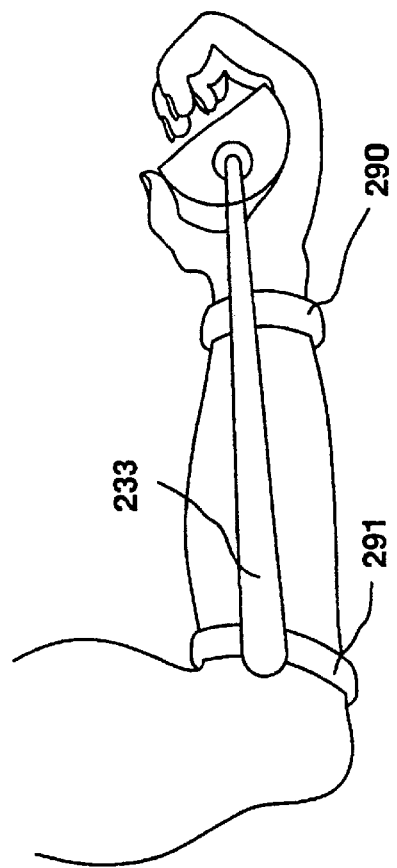

FIG. 29 is an illustration of one way in which the Radio-Ulnar Bars (240) may be mounted to the user's arm so that they will track the motion of the user's radius and ulna bones. In this illustration, the Ring Tracks and Armpiece Key Housing are omitted for clarity. The heretofore unpictured Wristlock (290) may typically consist of a semi-rigid material such as plastic. It can be adjusted to fit the width of the user's arm but must be rigid and snug enough to keep the Radio-Ulnar Bars in the desired place relative to the user's arm. The heretofore unpictured elbow straps (291) are similar but may alternatively consist of a more flexible and elastic fabric such as nylon and may be adjusted by the use of a fastener such as buckle or hook-and-loop fastener.

Figure 30:
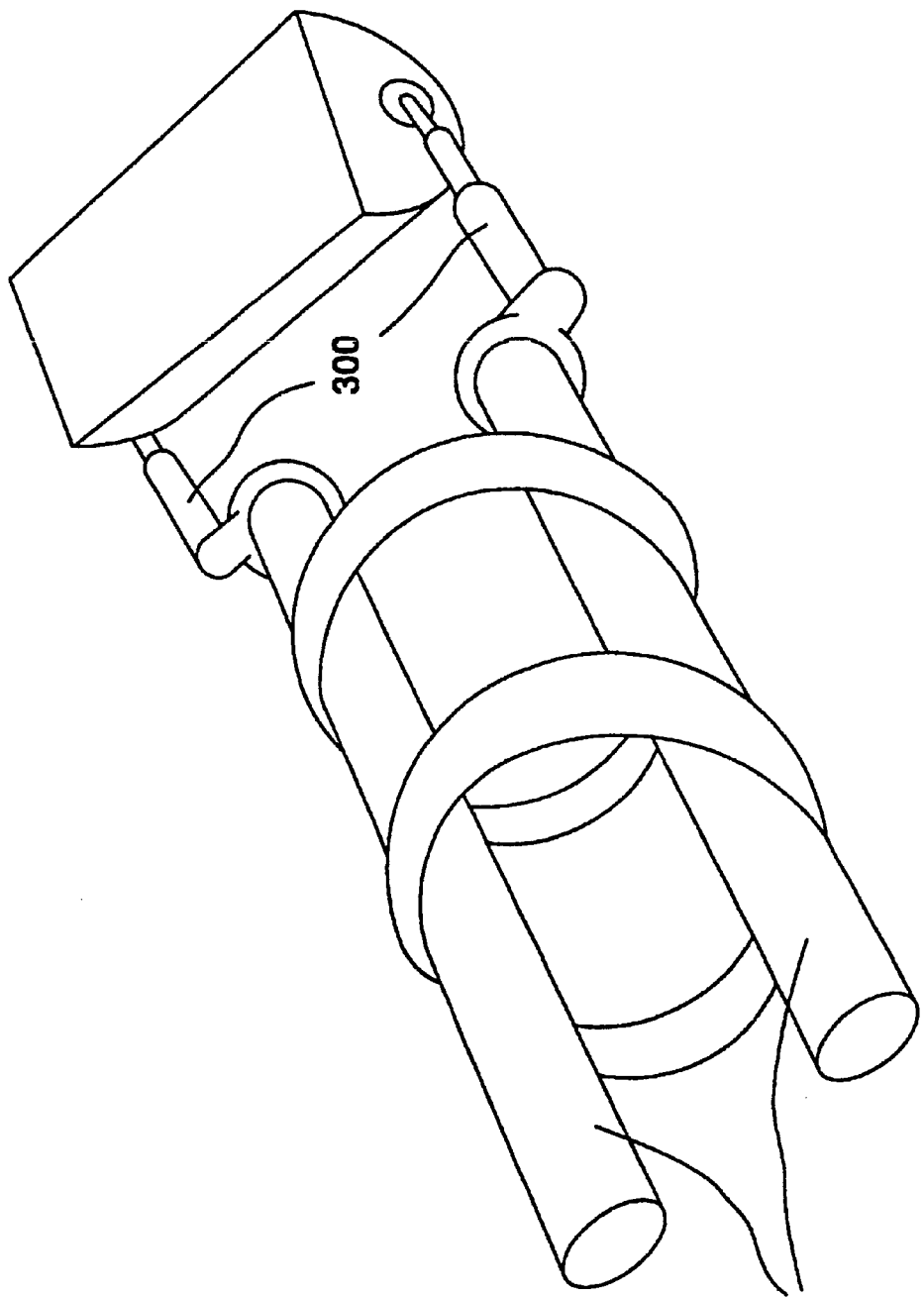

One advantageous variation is that in which the Connecting Rods are spaced farther apart than the Radio-Ulnar Bars. Such a design allows for a wider Handpiece as well as for more space for the user's hand. Thus, FIG. 30 depicts a model wherein the Connecting Rods (300) branch off from the Radio-Ulnar Bars (233) as shown.

A Key Housing with an attached display monitor can also be used with this embodiment. As with most Key Palettes used for computing purposes, such a monitor may be of any size, ranging from one which can only display a few lines of text, to one which is similar to palmtop or laptop monitors. Alternatively, the Key Housing Mount (235) can be employed as a Monitor Mount to bear directly a display monitor or pen tablet, as in the Dedicated Monitor Armpieces described below.

Figure 31:
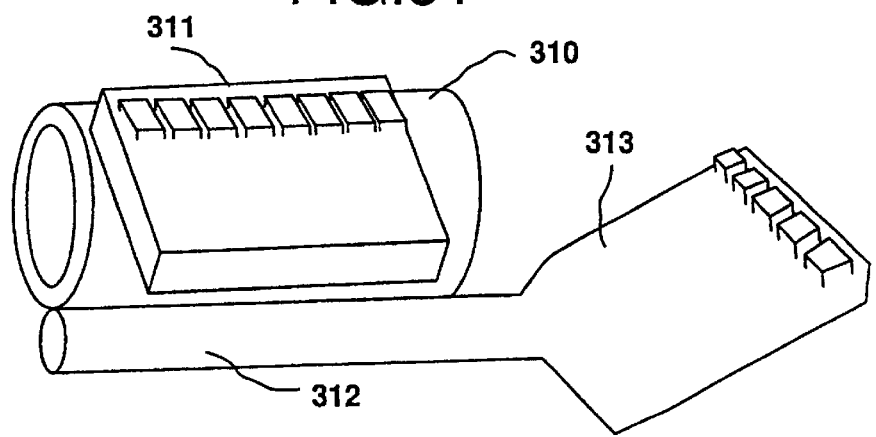
FIG. 31 depicts another Key Palette embodiment, in which a Handpiece is mounted on a Support Bar which protrudes from the underside of a tubular Armpiece, so that the keys on the Handpiece are accessed by the hand which bears the Key Palette as though a desktop keyboard were being used by hand.

Some users may prefer the embodiment demonstrated in FIG. 31. It offers the advantage of providing a very intuitive interface. In this model, the arm-mounting means is a padded, adjustable or inflatable tube (310) (not a Double-Layer Tube, since independent Handpiece motion is unnecessary in this embodiment) upon which is mounted a Key Housing (311). The Handpiece (313) resembles one half of a typical desktop keyboard. It is suspended in front of the user's hand so that it may be accessed by that hand in typical QWERTY keyboard fashion. Suspension of such a Handpiece is accomplished by use of a solid Support Bar (312) which is attached to the bottom of the Armpiece, running under the user's forearm and protruding out therefrom to support the Handpiece. The Armpiece Key Housing in such a model may be mounted on a Key Housing Mount which is in in turn mounted on any means of active component mounting so as to allow revolving, swiveling and/or tilting. The Support Bar may be constructed so that its underside is flat and wide enough for the user to rest the entire Key Palette on the Support Bar when a resting surface (desk, counter, etc.) is available. The exterior portion of the Support Bar can also be constructed so as to be expandable and retractable, as the Connecting Rods are in other models. A joystick and/or Simplified Handpiece, such those described below, can alternatively be mounted on such a Support Bar.

Figure 32A:
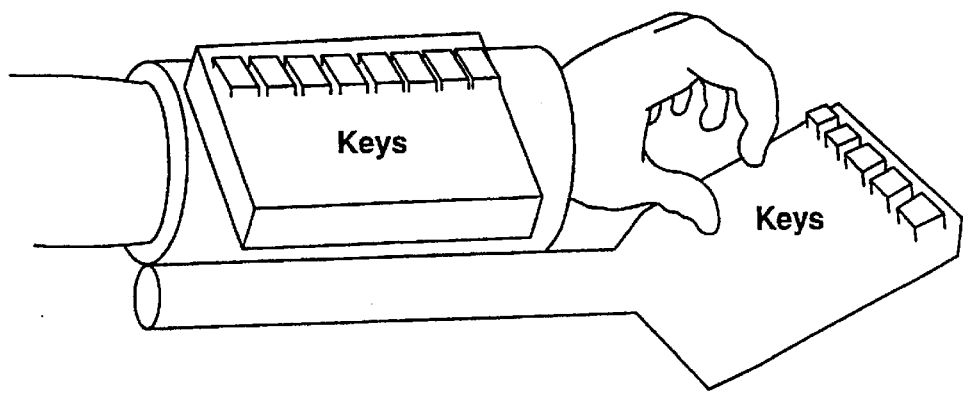
FIG. 32A depicts the Key Palette in FIG. 31 in use.
Figure 32B:
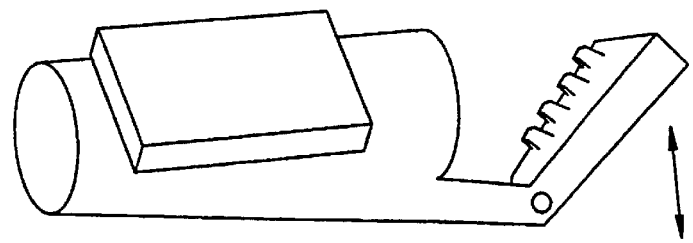
FIG. 32B depicts a side view, of this embodiment with a hinged Support Bar.

FIG. 32A depicts this latter design in use. FIG. 32B depicts a side view of such a model wherein the Support Bar and the Handpiece meet in a hinge.

Figure 33A:
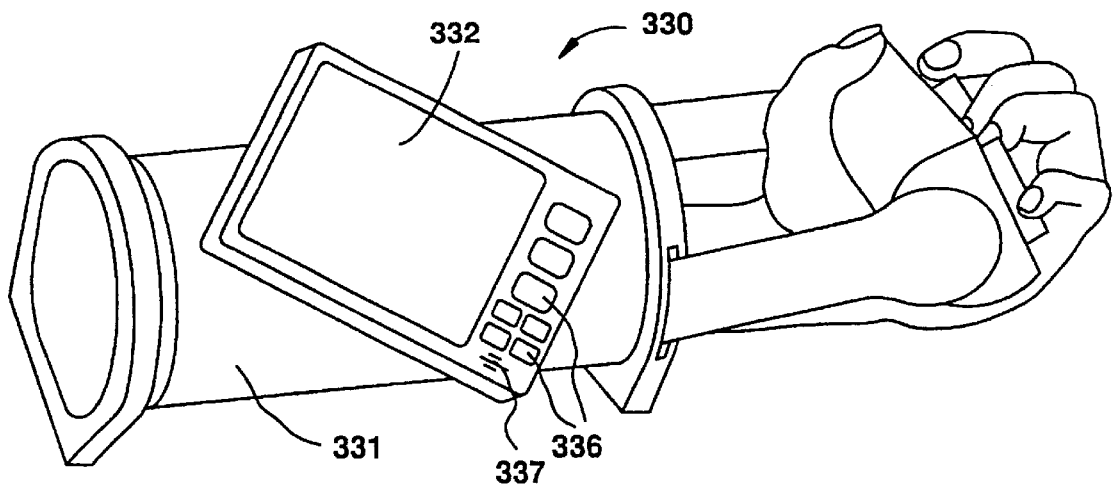
FIG. 33A depicts a Key Palette with a Dedicated Monitor Armpiece.

FIG. 33A depicts a Dedicated Monitor Armpiece (330), wherein a Double-Layer Tube (331) bears a Swiveling Monitor (332), which can revolve around the user's arm by action of the Double Layer Tube, which has been discussed in detail in reference to FIG. 19A. Furthermore, the depicted monitor is attached to the Double-Layer Tube by way of ball-and-socket joint, just as a Swiveling Key Housing attaches to a Key Housing Mount as in FIGS. 26 and 27. Thus, this Monitor can tilt and swivel on the ball-and-socket joint as well as revolve around the user's arm.

Dedicated Monitor Armpieces can hold standard monitors, interactive touchscreens, pen tablets or other forms of monitor. Just like Key Housings, these monitors can be attached to the various alternative means of arm-mounting by the various means of active component mounting which have been disclosed. Pictured on this monitor are sample buttons and keys (336) for monitor controls (brightness, color, etc.) as well as for supplementary data input. A microphone (337) may be included for use with voice-recognition software, although a separate headset microphone or other means of audio input can be used and connected via cable or wirelessly to the Key Palette. Data processing or wireless transmission/reception equipment can be housed inside the monitor casing or mounted elsewhere on the Key Palette as per other models.

Figure 33B:
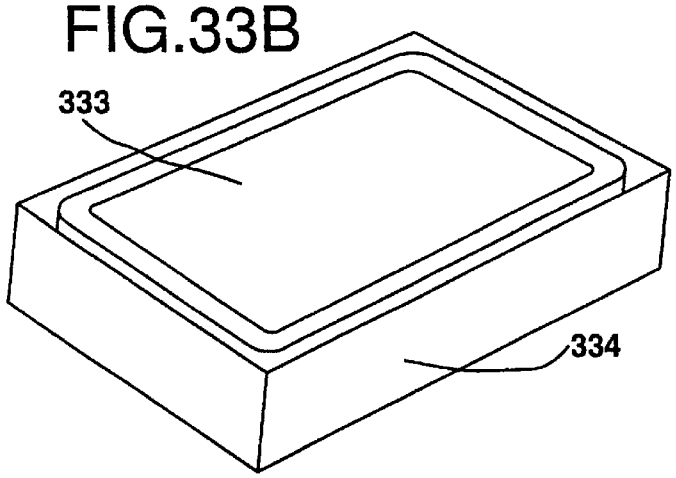
Figure 33C:
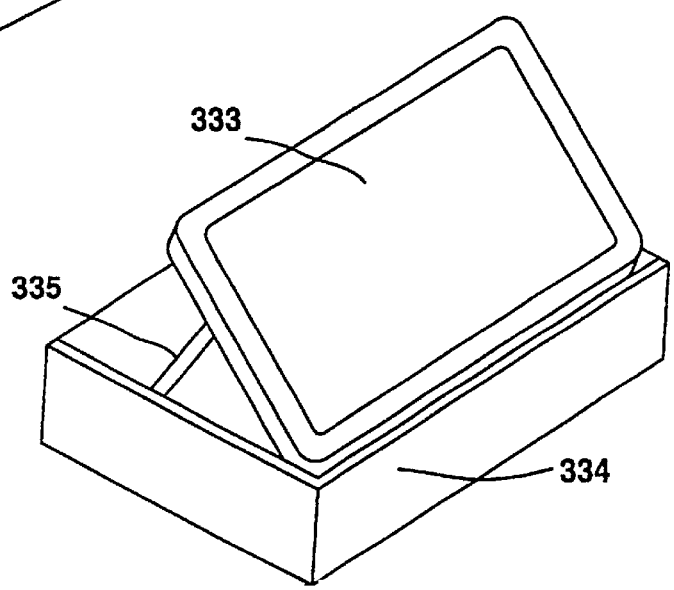

The Tilting Monitor (333) depicted in side view in FIGS. 33B and 33C rests in its housing (334) when no tilting is necessary but can be raised on an adjustable prop rod (335) to different angles to fit the user's preferences. Such a Monitor can serve as the Swiveling Monitor (332) depicted in FIG. 33A when, instead of a ball-and-socket joint, said Monitor is to be connected to the given arm-mounting means by way of revolving disk or rod.

Figure 34A:
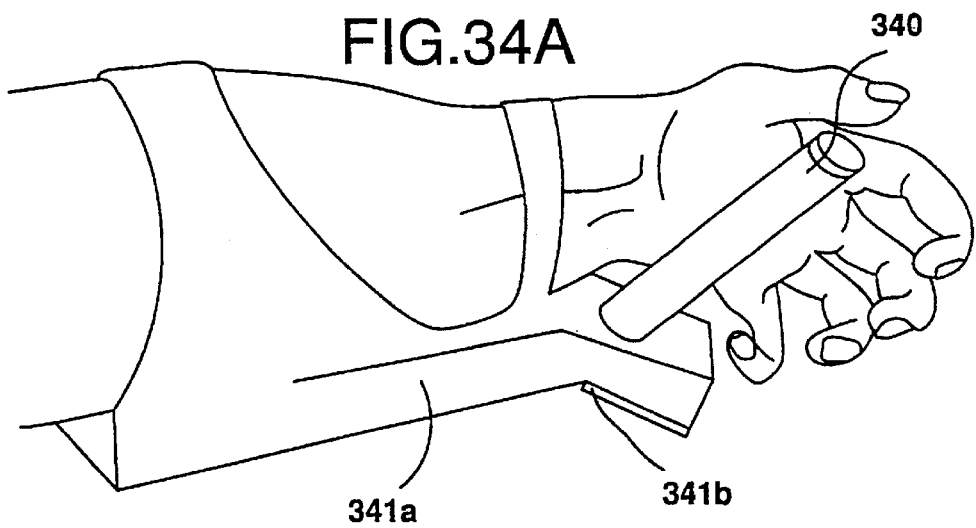
FIG. 34A a Joystick Simplified Handpiece.

FIGS. 34A through 34D show some of the many versions of the Simplified Handpiece which are used in conjunction with a variety of the Key Palettes yet to be described. FIG. 34A depicts a Joystick Simplified Handpiece (340) mounted on a Support Bar (341a), which is in turn suspended from an arm-mounting means (in this case, simple straps). This Handpiece (343) bears several keys for access primarily by the user's thumb. It is also well-suited for use as an arm-mounted computer gaming joystick or as a Musical Key Palette addition. Note that the Support Bar has a bend (341b) to allow for an advantageous angle at which the Handpiece rests with respect to the hand. A housing can be added to the pictured Armpiece to carry extra buttons/keys.

Figure 34B:
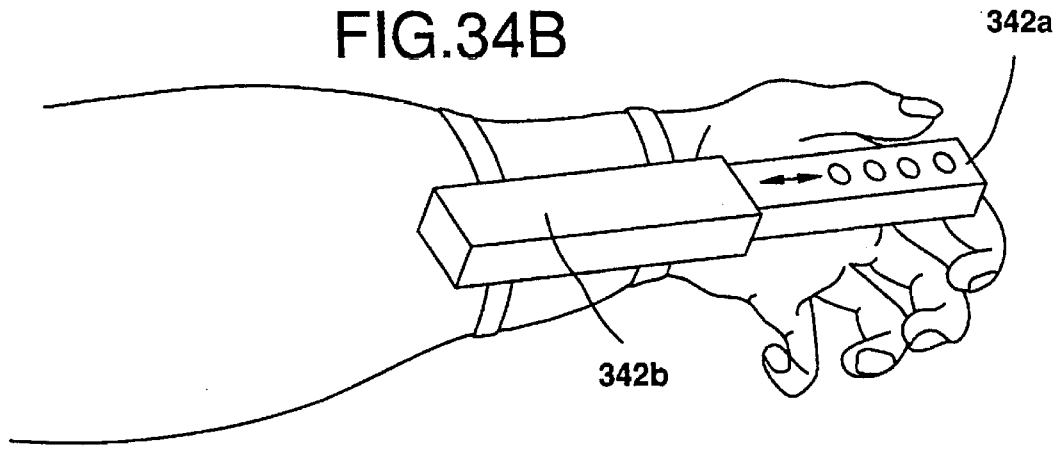
FIG. 34B, a Collapsible Simplified Handpiece.

A Collapsible Simplified Handpiece (342a) is depicted in FIG. 34B. It may be used in Key Palettes which are dedicated to serving a single function, such as that of a remote control, speakerphone, or audio recorder. It can be pushed into its arm-mounting sheath (342b) as shown and is loaded on springs so as to pop out easily on demand.

Figure 34C:
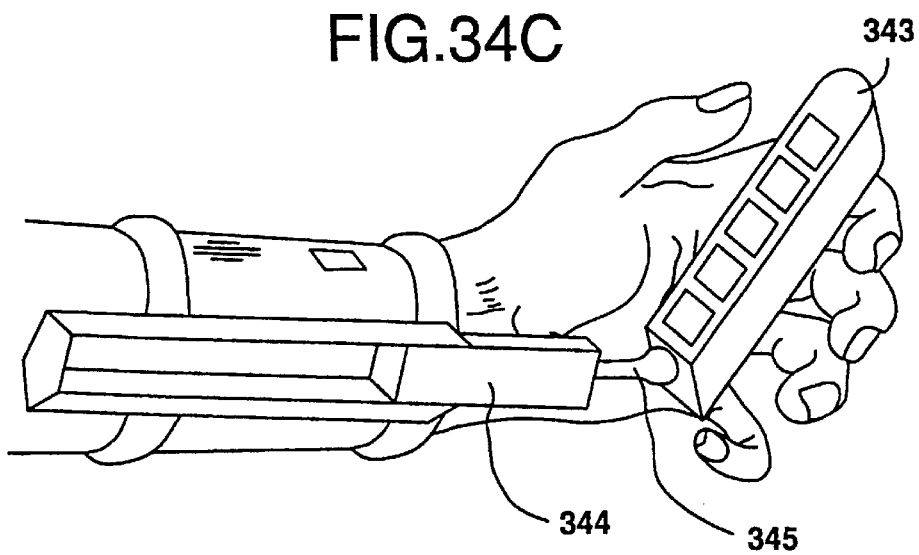
FIG. 34C, a "Springy" Simplified Handpiece.

A Springy Simplified Handpiece (343) is depicted in FIG. 34C. It is attached to the Support Bar (341) by way of a flexible, elastic or "springy" rod (344), constructed of rubber or similar substance or constructed as an actual coil. This rod allows the Simplified Handpiece to be bent in any direction to maximize the comfort of the user's hand and then, when released, spring back into a straight-line with the Support Bar so that it can be retracted into the Support Bar and/or so that both the Simplified Handpiece and Support Bar can be retracted into the slot on the Armpiece. Such a Handpiece is, for instance, ideal as a supplementary manual input device for use with a Dedicated Monitor Armpiece. A rigid rod can be substituted for the springy rod if a ball-and-socket joint or revolving joint is used to attach the Handpiece thereto. The buttons/keys remain accessible when the Handpiece is retracted.

Figure 34D:
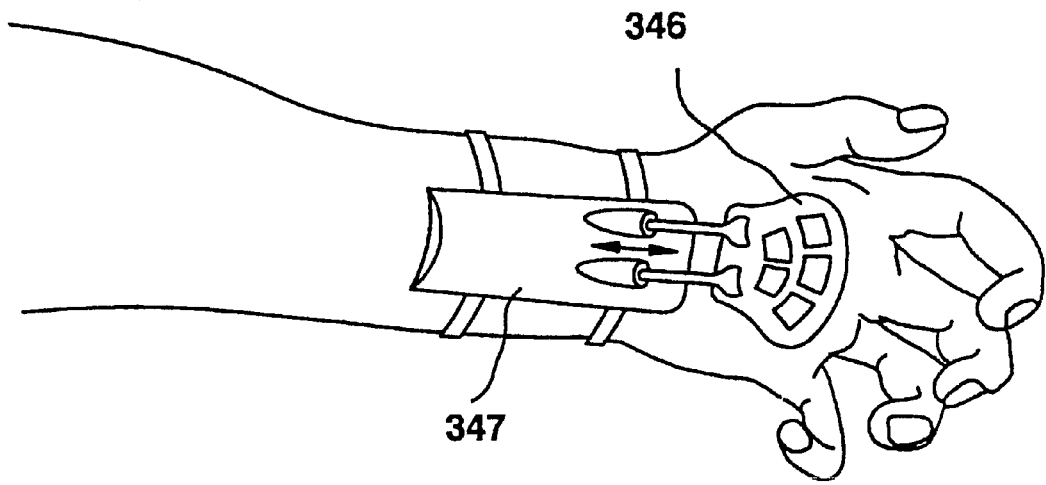
FIGS. 34D and E, a Palm-Mounted Simplified Handpiece.
Figure 34E:
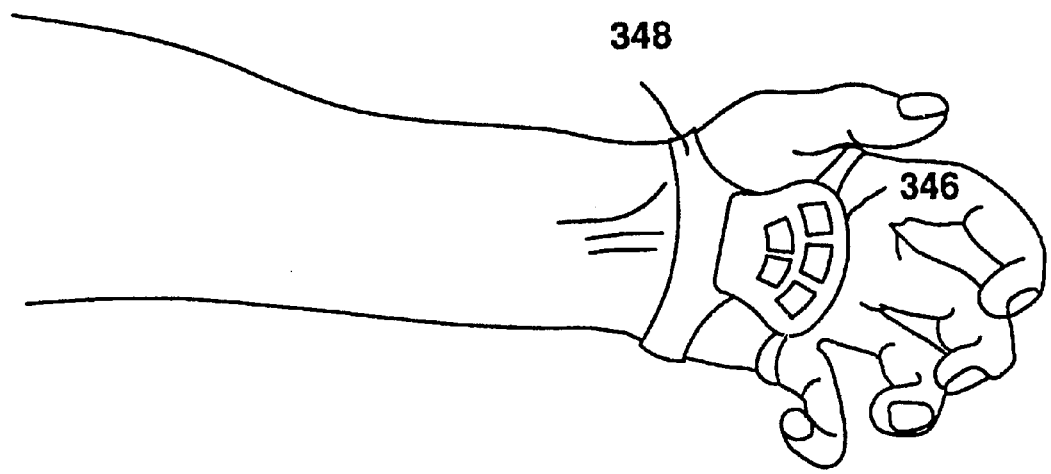

A Palm-Contact Simplified Handpiece (346) bearing just a few keys is depicted in FIGS. 34D and 34E. This Handpiece can be jointed to the end of a Support Bar (347) by way of a rod or rods which can retract and extend so that the user's wrist can contract or extend, as shown in FIG. 34D. Or this Handpiece may be attached by straps to rest independently in the user's palm for easy and continuous accessibility, as shown in FIG. 34E. The back of the Handpiece is contoured to fit comfortably against the user's palm. This Handpiece can be used to house a small digital dictation machine, with microphone, speaker and audio recording mechanisms. Or it can be used as a remote control for video cameras and other electronic devices.

Figure 35A:
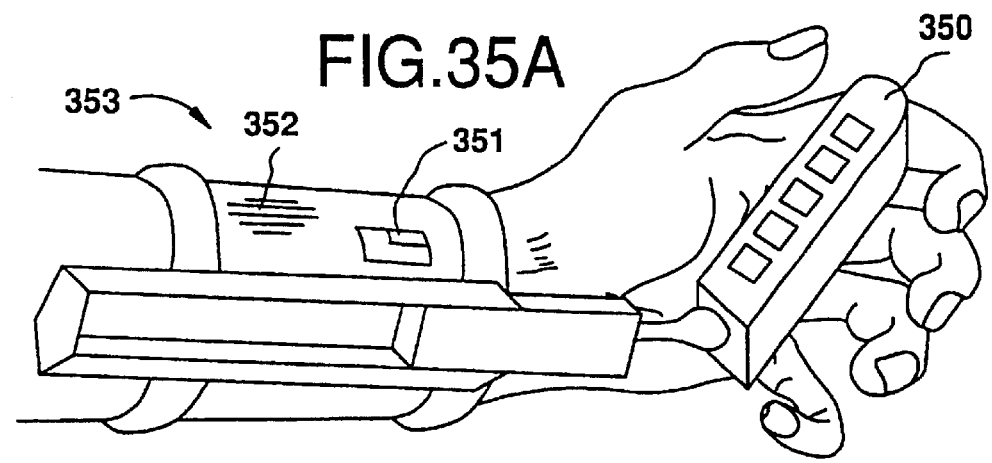
FIGS. 35A and 35B depict a Dedicated Key Palette Dictation Machine.

FIG. 35A depicts a Dedicated Key Palette Dictation Machine which includes a Simplified Handpiece (350) used to control an audio recorder (351), microphone and speaker (352) contained in the Armpiece (353). The active components in this design are stationary on the Armpiece. Digital and analog recording to disk, tape or other storage media work equally well with this design, and transmission to an external recording apparatus, on the user's body or elsewhere is also possible through this device.

Figure 35B:
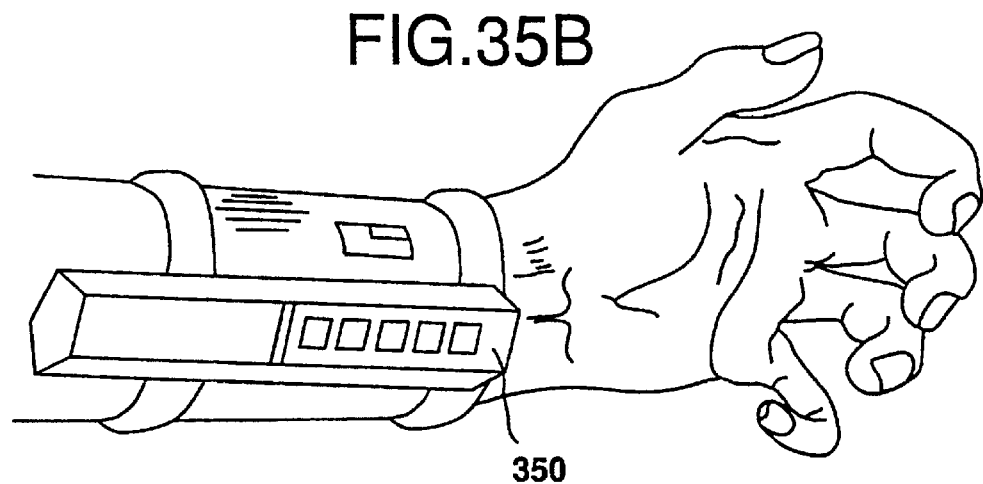

This Simplified Handpiece has been retracted in FIG. 35B, but the keys are still accessible.

Figure 35C:
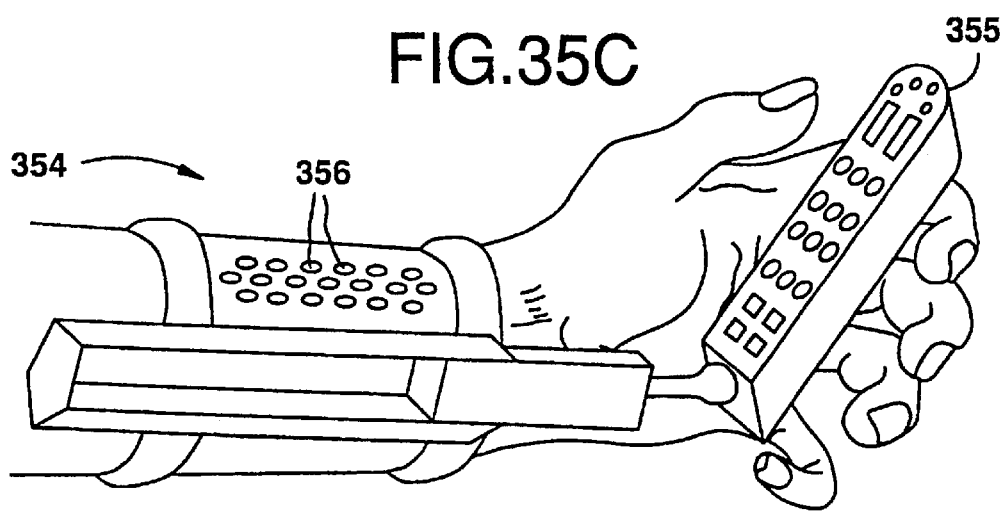
FIG. 35C depicts a Dedicated Remote Control.

FIG. 35C depicts a Dedicated Key Palette Remote Control which includes a Simplified Handpiece (355) and an Armpiece (354) with miniature keys (356) to control a television, stereo, audio recorder or other remotely controlled device. In remote control models in which the joystick-like Simplified Handpiece is used (not pictured), the Handpiece can also double as a joystick for video game usage. The pictured model, when endowed with sufficient keys to include the entire alphabet and ten digits, is perfect for PCTV and Internet TV usage.

Figure 35D:
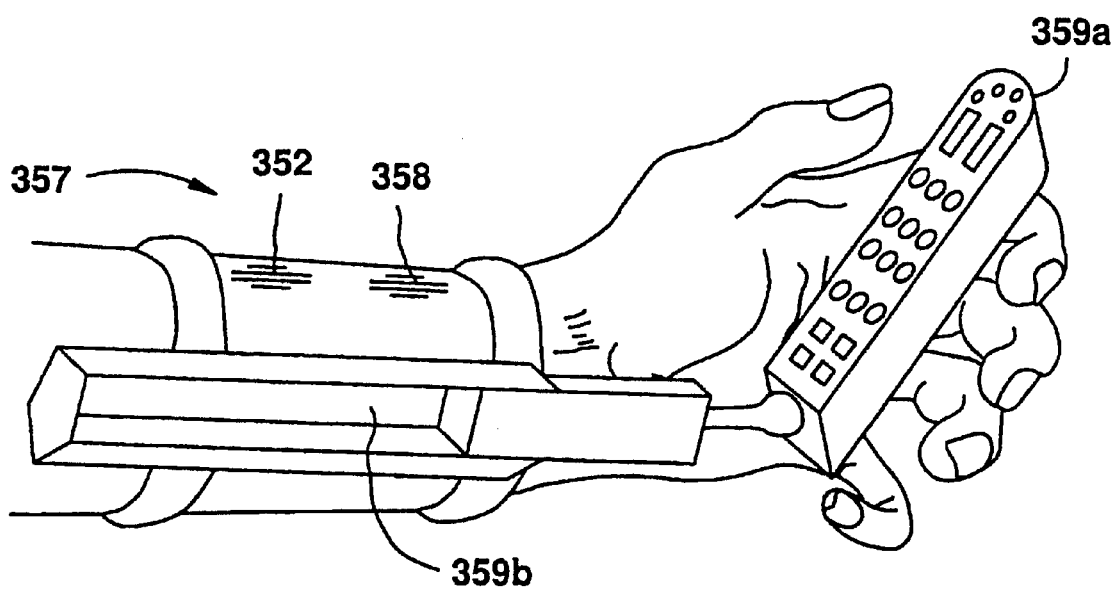
FIG. 35D depicts a Dedicated Cellular or Wireless Speakerphone.

FIG. 35D depicts a Dedicated Key Palette Speakerphone which includes a very thin Armpiece (357) which bears only a microphone (352) and a speaker (358). The Simplified Handpiece (359a) depicted bears traditional buttons for telephone use and retracts into a slot (359b) on the Armpiece when not in use. A headset microphone and earphone (not pictured) can be used instead of the arm-mounted speakerphone.

Figure 36A:
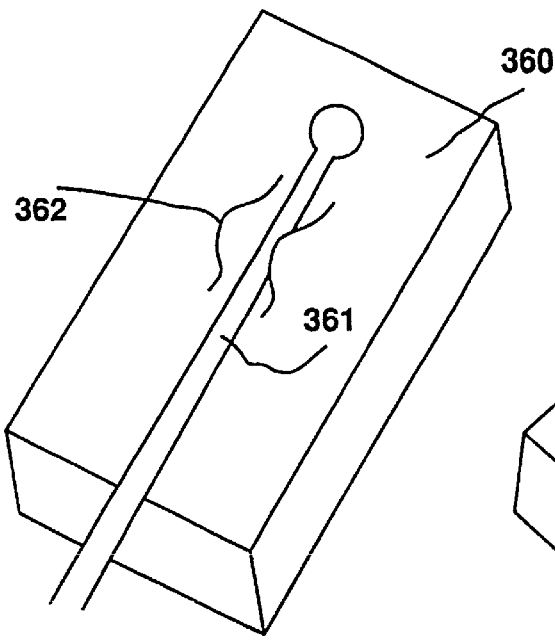
FIGS. 36A through 36C depict another type of Handpiece for use with the Dedicated Cellular or Wireless Speakerphone.
Figure 36B:
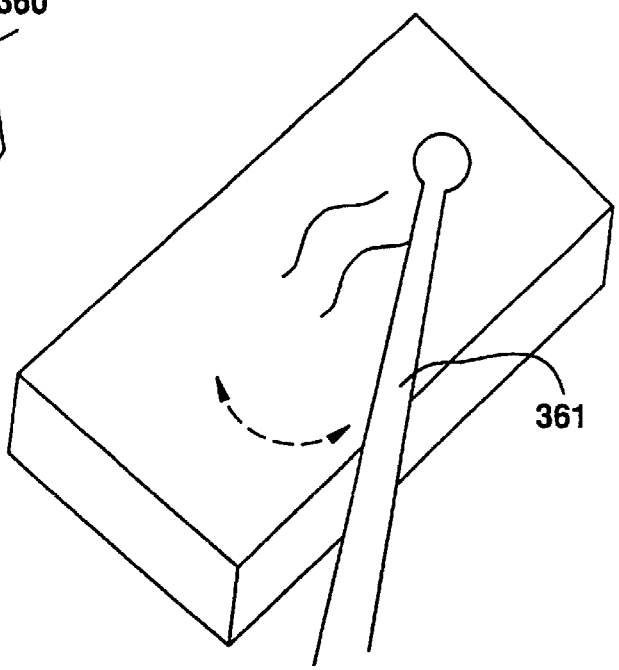
Figure 36C:
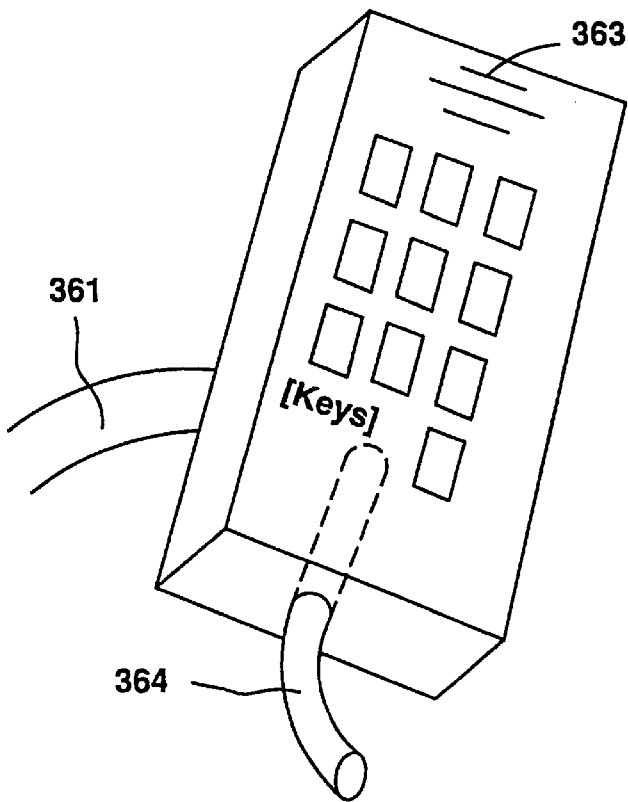

Another variation of the Simplified Handpiece for use with the Key Palette Speakerphone is shown in FIGS. 36A through 36C. This Handpiece (360) is jointed to a rod (361) which easily snaps in and out of a groove (362) on the back of the Handpiece, as depicted in FIG. 36A. When the rod is snapped in this groove, the Handpiece is in line with the slot into which it can be retracted. But when the rod is snapped out of this groove the Handpiece is free to move to any angle which is comfortable to the user's hand, as shown in FIG. 36B. The face of this Handpiece, shown in FIG. 36C, includes an earpiece speaker (363) and a retractable mouthpiece microphone (364), making its shape similar to a traditional handheld telephone. This Handpiece allows the user to speak either by arm-mounted speakerphone or privately by Handpiece. This type of Handpiece is mounted on its rod (361) as a typical Springy Handpiece.

Figure 37A:
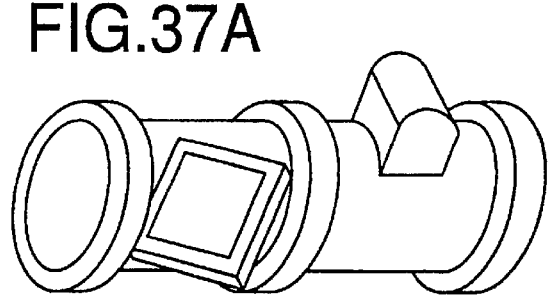
FIG. 37A depicts a Dedicated Mobile Audio/Video unit.

FIG. 37A depicts an Armpiece (370) upon which has been mounted a video camera (371) and a Swiveling Monitor (372). The arm-mounting means used in the pictured Armpiece is that of the Double-Layer Tube design. The interior tube layer is a single piece, but the exterior layer tube consists of two discrete sections (373a and 373b) divided by a third collar (374). Such a design enables the monitor to be turned in one direction while the camera faces another. Each active component may be mounted upon a ball-and-socket joint so as to allow maximum swiveling and tilting motion, or, alternately, on a revolving disk or rod; in the latter design, the active component should be designed so as to tilt as the above described Tilting Monitor. A directional microphone or other audio/visual equipment (not pictured) may be included. The same independence of motion between A/V components can be accomplished by mounting each component on a separate A/V Component Mount which is in turn mounted on a separate set of Ring Tracks, vertical or horizontal rails, vertical grooves or other component-mounting means.

Figure 37B:
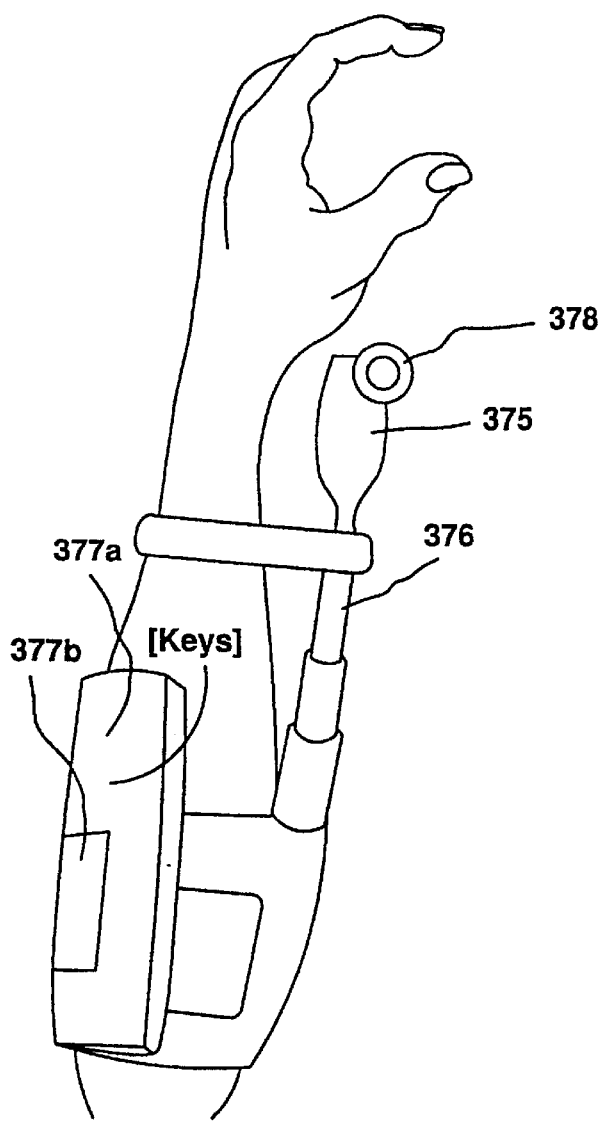
FIGS. 37B and 37C depicts a Dedicated Video Camera unit or Video Camera mount, which replaces a camera tripod.
Figure 37C:
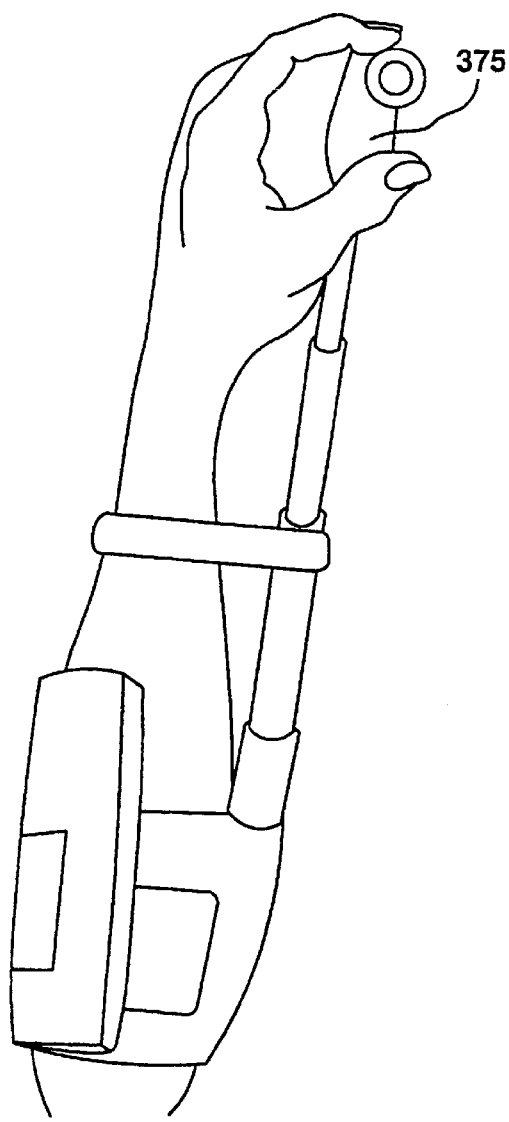

FIGS. 37B and 37C depict a Video Camera Handpiece (375) which has been mounted on parallel rails (376) (only one rail can be seen from the angle depicted; a single rail will also suffice but is not as stable). These collapsible/extendable rails allow the camera to rest in the user's hand as a typical Handpiece when in use, as in FIG. 37B, and then be retracted to sit next to his arm when not in use, as shown in FIG. 37C. This design, which leaves the user's hand free when the camera is not in use, also allows the user to hold his video camera more stably than a typical handheld camera can otherwise be held, since the camera is firmly grounded on rails attached to the user's forearm, thereby largely eliminating the shakiness which is characteristic of most videos shot with hand-held equipment. Furthermore, such a design allows the weightier, bulkier parts of the camera, where the actual recording of images to tape or other storage media takes place, to be mounted on the Armpiece (377a) along with control buttons, leaving the Video Camera Handpiece free to remain very small, thereby further increasing the stability of the entire apparatus. Tapes or disks are inserted in the Armpiece tape deck or disk drive (377b). A typical viewfinder (378) is mounted on the back or side of the Video Camera Handpiece. A separate Swiveling Monitor, mounted on the Armpiece, or other monitor can alternatively be used.

Rather than a self-contained camera unit, an apparatus such as that depicted in FIG. 37B can be used to support existing cameras and video cameras. In such a model, a separately manufactured still or video camera screws into a plate which replaces the Video Camera Handpiece just as a camera screws into the top of a standard consumer tripod. The Armpiece provides physical support and may also be used to carry the battery or other hardware which supports the separately manufactured camera.

Figure 38A:
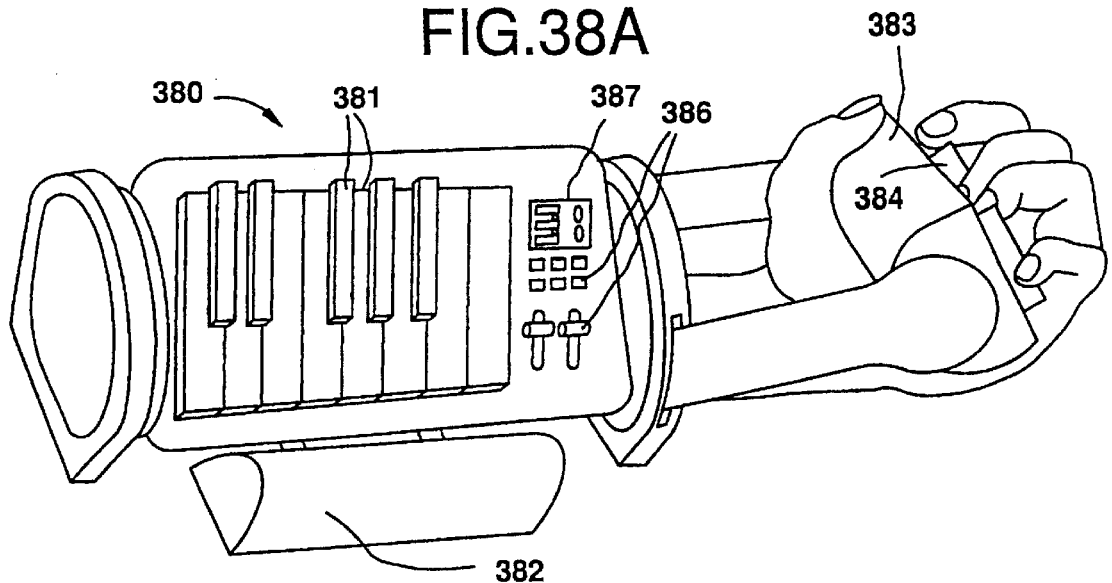
FIGS. 38A through 38C depict the Musical Key Palette and its various Handpieces.

FIG. 38A depicts a Musical Key Palette. The Armpiece (380) of the depicted model bears an octave of standard-sized MIDI piano/keyboard keys (381), although miniature piano/keyboard keys are also contemplated. Jutting out from under these keys is a Sustain Bar (382), which a user holds down with his wrist while playing in order to sustain notes, just as a sustain pedal is used on a regular piano. A standard MIDI footswitch, breath controller or volume pedal can be plugged into standard ports on the Musical Key Palette as an alternative means of sustaining or of inputting other MIDI data. Also depicted is a Bass Guitar Handpiece (383), which includes four rows of keys, four keys per row, designed to mimic four frets of a four string bass guitar and to send a MIDI signal when a given "fret" is "hammered on." Columns of keys are divided by removable Guiding Walls (384). Such a key configuration is typical, providing a user with sixteen pitches, but models with more keys for more dexterous users are contemplated. Supplementary input means for timbre selection, key selection/transposition, parameter editing and other typical MIDI functions are provided (386), as is a small digital monitor (387) which displays MIDI patch number and similar information.

Figure 38B:
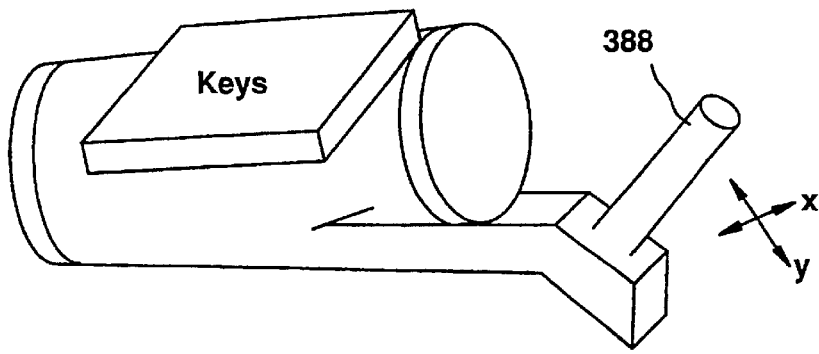

FIG. 38B displays a Musical Key Palette upon which a Joystick Simplified Handpiece (388) has been mounted. The x axis and y axis position of this Handpiece can be assigned to control MIDI signals for pitch bend, vibrato, stereopanning, etc. The buttons on this Handpiece/Joystick can be used to control sustain, key transposition, a other MIDI functions.

Figure 38C:
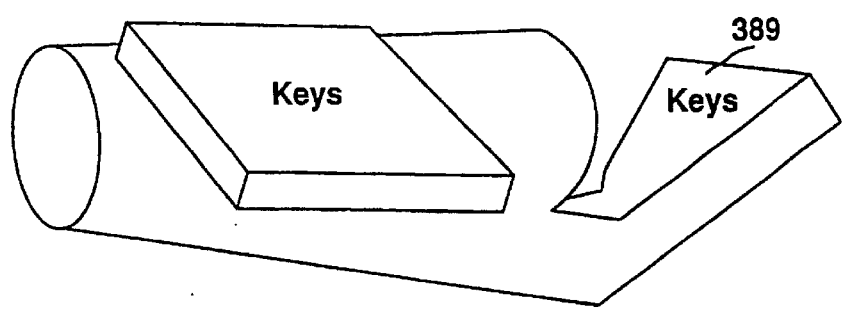

FIG. 38C demonstrates another type of Handpiece (389), one which is simply a second set of piano/keyboard keys set in a plane.

Returning to Key Palettes primarily used for computing purposes, the next several FIGURES depict various embodiments of the Expandable Key Palette. This innovation is particularly important because it renders standard laptop and palmtop computers and standard desktop keyboards largely obsolete by enabling a Key Palette to be converted into a regular laptop computer or desktop keyboard when true mobility is not necessary.

FIG. 39A pictures an Armpiece Key Housing (390) which has been detached from any arm-mounting or component mounting devices and from the accompanying Handpiece. The Armpiece Key Housing provides sockets (391a) into which the jacks (391b) of the Extension Piece (392) can be inserted. Additional means of coupling (391c) which provide extra security in the attachment of the Extension Piece are also pictured. The Extension Piece pictured (392) is one which typically contains a calculator-style number pad. Most alphabet keys and function keys appear on the Armpiece Key Housing (390); the remaining alphabet keys appear on the Handpiece (not pictured). Thus, this configuration of Key Housing (390) and number-pad Extension Piece (392) is typically that used while the Key Palette is in arm-mounted use.

Figure 39B:
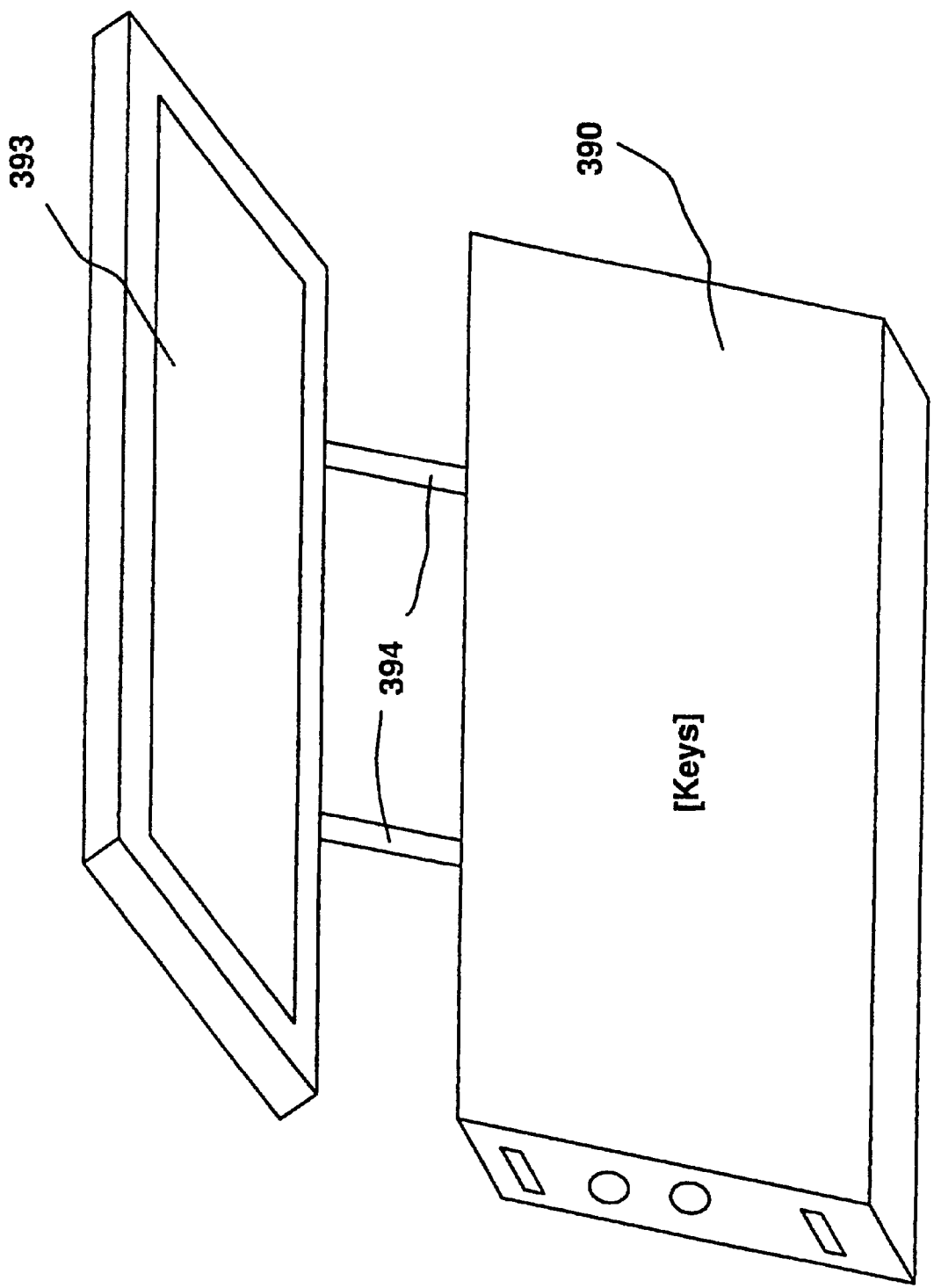
Figure 39C:
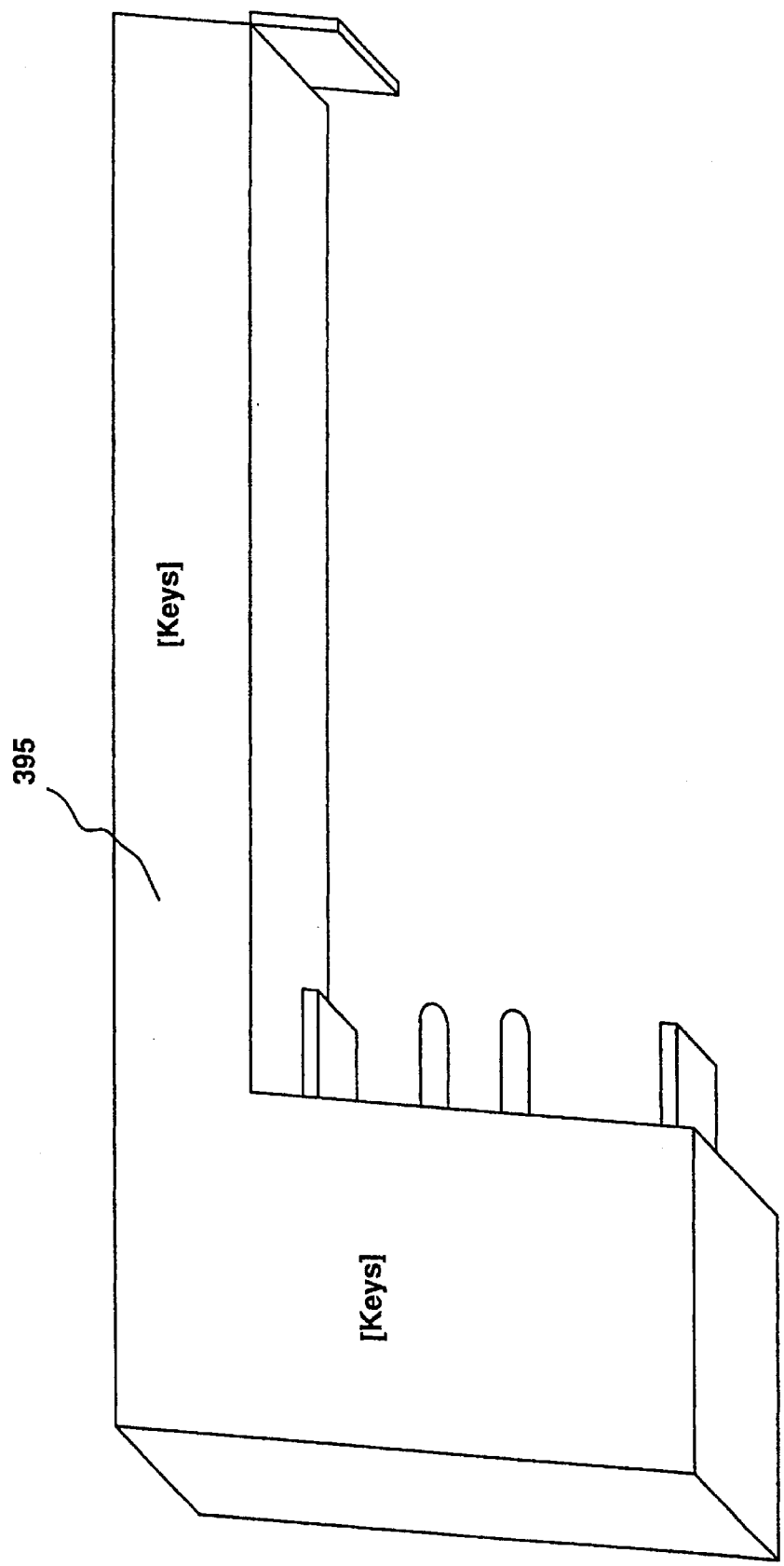
Figure 39D:
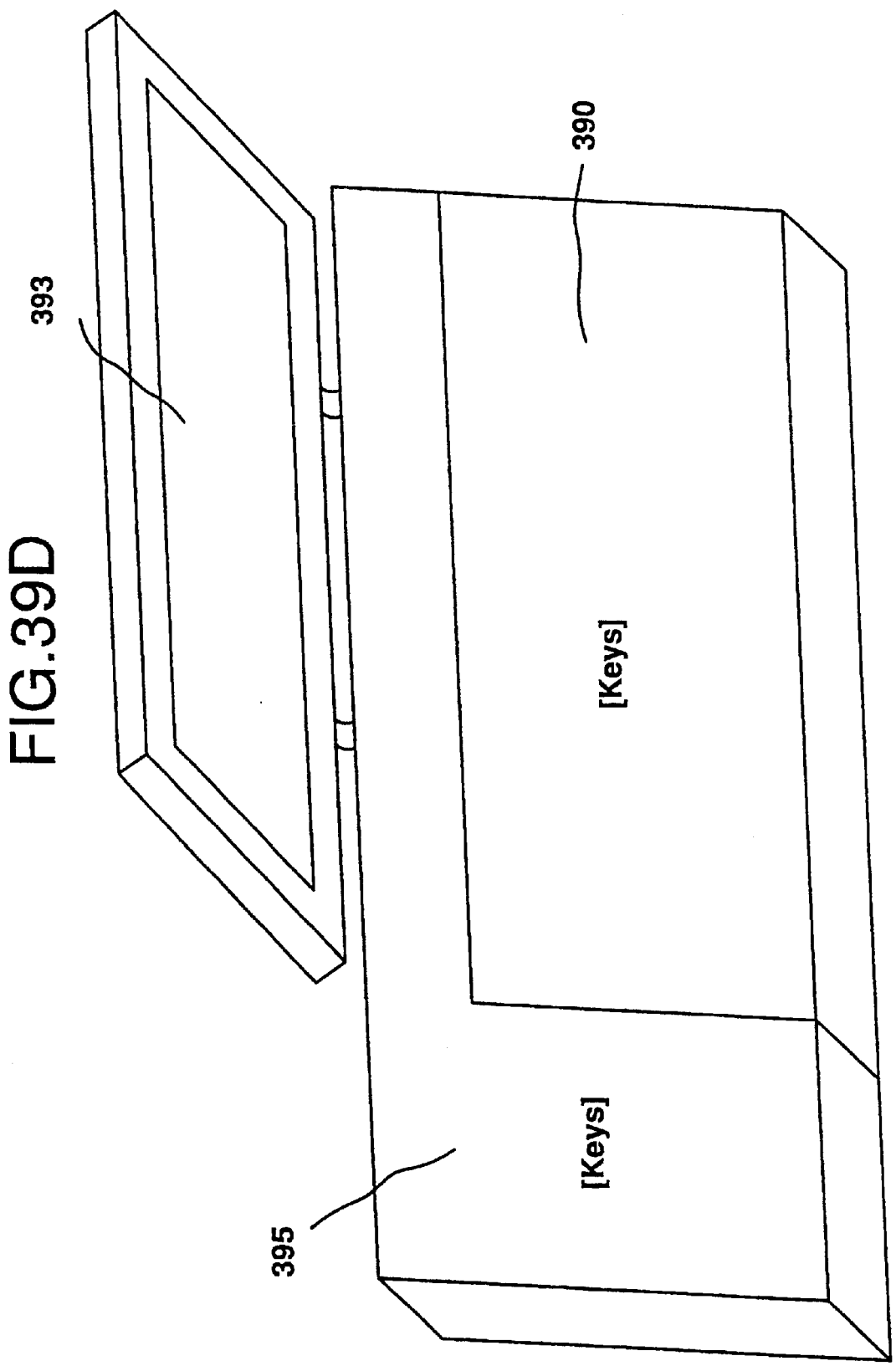
Figure 39E:
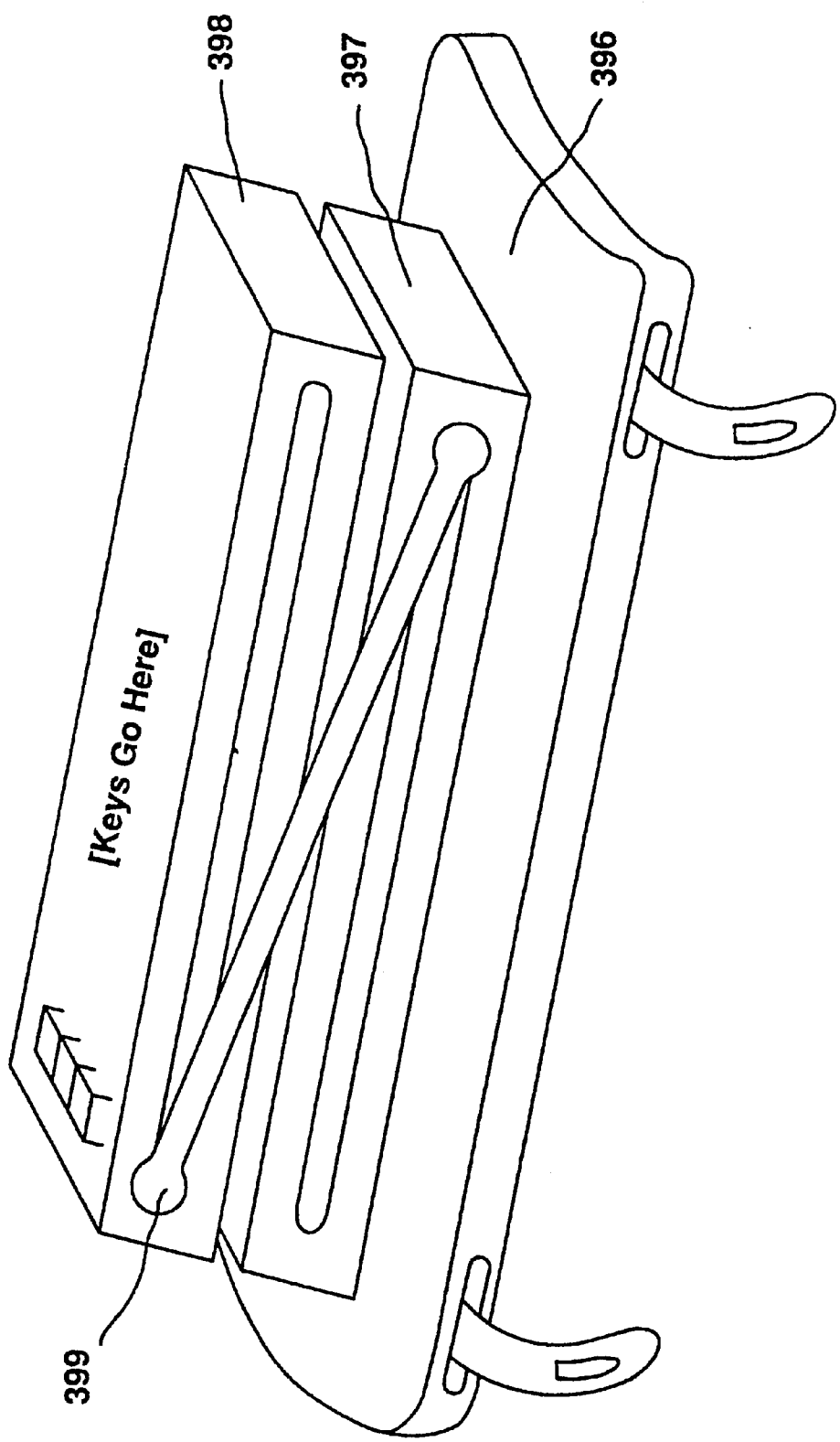
Figure 39F:
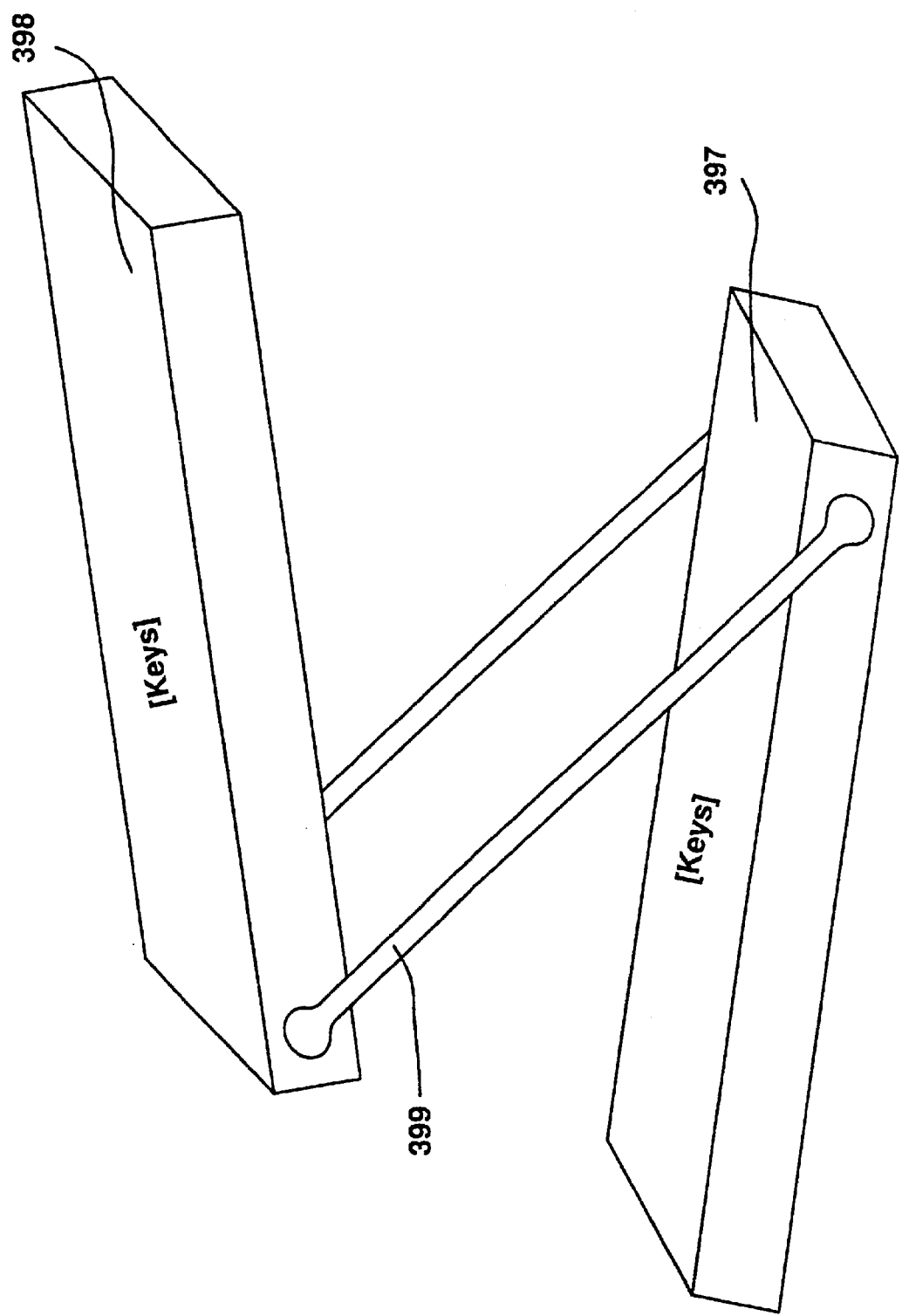
Figure 39G:
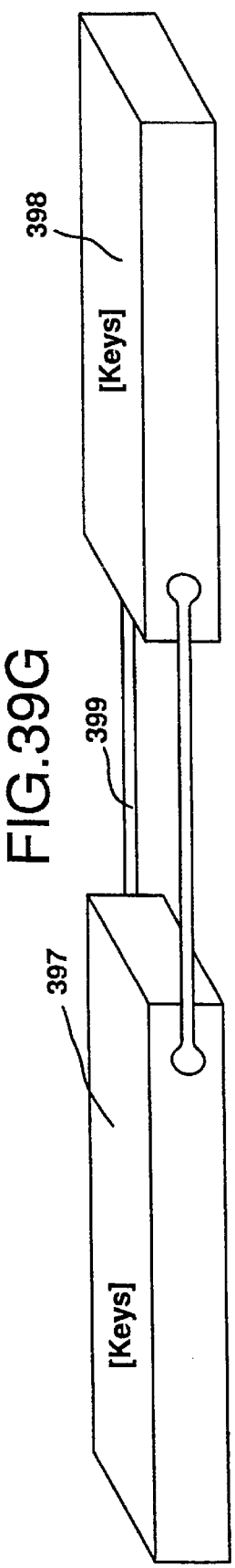
Figure 39H:
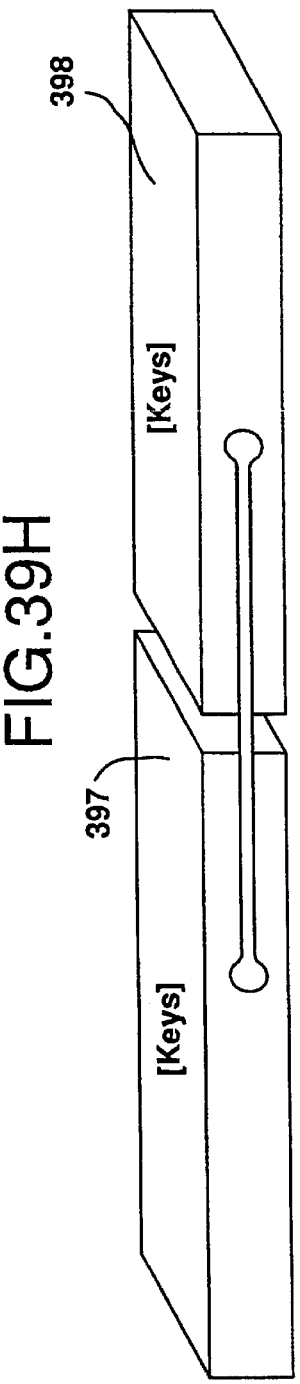

An Alienable Monitor (393), which is set on two small projections (394) so that it can be moved a few centimeters away from the Key Housing to which it is attached, is also depicted. In FIG. 39B, it has been moved to make room for the full-sized Extension Piece (395) which appears in FIG. 39C. This piece contains a side portion which carries all the alphabet keys normally carried by the removed Handpiece and a long top portion which bears all number keys, like a regular QWERTY keyboard. FIG. 39D shows this Extension Piece (395) in place. Assembled as such, the Extension Piece (395) and Armpiece Key Housing (390) form a standard desktop keyboard. The numberpad Extension Piece (392) can also be plugged into the full-sized Extension Piece (395) to form an extended keyboard. In this way, the arm-mounted Key Palette can be converted into a laptop computer at will.

FIG. 39E through 39H demonstrate a "double decker" Expandable Key Palette, wherein the combined arm-mounting means and active component mounting means (396) is attached to the underside of the Extension Piece (397) while the active component itself, the Key Housing (398) which is accessible when the Key Palette is in arm-mounted use, is in turn mounted on top of the Extension Piece (397). The Extension Piece then slides out to one side and into place to form a full scale desktop keyboard when such is desired by the user, as progressively demonstrated in FIGS. 39F, 39G and 39H.

Figure 39I:
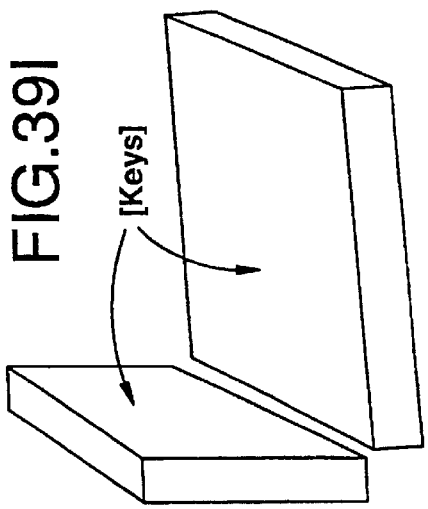

FIG. 39I depicts an Expandable Key Palette with a Hinged Extension Piece (399), which can be raised when not in use and lowered when needed.

Figure 40D:
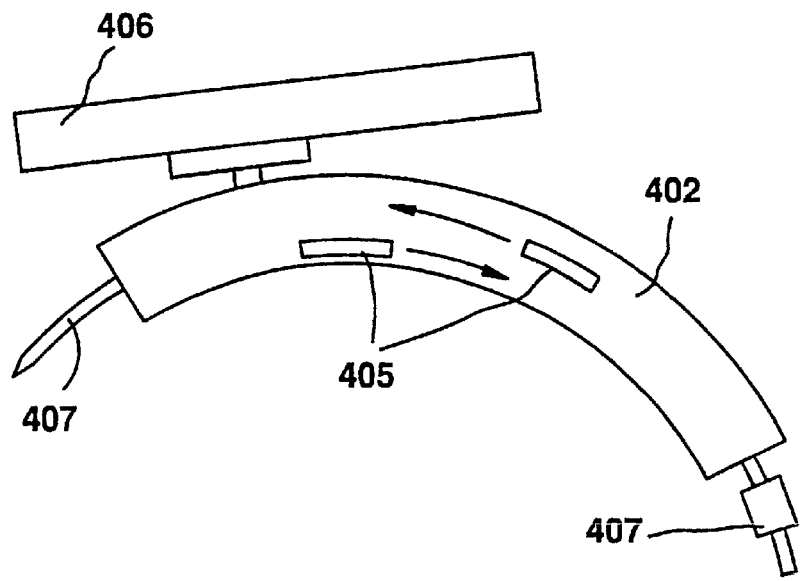

FIGS. 40A through 40D depict a Retractable Belts Arm-Mounting Means (400). The body (402) of this device contains vertical slots (401) into which rods (403) fit so that they can move vertically as shown in FIGS. 40A and 40B. A Key Housing or, as shown here, a Key Housing Mount (404), is then mounted on these rods so that it can revolve partially around the user's arm, as shown in FIG. 40C. In the side view of FIG. 40D, a Key Housing (406) has been added to the Key Housing Mount (404) and two Expulsion/Retraction Levers (405) appear on the side of the body (402). When the Key Palette is to be worn, these levers are used to expel the belts (407) which appear in FIG. 40D; these belts are then fastened around the user's arm. When the Key Palette is to rest on a desk, these belts are retracted. The body of this device is typically rigid, but it can also be constructed with flexible material so that it can either bend around a user's arm or lie flat on a desk. Such flexibility can be also be achieved by constructing this body so as to consist of several parallel rigid slats on hinged which are hinged together.

Figure 40E:
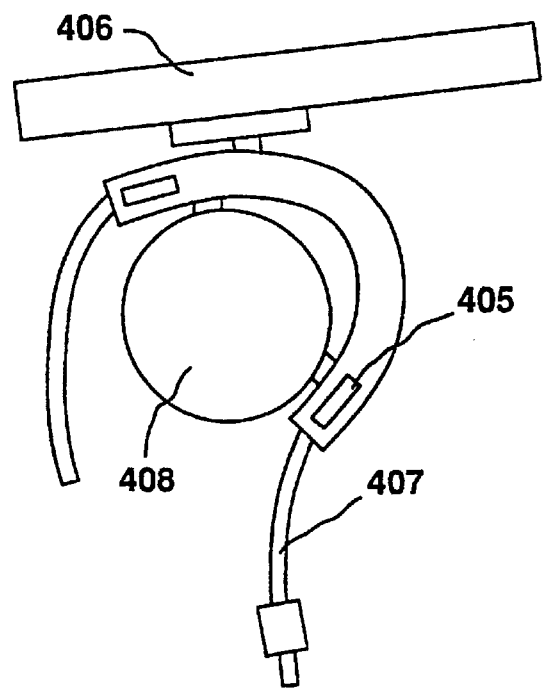

FIG. 40E shows another side view of the Retractable Belts Arm-Mounting Means as it would appear before the belts (407) have been fastened around the user's arm (408).

Figure 41A:
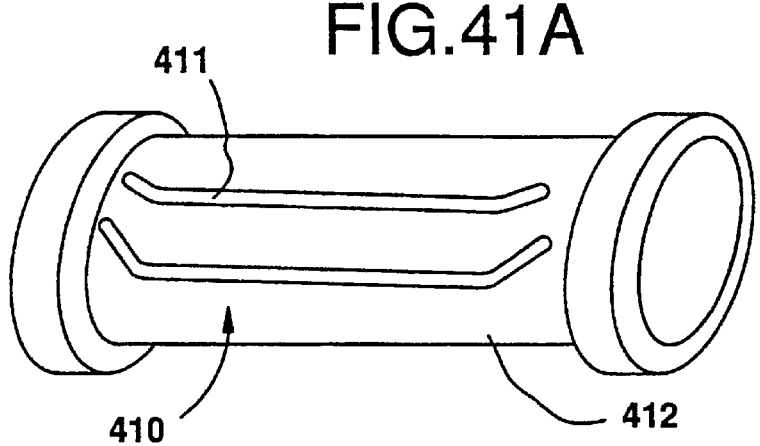
Figure 41B:
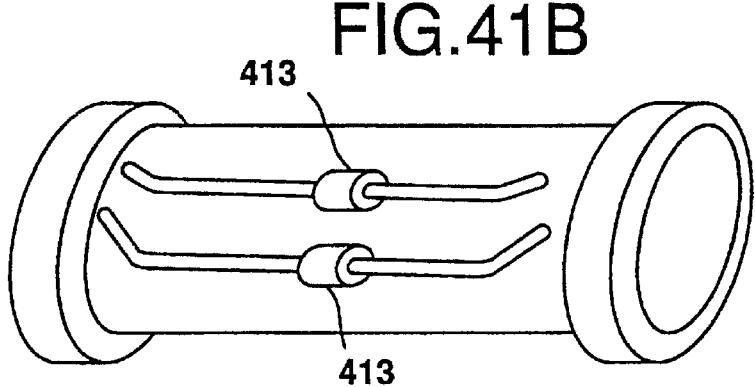
Figure 41C:
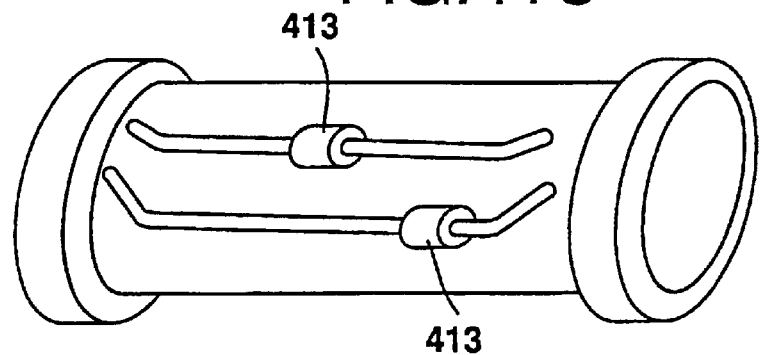
Figure 41E:
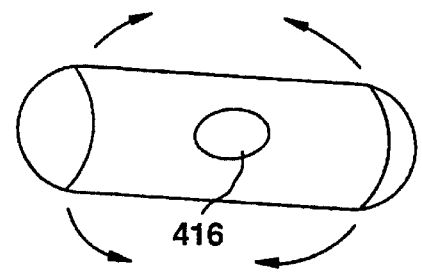
Figure 41F:
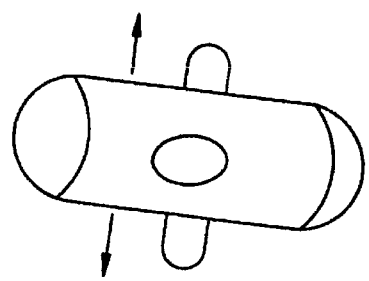
Figure 41G:
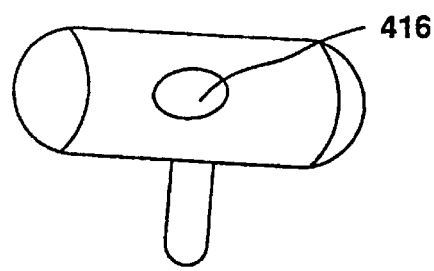
Figure 41H:
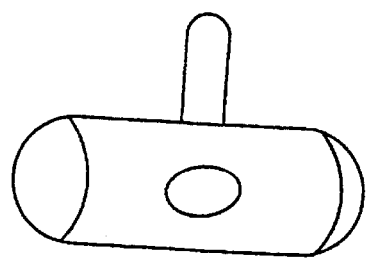
Figure 41I:
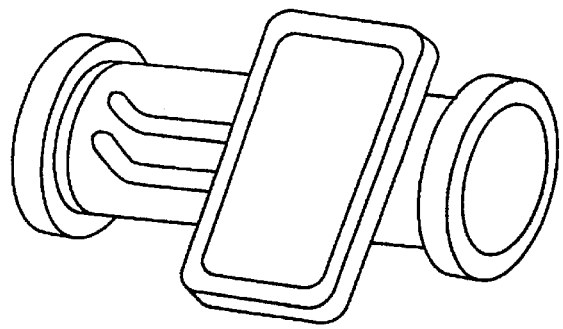
Figure 41J:
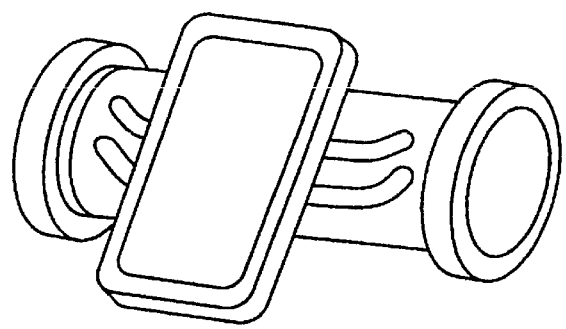

FIGS. 41A through 41H provide views of the Horizontal Bars Mount (410). In this active component mounting means, two parallel rails (411) are fixed upon a given arm-mounting means (in the pictured case, a Double-Layer Tube(412)). Two small cylinders (413) surround these rails and can slide back and forth independently, as demonstrated by comparing FIGS. 41B and 41C. These cylinders are in turn attached to a plate (414) upon which the component to be mounted, in this case, a pen-activated PDA (Personal Digital Assistant) (415) is fixed. Specifically, the cylinders (413) are attached to the plate (414) on axis rods (416). The axis rod of the top cylinder is mounted to the plate so that the cylinder will spin in place, as shown in FIG. 41E. The axis rod of the lower cylinder fits into a slot on the plate so that this axis can move vertically but not horizontally as shown in FIGS. 41F, 41G and 41H, while the attached cylinder remains able to spin on it. This method of attaching the cylinders to the plate allows the cylinders to get further apart or closer together while yet remaining parallel, allowing the plate to be turned somewhat while yet remaining attached to the parallel rails. FIGS. 41I and 41J show the plate-mounted PDA moving along the rails.

Figure 41K:
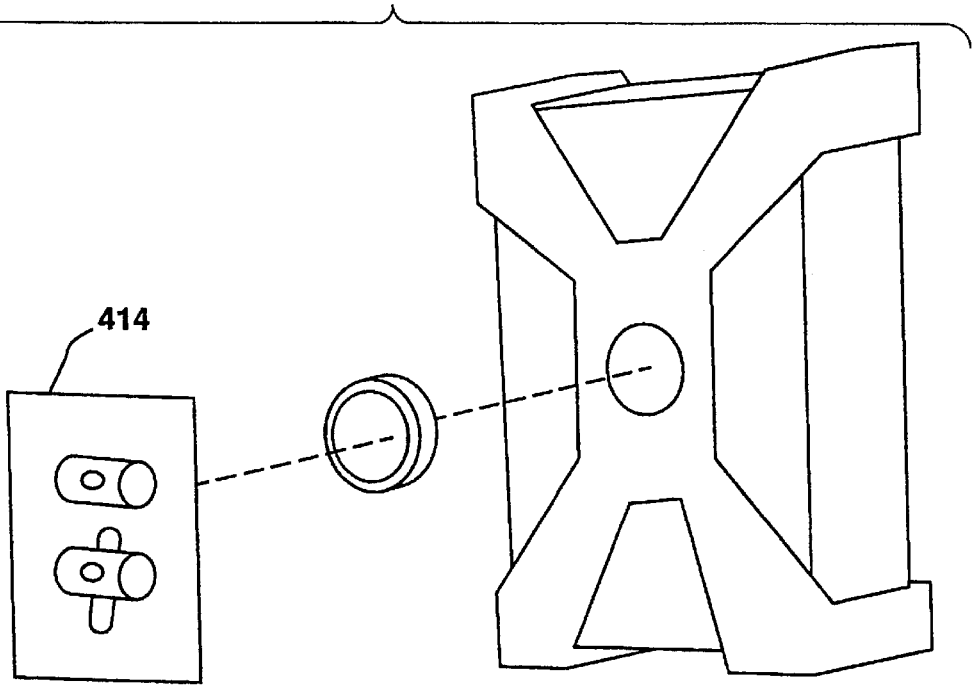

Note that this type of Armpiece is particularly well-suited for use with pre-existing PDA's and handheld computers. Thus, the plate (414) depicted above can be fixed to the back of such pre-existing equipment with screws, adhesive or in a manner which allows the handheld unit to be removed from the Armpiece when so desired. A device (417) which clamps around the four corners of such a handheld unit and is then mounted upon a revolving disk and attached to the plate is shown in FIG. 41K.

Figure 42A:
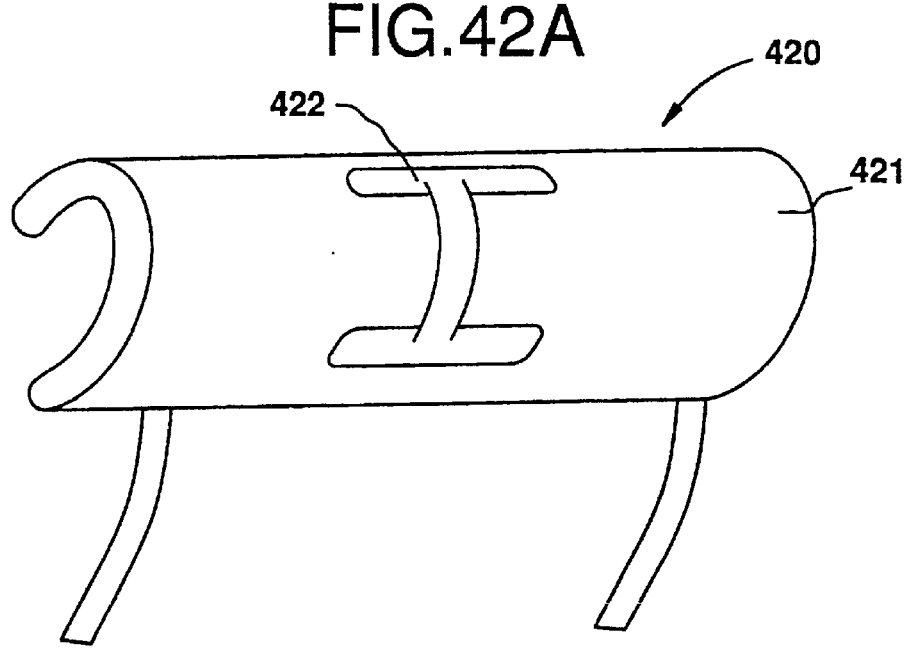
FIGS. 42A and 42B depict the Pommel Horse Active Component Mounting Means.
Figure 42B:
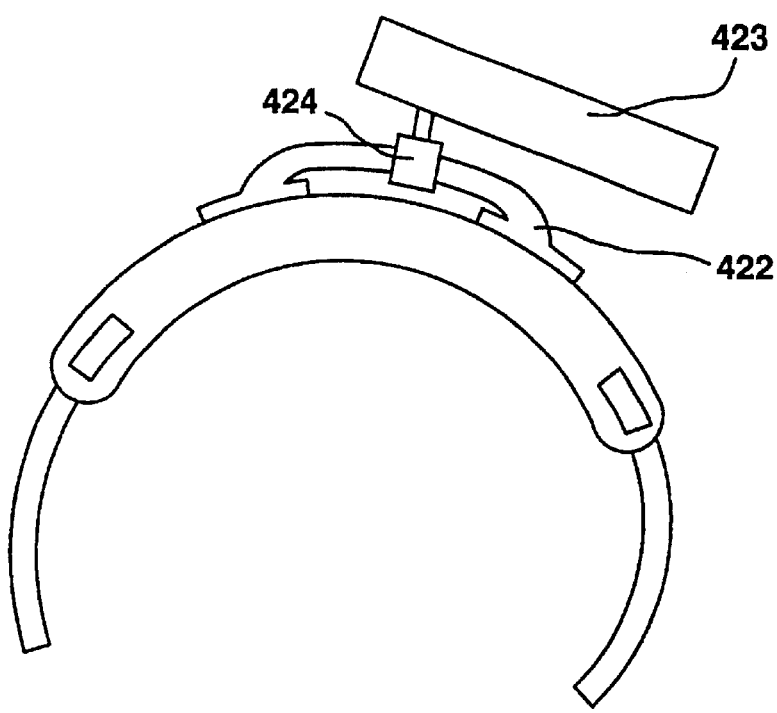

FIG. 42A demonstrates a Pommel Horse Mount (420). It provides yet another active component mounting means. The rail (422) in this device is basically like one of the Ring Tracks shown previously, but rather than entirely surrounding the user's arm, this rail is mounted directly on a rigid arm-mounting means (in the pictured, a Retractable Belt Arm-Mounting Means (421)). The component to be mounted can move partly about the arm of the user by sliding on this rail. A side view appears in FIG. 42B, in which a monitor (423) has been mounted by way of a cylinder (424) such as those cylinders described in reference to the Horizontal Bars Mount.

Figure 43:
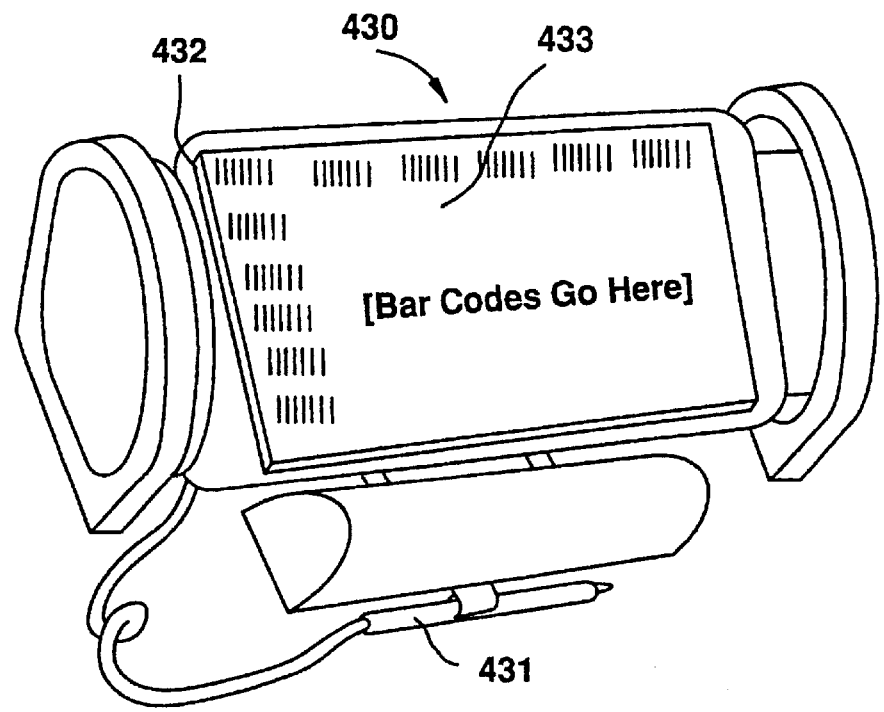
FIG. 43 depicts a Dedicated Bar Code Reader.

FIG. 43 demonstrates a Key Palette Bar Code Reading Device. A bar code reader pen (431) is depicted, attached to a handrest (434). This portable pen can be used to read bar codes anywhere, but it is specifically designed for use with the Bar Code Clipboard (432). Simply put, the Bar Code Clipboard is like a picture frame into which printed sheets (433) bearing bar codes can be inserted and removed. Such sheets would be used for taking inventory, for instance, where a code for each item to be counted is printed on the sheet and the pen is passed over the code for that product and then a code for the quantity in which that product appears.

Figure 44:
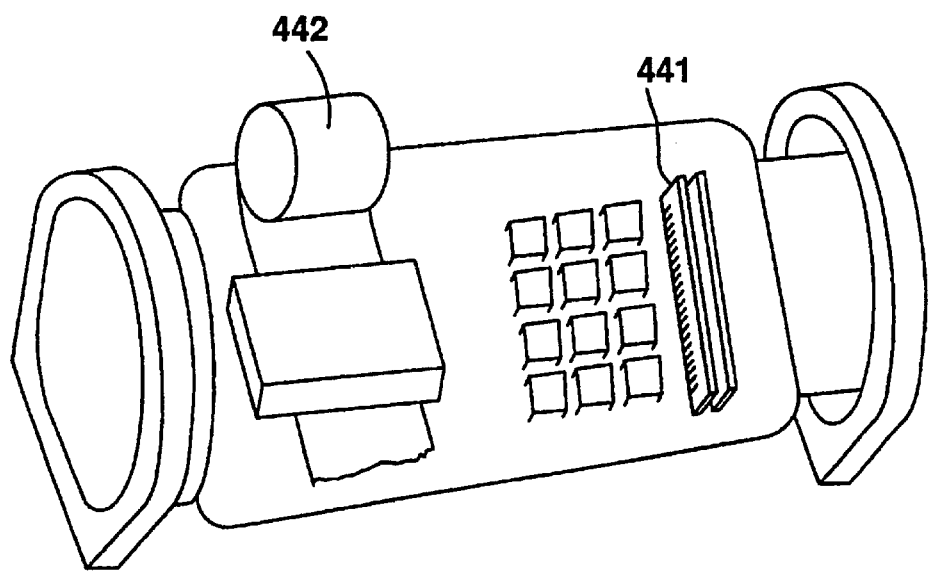
FIG. 44 depicts a Key Palette which bears a magnetic strip reader, a keypad and a printer.

FIG. 44 shows a Key Palette equipped with a magnetic strip reader (441), a small keypad, and a roll of paper (442) for use with an internal printer. Such a device can be used for taking credit card information, which is wirelessly transmitted for approval, and then printing a receipt for the transaction, all while on the go. Not pictured is a similar device which includes a larger keypad (with miniature keys including the whole alphabet and ten digits) and printer into which blank traffic tickets can be fed. This device is ideal for people who check parking meters.

Figure 45A:
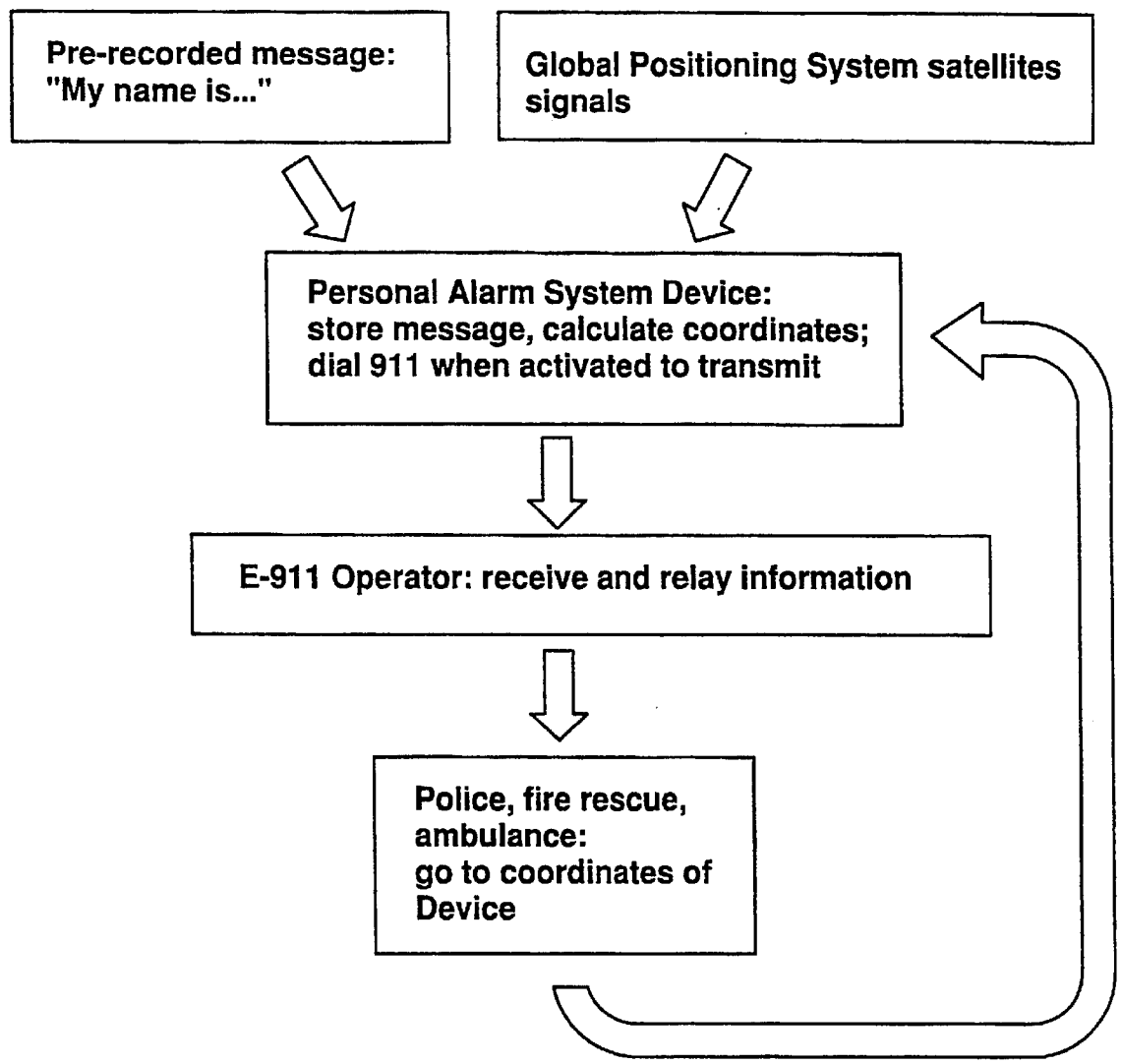
FIG. 45A depicts a flow chart of the Key Palette Personal Alarm System.
Figure 45B:
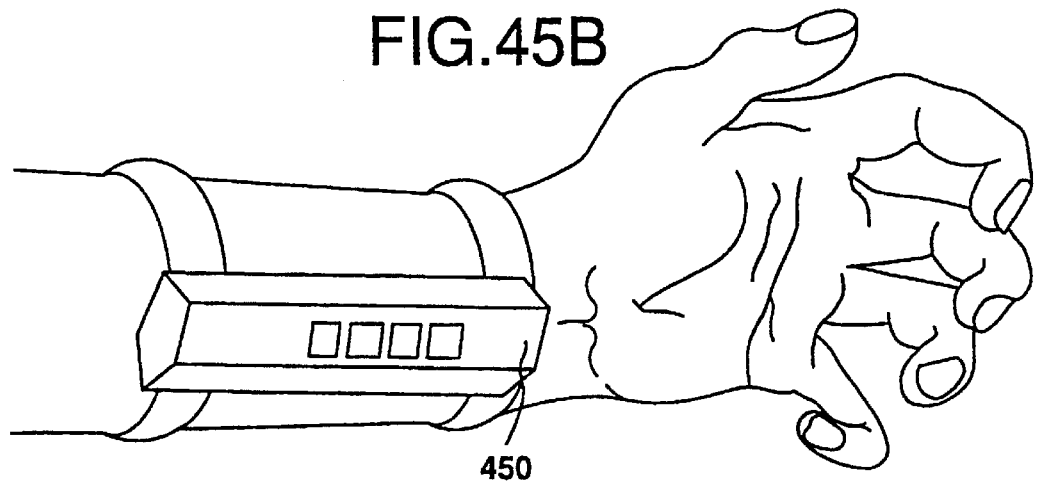
FIG. 45B depicts the Dedicated Personal Alarm Device.

FIG. 45A depicts a flow chart representation of the Key Palette Personal Alarm System. The Personal Alarm Device (450), shown in FIG. 45B, can be worn separately or can be attached to any form of Key Palette. It can also be installed in non-wearable items, such as car dashboards. This device is a cellular phone which has but a single purpose: to call "911" with emergency information.

The system functions as follows: a digital recorder, a microphone and a speaker are housed inside the unit so that a user can record a brief message (and hear it). The unit also contains a radio receptor which detects satellite signals from the Global Positioning System which are then processed to determine the location of the unit (geographical coordinates). The processor included with this Device also reads from ROM which phone area code the given coordinates fall under.

When a user presses the emergency button, the cell phone automatically dials the appropriate area code (if necessary) and "911." When the phone is answered, the device delivers the user's recorded message similar to the following: "My name is Bill Gates. I have dialed 911 because I am experiencing an emergency. Here are my coordinates." The device then transmits the coordinates of the device at that moment as indicated by the signals of the Global Positioning System. The coordinates may be transmitted in digital form for reception by a coordinates receiver, or these coordinates may simply be spoken over the phone line by built-in voice simulation. The device repeatedly calls until the 911 line is answered and can be optionally programmed so as to call back with an update periodically until de-activated. If successful phone connection to 911 does not occur within a pre-determined period of time, the device will switch to dialing a central, national number such as an 800 number. The operators at this number then convey the distress signal to the appropriate parties.

Various safeguards can be put in place to prevent accidental activation, such as requiring that a user press the emergency button twice in rapid succession. False alarms may lead legislative bodies to impose statutory sanctions for improper use of the Key Palette Personal Alarm System. Two-way communication between user and 911 operator, as in a cellular speakerphone Key Palette, is possible through this device, but the contents of the pre-recorded message and the coordinates of the unit are transmitted whether or not such communication is established.

The Personal Alarm System unit can also be programmed to call some other emergency number or additional numbers (the user's home phone number, corporate headquarters, etc.). Additional buttons on the body of the Device are available to designate which type of emergency the user is experiencing: a fire button, a crime button and a medical button.

It should now be readily apparent that a novel key palette capable of achieving the stated objects of the invention has been provided. The present invention provides an improved means of data entry which enables greater mobility, ease, comfort and efficiency of use than any prior keyboard-like device allows. This invention provides a self-contained computer which is more portable than any prior fully functional, fully accessible computer. The invention increases the productivity and convenience of computer users and other data enterers while also reducing the risk of health complications associated with usage of prior data entry devices. This invention provides a superior computer monitor, one which is more portable, adjustable and suitable for use with voice recognition and pen-based data input systems than any prior monitor system. The invention enhances the performance and mobility of musicians who use MIDI while performing. The invention provides a microphone, audio recorder, and/or camera which is more stable, mobile and easier to use than known audio/visual devices. This invention provides various means of attaching electrical or mechanical devices to a person's arm which are superior to any known means in terms of functionality, stability and range of motion. The invention provides a wireless telephone which is more easily portable than any known telephone or radio communication device. This invention provides a multi-media remote control and/or arm-mounted gaming device which is more portable and convenient than known embodiments of such devices. The invention provides a system by which a user can call "911" for emergency help from almost anywhere more quickly and easily than ever before.

It should further be apparent to those skilled in the art that various changes in form and details of the invention as shown and described may be made. It is intended that such changes be included within the spirit and scope of the claims appended hereto.

What is claimed is:

1. An electronic device comprising:

at least one component of a credit card terminal;

and arm attachment mechanism suitable for wearing on the human arm, upon which mechanism is mounted a credit card terminal component, said arm attachment mechanism configured to allow said terminal component to revolve around the axis described by a user's forearm along a prescribed path while the arm attachment mechanism remains stationery relative to the user's forearm so that the terminal component does not rub against the user's forearm while in motion.

2. An electronic device according to claim 1, wherein the credit card terminal component includes a magnetic strip reader.

3. An electronic device according to claim 1, wherein the credit card terminal component includes a printer.

4. An electronic device according to claim 1, additionally comprising a movable coupling configured to enable the credit card terminal component to swivel in place relative to the arm attachment mechanism.

* * * * *